United States Patent [19]
Olmstead et al.

[11] Patent Number: 6,042,012
[45] Date of Patent: Mar. 28, 2000

[54] METHOD AND APPARATUS FOR READING IMAGES WITHOUT NEED FOR SELF-GENERATED ILLUMINATION SOURCE

[75] Inventors: Bryan L. Olmstead; Michael J. Ahten; Bruce E. Paris; Jorge L. Acosta; James W. Ring; Paul R. Huss; Jon P.C. Williams; Alexander M. McQueen; Randy L. Person, all of Eugene, Oreg.

[73] Assignee: Spectra-Physics Scanning Systems, Inc., Eugene, Oreg.

[21] Appl. No.: 09/162,350

[22] Filed: Sep. 28, 1998

Related U.S. Application Data

[63] Continuation of application No. 08/576,203, Dec. 21, 1995, Pat. No. 5,814,803, and a continuation-in-part of application No. 08/363,258, Dec. 23, 1994, Pat. No. 5,770,847.

[51] Int. Cl.[7] ...................................................... G06K 7/10
[52] U.S. Cl. ............... 235/462.41; 235/454; 235/462.25; 235/462.29; 250/201; 250/568; 359/30; 359/565
[58] Field of Search ........................ 235/462.41, 462.16, 235/462.19, 462.24, 462.25, 462.26, 462.29, 454, 470, 472.01; 250/201, 234, 204, 566, 568; 359/30, 565, 742, 825

[56] References Cited

U.S. PATENT DOCUMENTS

| | | | |
|---|---|---|---|
| 2,811,081 | 10/1957 | Praeger | 88/57 |
| 3,004,470 | 10/1961 | Rühle | 88/57 |
| 3,801,775 | 4/1974 | Acker | 235/454 X |
| 4,000,397 | 12/1976 | Herbert et al. | 235/454 X |
| 4,135,161 | 1/1979 | Torrieri | 328/108 |
| 4,246,612 | 1/1981 | Berry et al. | 358/206 |
| 4,335,302 | 6/1982 | Robillard | 235/462.01 X |
| 4,354,101 | 10/1982 | Hester et al. | 235/462.01 X |
| 4,612,437 | 9/1986 | Ohsato | 250/201 |
| 4,675,513 | 6/1987 | Kuze | 235/375 |
| 4,687,912 | 8/1987 | Ohta | 235/462.01 X |
| 4,691,367 | 9/1987 | Wevelsiep | 382/61 |
| 4,697,098 | 9/1987 | Cloke | 307/354 |

(List continued on next page.)

FOREIGN PATENT DOCUMENTS

| | | |
|---|---|---|
| 61-285404 | 12/1986 | Japan . |
| 6474687 | 3/1989 | WIPO . |
| 9415314 | 7/1994 | WIPO . |

OTHER PUBLICATIONS

Williams, Arthur, *Filter Design Handbook*(1981), pp. 2–55 to 2–58, 2–60, 2–64, 2–67 to 2–68, 3–15 to 3–19, 7–14 to 7–15, 7–19 to 7–20, 12–58 and 12–67. month missing.

Ronald E. Crochiere and Lawrence R. Rabiner, *Multirate Digital Signal Processing*(Prentice–Hall 1983), pp. 20–29. month missing.

Dickson, "Optical Character Recognition Scanner", May 1972, pp. 3594–3595, IBM Technical Disclosure Bulletin, vol. 14, No. 12.

*Primary Examiner*—Michael G. Lee
*Attorney, Agent, or Firm*—Lyon & Lyon LLP

[57] ABSTRACT

A method and apparatus for reading bar codes or other images while reducing or eliminating the need for self-generated illumination. An image reader is preferably embodied as a handheld unit and comprises an efficient optical collection system including an aperture with a high aspect ratio and/or a multi-focal lens or lenses. An optically transmissive spacer affixed to the front of the handheld unit allows ambient light to be collected at close range, and a diffuser may be used to reflect ambient light from the handheld unit to provide additional illumination at close range. A masked CCD detector with rectangular pixels receives collected light and is coupled to an adaptive exposure circuit for preventing saturation of the CCD detector at high illumination levels. A correlated double sampling circuit coupled to the adaptive exposure circuit rejects common mode noise and allows operation in lower light levels. The correlated double sampling circuit is connected to a signal processor which uses a derivative based technique for detecting edges of the image. A decoder uses the edge detection information to decode encoded information from the image.

21 Claims, 71 Drawing Sheets

U.S. PATENT DOCUMENTS

| | | | |
|---|---|---|---|
| 4,740,675 | 4/1988 | Brosnan et al. | 235/462.01 X |
| 4,749,879 | 6/1988 | Peterson et al. | 307/354 |
| 4,782,220 | 11/1988 | Shuren | 235/462.01 X |
| 4,818,886 | 4/1989 | Drucker | 250/566 |
| 4,843,222 | 6/1989 | Hochgraf | 235/470 |
| 4,861,972 | 8/1989 | Elliott et al. | 235/462.01 X |
| 4,874,933 | 10/1989 | Sanner | 235/470 |
| 4,879,456 | 11/1989 | Cherry et al. | 235/462.01 X |
| 4,939,356 | 7/1990 | Rando et al. | 235/454 X |
| 4,963,719 | 10/1990 | Brooks et al. | 235/454 X |
| 4,978,860 | 12/1990 | Bayley et al. | 250/568 |
| 5,010,241 | 4/1991 | Butterworth | 250/566 X |
| 5,071,207 | 12/1991 | Ceglio et al. | 359/565 X |
| 5,081,540 | 1/1992 | Dufresne et al. | 359/30 |
| 5,081,541 | 1/1992 | Sirat et al. | 359/30 |
| 5,103,080 | 4/1992 | Barkan | 235/437 |
| 5,103,209 | 4/1992 | Lizzi et al. | 340/572 |
| 5,121,009 | 6/1992 | Braathen | 307/520 |
| 5,124,537 | 6/1992 | Chandler et al. | 235/462.01 X |
| 5,126,544 | 6/1992 | Izumi | 235/462.01 X |
| 5,144,118 | 9/1992 | Actis et al. | 235/462.01 X |
| 5,144,460 | 9/1992 | Barbanell | 359/30 X |
| 5,155,343 | 10/1992 | Chandler et al. | 235/462.01 X |
| 5,155,344 | 10/1992 | Fardeau et al. | 235/462.01 X |
| 5,200,597 | 4/1993 | Eastman et al. | 235/455 |
| 5,202,784 | 4/1993 | Reddersen | 235/472.01 |
| 5,210,398 | 5/1993 | Metlitsky | 235/454 X |
| 5,229,797 | 7/1993 | Futhey et al. | 359/565 X |
| 5,272,323 | 12/1993 | Martino | 235/454 X |
| 5,285,314 | 2/1994 | Futhey | 359/565 |
| 5,291,005 | 3/1994 | Ishii et al. | 235/449 |
| 5,296,690 | 3/1994 | Chandler et al. | 235/454 X |
| 5,304,787 | 4/1994 | Wang | 235/454 X |
| 5,311,001 | 5/1994 | Joseph et al. | 235/454 X |
| 5,319,181 | 6/1994 | Shellhammer et al. | 235/462.75 X |
| 5,329,104 | 7/1994 | Ouchi et al. | 235/454 X |
| 5,329,105 | 7/1994 | Klancnik et al. | 235/454 X |
| 5,343,028 | 8/1994 | Figarella et al. | 235/454 X |
| 5,347,121 | 9/1994 | Rudeen | 250/235 |
| 5,349,172 | 9/1994 | Roustaei | 235/472.01 |
| 5,378,881 | 1/1995 | Adachi | 235/454 X |
| 5,386,105 | 1/1995 | Quinn et al. | 235/462.01 X |
| 5,408,081 | 4/1995 | Barkan | 235/454 X |
| 5,430,280 | 7/1995 | Smith et al. | 235/455 |
| 5,442,480 | 8/1995 | Swanson et al. | 359/565 X |
| 5,446,272 | 8/1995 | Barkan | 235/462.01 X |
| 5,463,211 | 10/1995 | Arends et al. | 235/454 X |
| 5,471,515 | 11/1995 | Fossum et al. | 377/60 |
| 5,475,206 | 12/1995 | Reddersen et al. | 235/462.01 X |

POTENTIAL DIAGRAM

CHARGE TRANSFER PROCESS

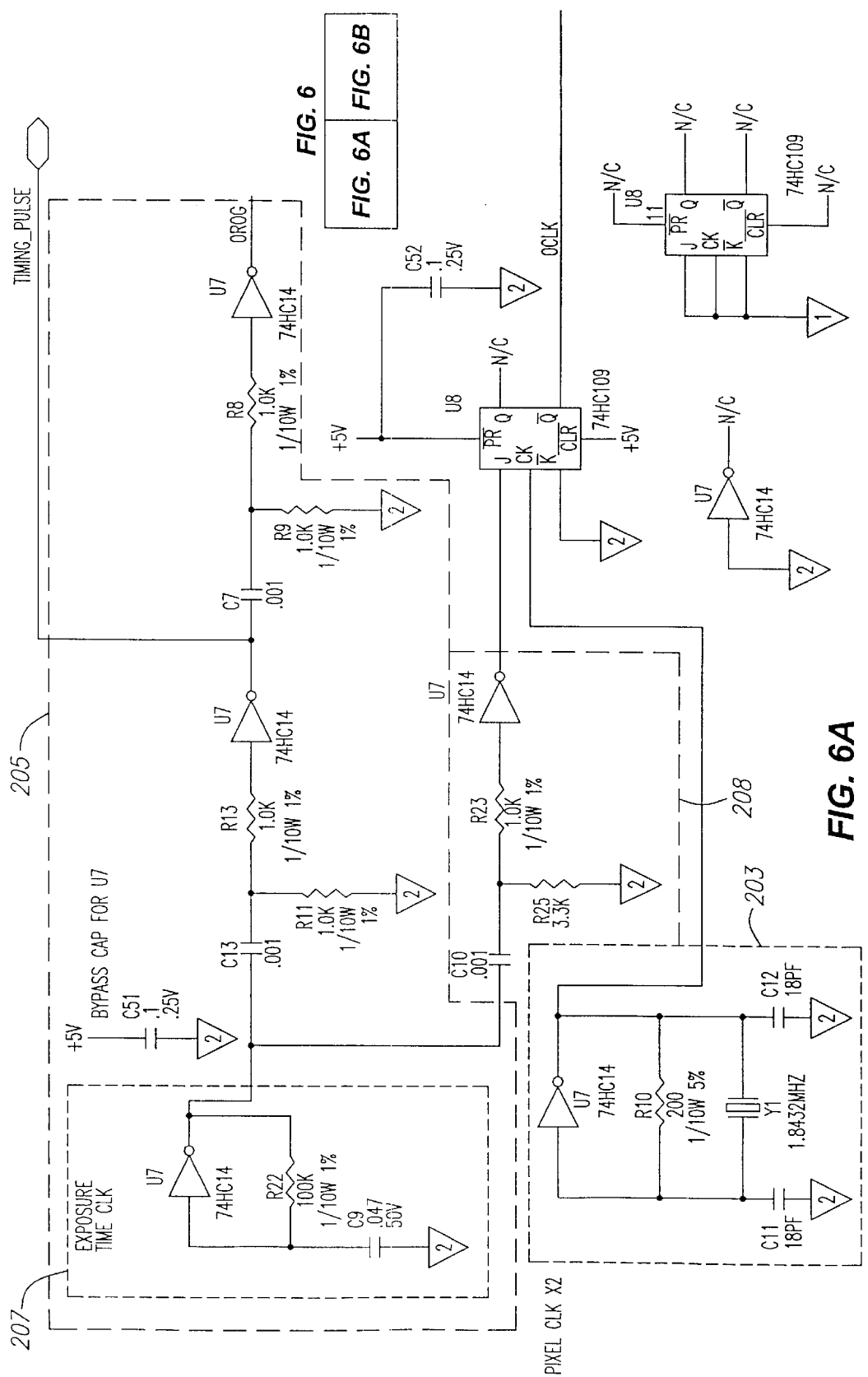

| ANGLE | INTENSITY |
|---|---|
| 0 | 100.0 |
| 10 | 94.1 |
| 20 | 78.0 |
| 30 | 56.2 |
| 40 | 34.4 |
| 50 | 17.1 |
| 60 | 6.2 |
| 70 | 1.4 |
| 80 | 0.1 |
| 90 | 0.0 |

LENS  FOCUS SHIFT

RAY SENSITIVE TO COMA
OPTICAL AXIS
LENS

SAGGITAL IMAGE
TANGENTIAL IMAGE
OBJECT

IDEAL "PETZVAL" SURFACE
SAGGITAL SURFACE
TANGENTIAL SURFACE

FIG 26A
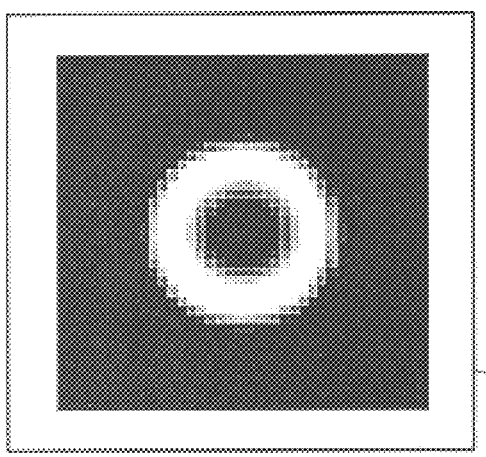
FIG 26B
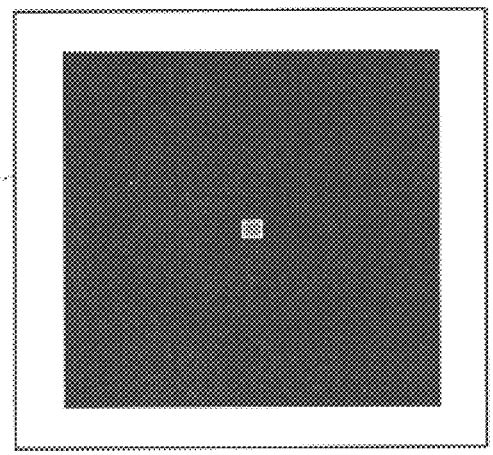
480
481
482
483
488
490
LINE SPREAD
FUNCTION
COMBINED ZONES
491  489  484
LINE SPREAD FUNCTION
FIG 26C

FIG 27A  FIG 27B
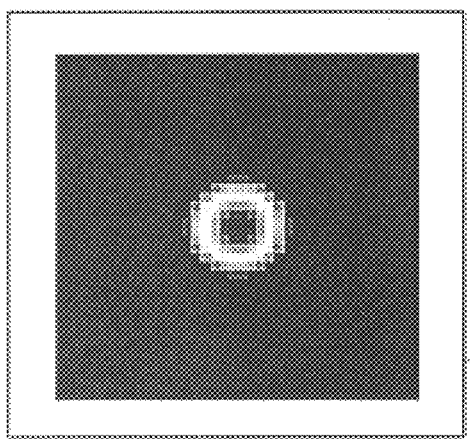
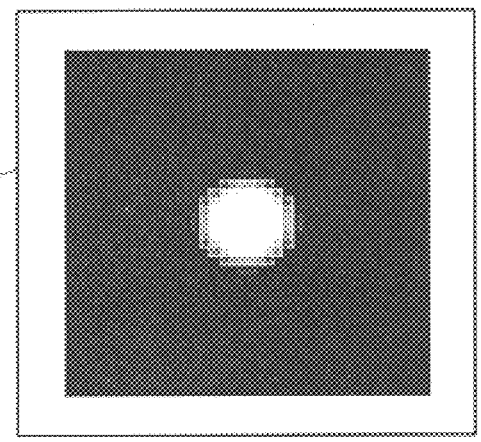
500
501
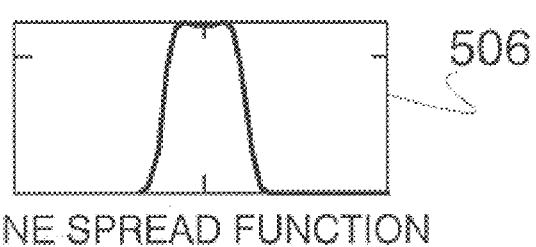
502
505
LINE SPREAD FUNCTION
COMBINED ZONES  503
506
LINE SPREAD FUNCTION
FIG 27C

FIG 28A
FIG 28B
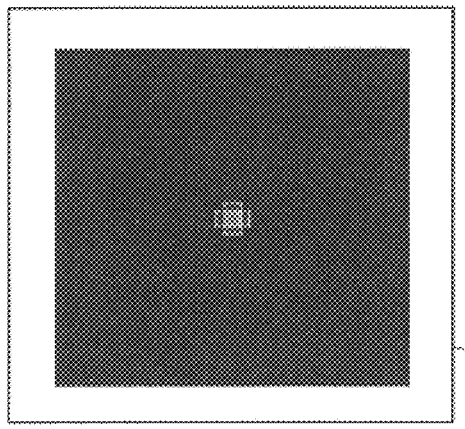
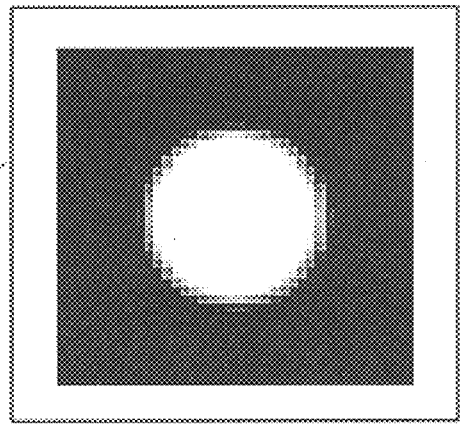
510
511
COMBINED ZONES
512
515
LINE SPREAD FUNCTION
516
LINE SPREAD FUNCTION
FIG 28C

FIG 29A
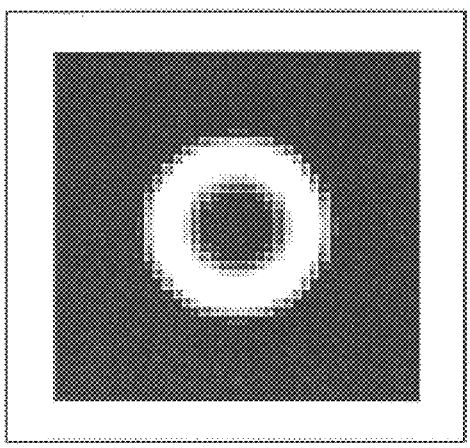
FIG 29B
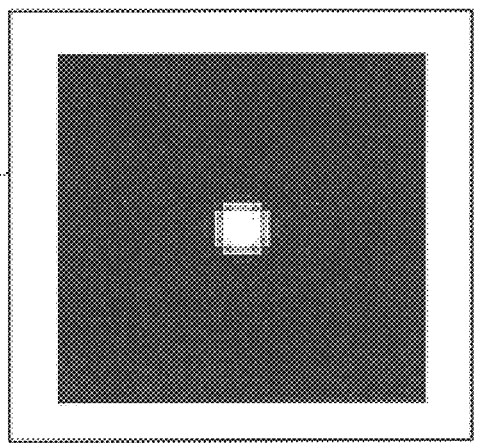
520
521
COMBINED ZONES
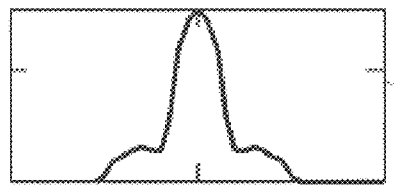
522
525
LINE SPREAD
FUNCTION
526
LINE SPREAD FUNCTION
FIG 29C FIG 30A
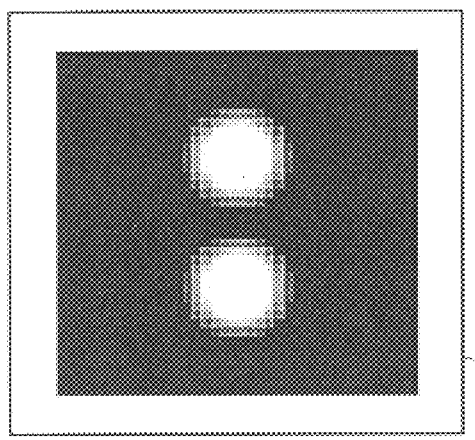
FIG 30B
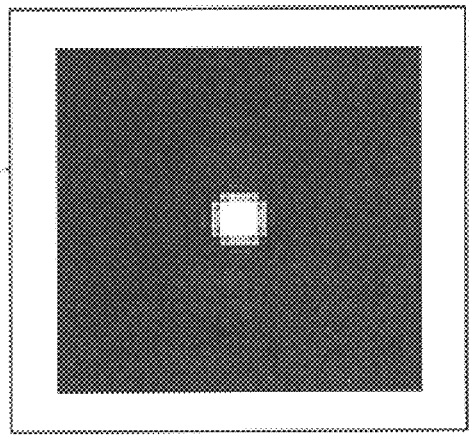
530
531
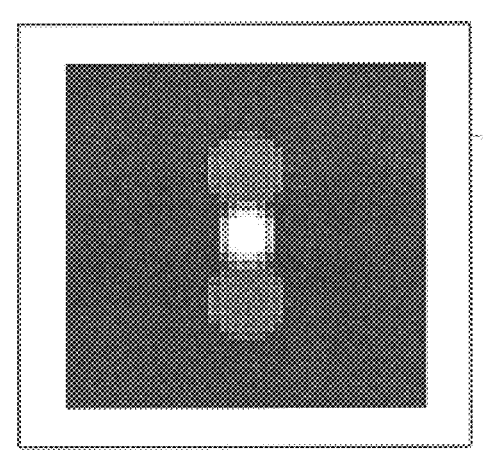
COMBINED ZONES
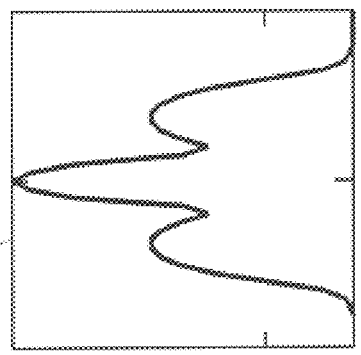
LINE SPREAD FUNCTION
532
535
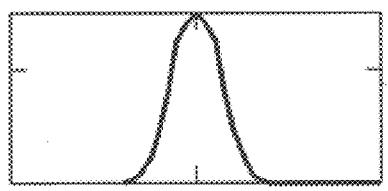
LINE SPREAD FUNCTION
536
FIG 30C

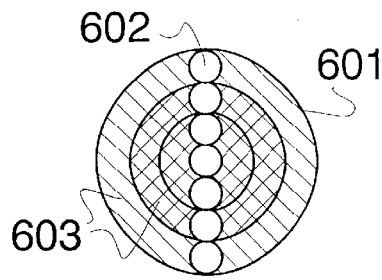
FRONT VIEW
FIG. 31A
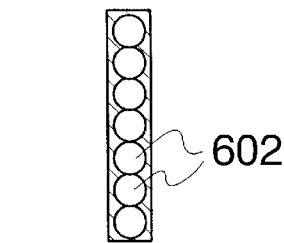
FRONT VIEW CLIPPED
FIG. 31B
SIDE VIEW
FIG. 31C
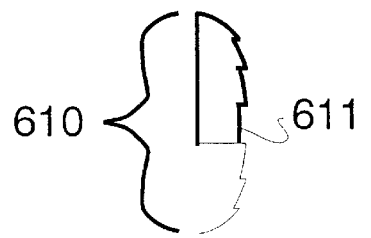
CUT SYMMETRIC LENS
ASYMMETRIC LENS
FIG. 32
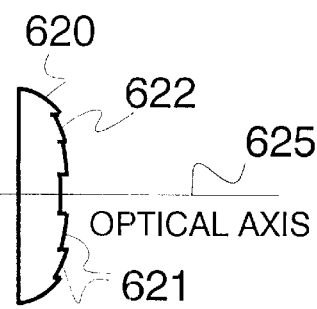
FIG. 33

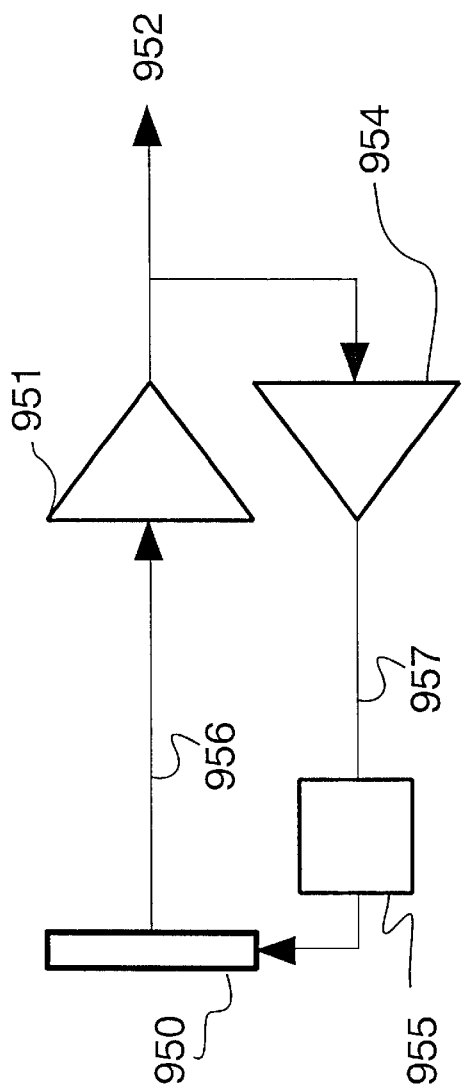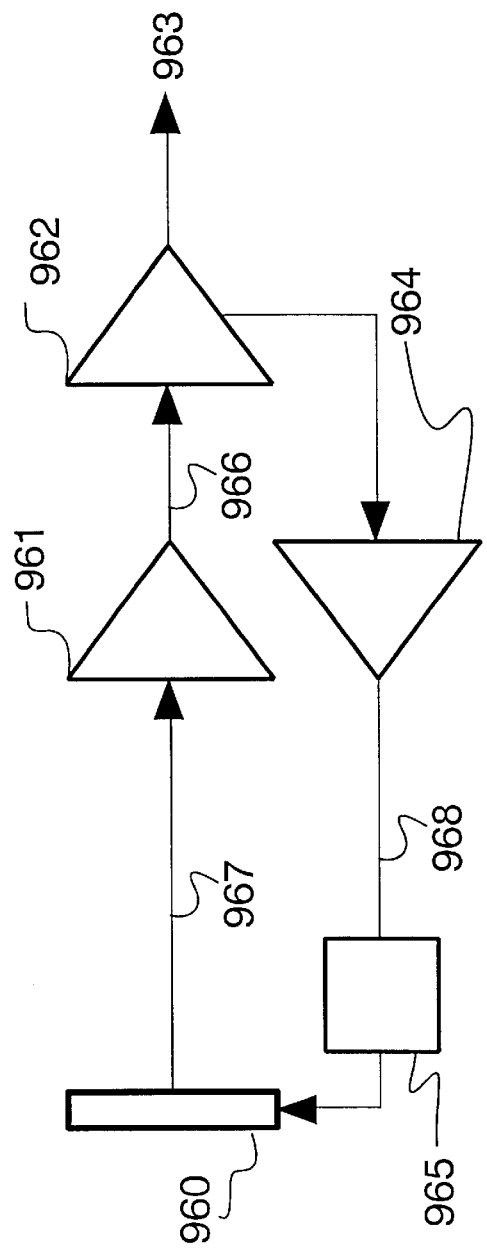
FIG. 44A
FIG. 44B

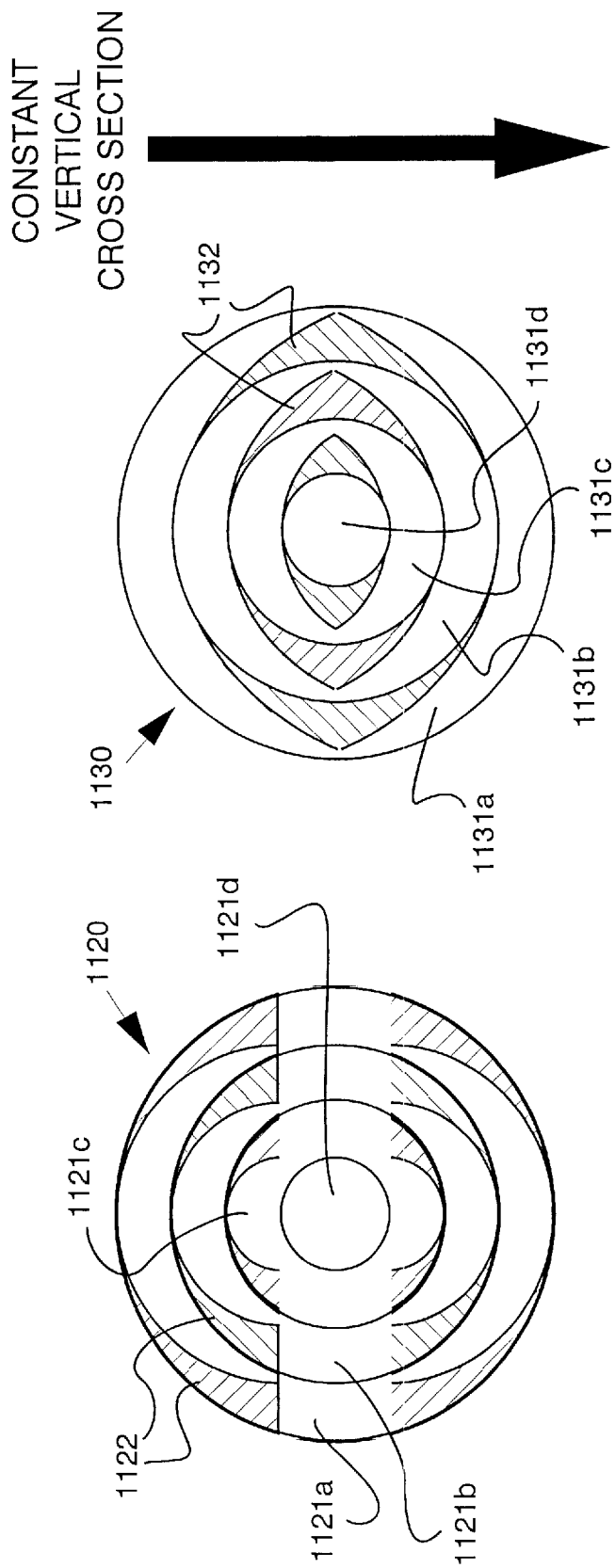

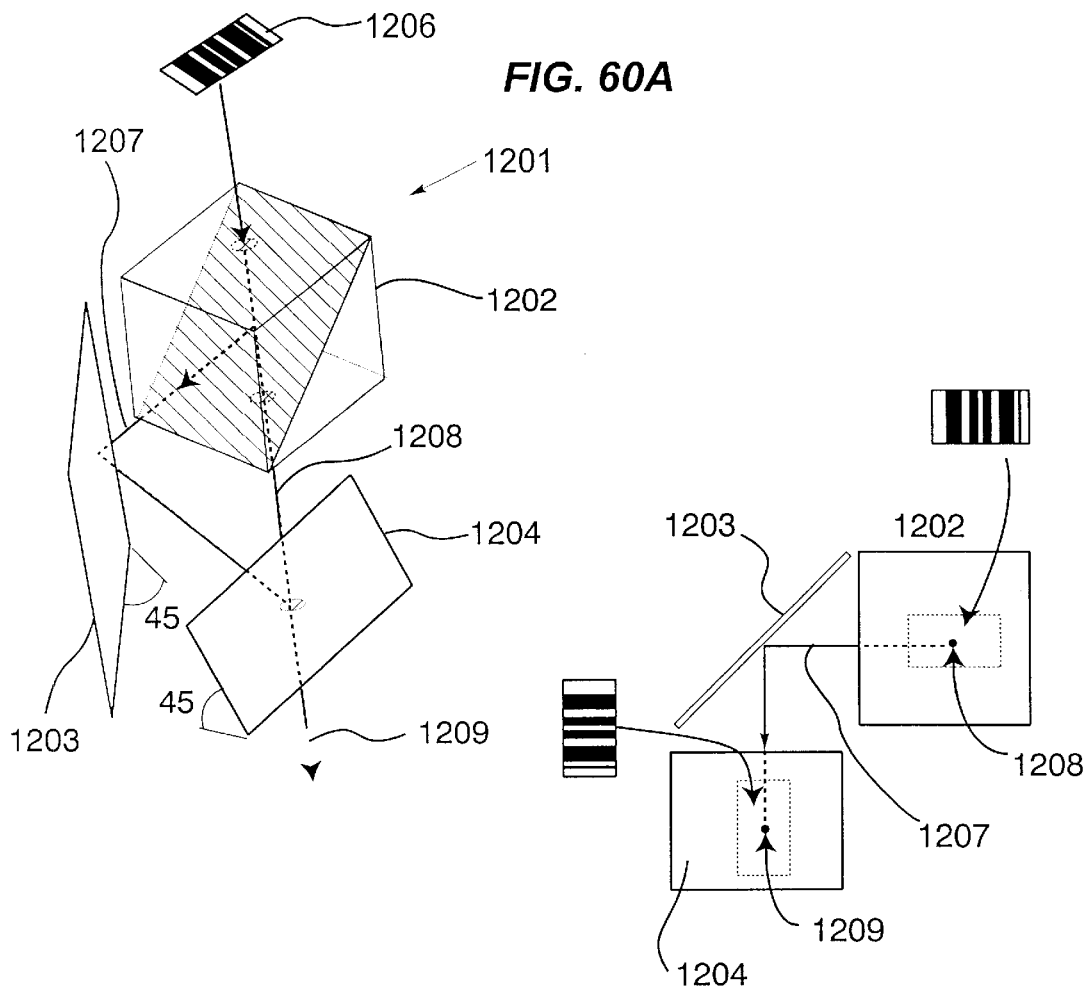
FIG. 60A
FIG. 60B
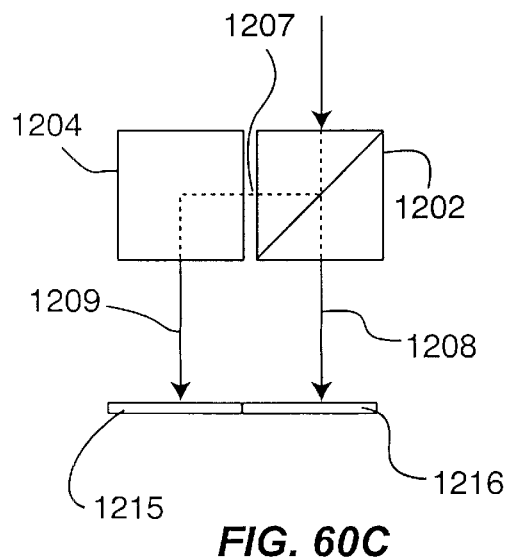
FIG. 60C

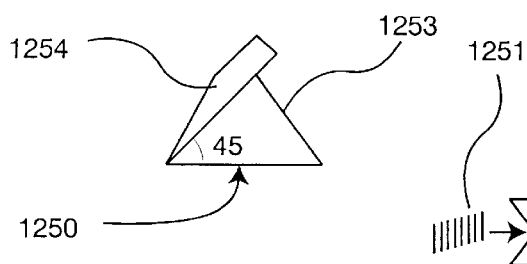
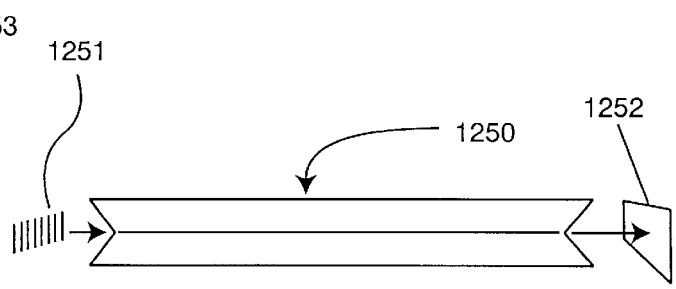
FIG. 62A
FIG. 62B
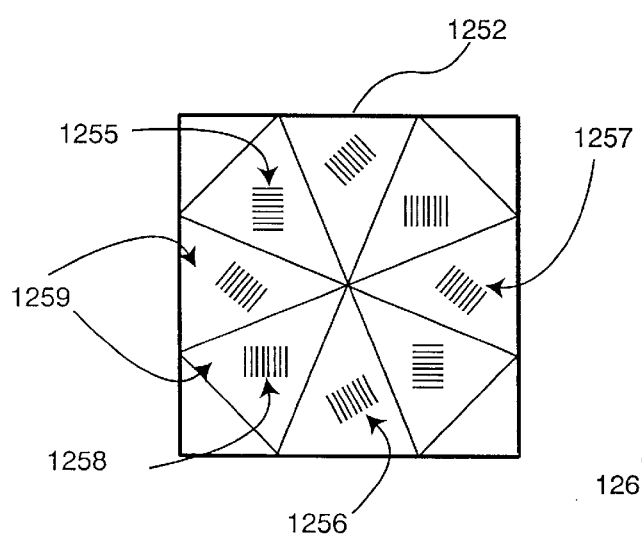
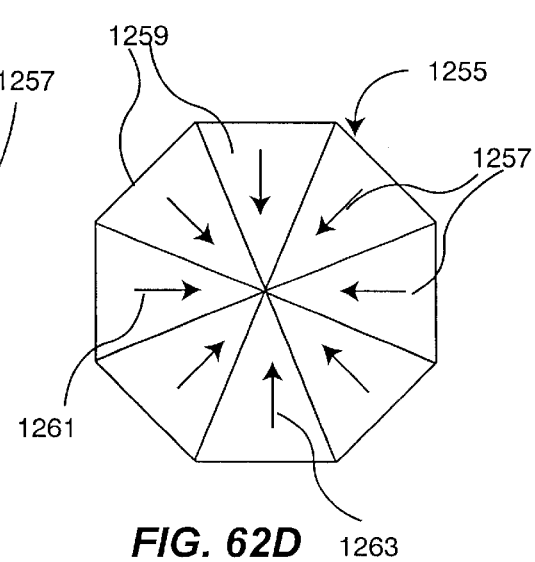
FIG. 62C
FIG. 62D
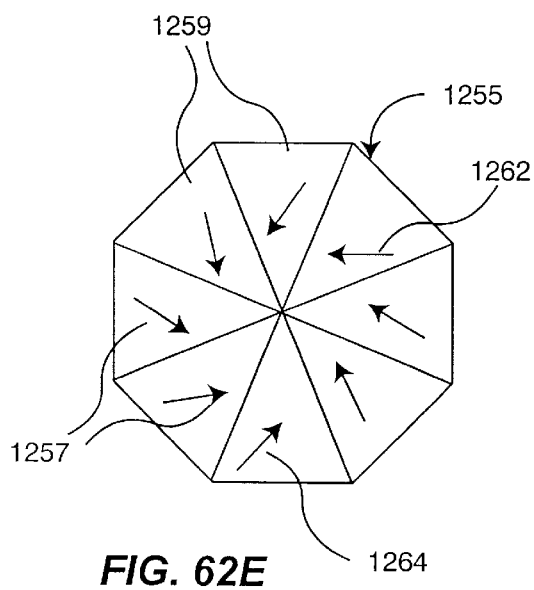
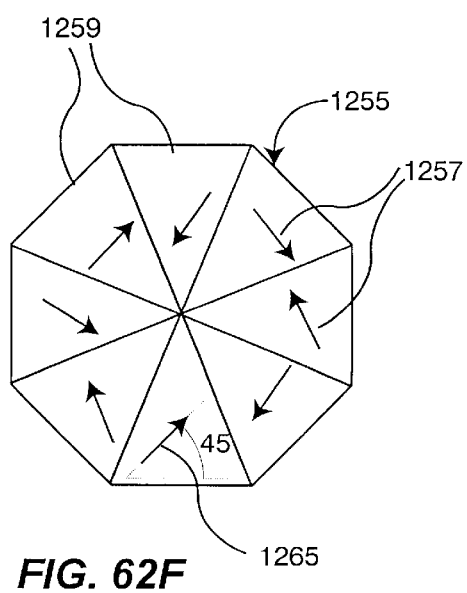
FIG. 62E
FIG. 62F

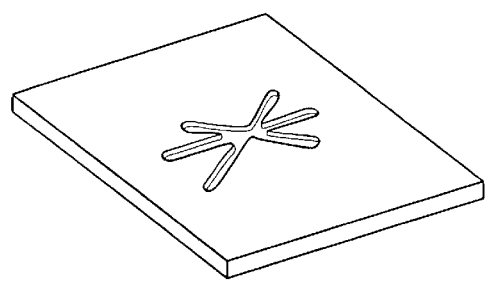
FIG. 64A
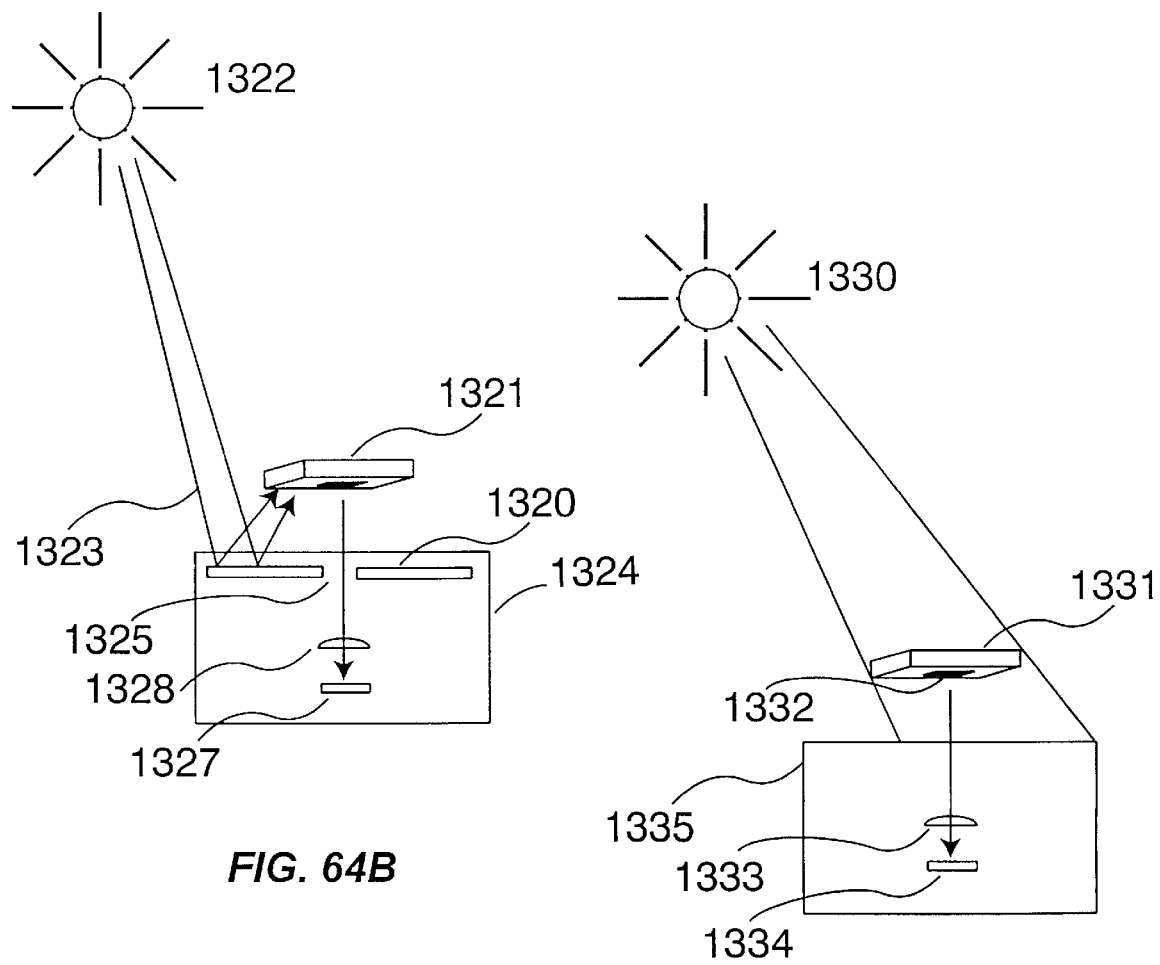
FIG. 64B
FIG. 64C

POINTER SHAPES

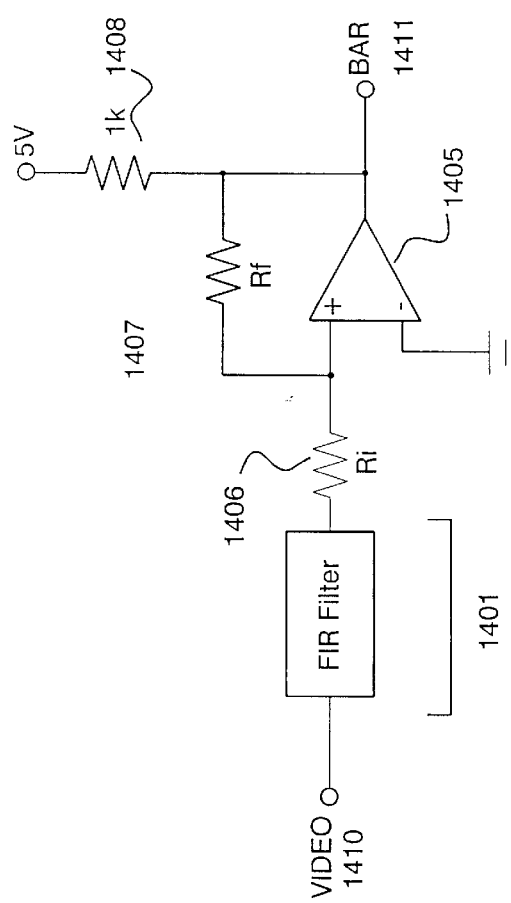
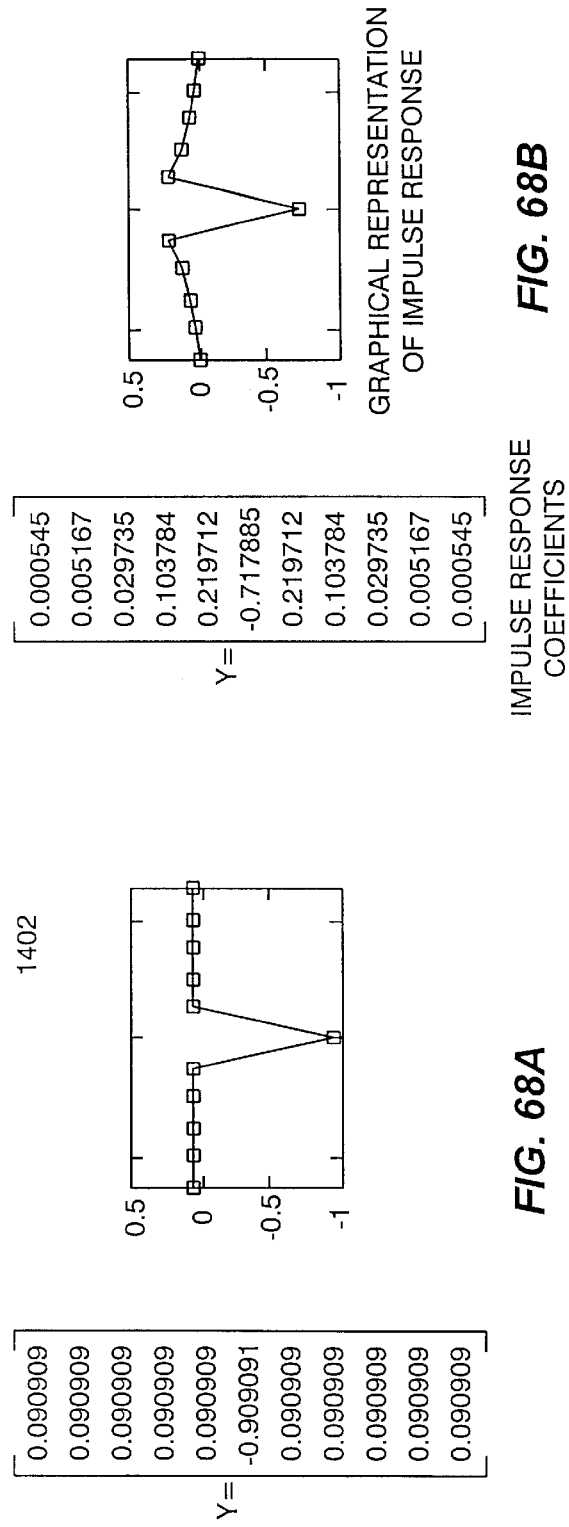
FIG. 67
FIG. 68A
FIG. 68B

| MATERIAL | POLYSTYRENE (REFRACTIVE INDEX 1.59453 @ 670nm) | | | | |
|---|---|---|---|---|---|
| SURFACE | ZONE 1 | ZONE 2 | ZONE 3 | ZONE 4 | SURFACE 2 |
| MIN DIAMETER | 0 | 0.88 | 1.57 | 2.3 | 0 |
| MAX DIAMETER | 0.88 | 1.57 | 2.3 | 3.04 | 8 |
| CENTER THICKNESS | 10.02177 | 10.01839 | 10.01163 | 10 | --- |
| CURVATURE | 0.117132 | 0.1083613 | 0.1028038 | 0.098305 | 0.056390 |
| CONIC CONSTANT | -1.051552 | -1.203817 | -1.04328 | -1.02966 | 6.259067 |
| $a_4$ | 1.4121652E-04 | 1.919756E-04 | 1.810303E-04 | 1.969244E-04 | 4.315737E-04 |
| $a_6$ | 0 | 0 | 0 | 0 | 0 |
| $a_8$ | 0 | 0 | 0 | 0 | 0 |
| $a_{10}$ | 0 | 0 | 0 | 0 | 0 |

$$SAG = \frac{cr^2}{1+\sqrt{1-(1+k)c^2r^2}} + a^4r^4 + a^6r^6 + a^8r^8 + a^{10}r^{10}$$

c = CURVATURE
k = CONIC CONSTANT (DIMENSIONS IN MILLIMETERS)

*FIG. 73C*

METHOD AND APPARATUS FOR READING IMAGES WITHOUT NEED FOR SELF-GENERATED ILLUMINATION SOURCE

RELATED APPLICATION INFORMATION

This application is a continuation of application Ser. No. 08/576,203, filed on Dec. 21, 1995, now U.S. Pat. No. 5,814,803, which is a continuation-in-part of application Ser. No. 08/363,258 filed Dec. 23, 1994, now U.S. Pat. No. 5,770,847 hereby incorporated by reference as if fully set forth herein.

FIELD OF THE INVENTION

The field of the present invention relates to image detection and, in particular, to a method and apparatus for reading images such as bar code labels while reducing or eliminating the need for a self-generated illumination source.

BACKGROUND OF THE INVENTION

Labels bearing information in any of a number of different encoded formats are commonly affixed to products, packaging, or other items and are used in many applications. It is common, for example, to encode retail product identification information in a bar code format on a product package or a label affixed to a product package. Bar code symbols are also used on a broad range of retail packages for check-out-and inventory purposes. A bar code reading device, located at the check-out station of a retail establishment, may be used by a clerk to read product identification data into an associated point-of-sale computer system.

A number of existing bar codes consist of a series of parallel light and dark rectangular areas of varying widths. The light areas are often referred to as "spaces" and the dark areas as "bars". The bars and spaces are typically arranged and selected so as to define different characters of a particular bar code.

A bar code label may be read by a device (e.g., a scanner) which detects reflected and/or refracted light from the bars and spaces comprising the characters. Such a device typically includes a light source for illuminating the bar code label to be read. One common method of illuminating the bar code label is by use of a scanning laser beam, in which case a spot of light is swept across the bar code label and the intensity of returned light is detected by an optical detector. The optical detector generates an electrical signal having an amplitude determined by the intensity of the detected light. Another method for illuminating the bar code label is by use of a uniform light source with an array of optical detectors connected to an analog shift register (commonly called a charge-coupled device or CCD). In such a technique, as with a scanning laser, an electrical signal is generated having an amplitude determined by the intensity of the collected light. In either the laser or CCD technique, the amplitude of the electrical input signal has one population of levels for dark bars and a second population of levels for light spaces. As a label is scanned, positive-going transitions and negative-going transitions in the electrical signal occur, signifying transitions between bars and spaces. The electrical signal may be converted to a binary scan signal which is analyzed to determine the arrangement of bars and spaces of the scanned label. The bar and space information is provided to a decoding unit to determine whether the bar code is recognized and, if so, to decode the information contained in the bar code.

An essential element of virtually every existing bar code reader system is a means for illuminating the bar code. Laser based scanners, for example, typically use a flying laser spot to illuminate the bar code and detect the returned light. Wand devices generally use a light emitting diode (LED) to illuminate a small portion of the bar code and a detector to image the bar code while the operator physically sweeps the illuminated beam across the bar code. Video based readers, such as readers utilizing charge-coupled devices to receive input, typically use a plurality of LED's to illuminate the entire bar code with uniform intensity, and then image the entire bar code with a CCD sensor.

Each of the above systems relies on self-generated illumination for the purpose of distinguishing the bars and spaces of the bar code or for increasing the amount of collected light to enable reasonable performance. The requirement of self-generated illumination may, however, lead to additional complexity, a larger or bulkier device, and/or higher power consumption. For example, a scanning device using a flying laser spot may require a patterned mirror structure, bifocal lens, laser light source, and motor to sweep the laser spot across a target. Each of these components adds complexity and bulk to the overall system. Furthermore, the motor used for sweeping the laser spot tends to be one of the least reliable components of a scanner, followed by the laser illumination source. The use of a motor and laser illumination source tends to make a system less reliable and more costly. In short, the requirement of a self-generated illumination generally makes an image reading system more complex, costly and unreliable. These drawbacks may be significant in certain applications, particularly in low-cost, handheld reading applications.

In addition, CCD readers often have significant depth of field limitations. For example, CCD readers using red LED's for illumination typically have a depth of field of less than one inch. This limits the types of applications in which CCD readers may be used, and limits the versatility of such CCD readers in general. Moreover, due to low sweep speeds, use of CCD readers has also generally been limited to handheld devices.

It would therefore be advantageous to provide a bar code reader capable of operation without self-generated illumination. It would further be advantageous to provide such a bar code reader having an increased depth of field, that may be utilized in a broad base of applications including handheld devices as well as other applications. It would further be advantageous to provide a bar code reader having a reduced number of moving parts and exhibiting increased reliability.

SUMMARY OF THE INVENTION

The invention provides in various aspects a method and apparatus for reading bar codes or other images while reducing or eliminating the need for self-generated illumination.

A preferred embodiment of the invention utilizes a CCD based imaging system. The imaging system comprises an adaptive exposure circuit which is used to prevent saturation of a CCD detector at high illumination levels, thereby increasing the system's dynamic range. The imaging system further comprises an efficient optical collection system, which may include an aperture with a high aspect ratio and/or a multi-plane imaging technique. The imaging system thereby may have an increased depth of field at a particular light level, or an increased read rate, or both. A correlated double sampling circuit is preferably used in conjunction with the CCD detector to allow lower light levels to be detected by the system. The correlated double sampling circuit may also provide an increased depth of field, an increased read rate, or both. The imaging system further takes advantage of derivative based signal processing for enhanced edge detection.

Various other embodiments may utilize some but not all of the above elements, or may include additional refinements, while obtaining the benefit of reducing or eliminating the need for self-generated illumination.

BRIEF DESCRIPTION OF THE DRAWINGS

The various objects, features and advantages of the present invention may be better understood by examining the Detailed Description of the Preferred Embodiments found below, together with the appended figures, wherein:

FIGS. 21A and 21B are diagrams showing an oblique view and a front view, respectively, of a symmetric multi-focal lens.

FIGS. 26A through 30C are approximated point spread function plots of various combinations of center and ring zones of various focal lengths.

FIGS. 31A–31C are diagrams of a symmetric multi-focus lens shown from several viewpoints with a plurality of apertures.

FIG. 32 is a diagram of a cut-away symmetric lens.

FIG. 33 is a diagram of an asymmetric lens having its optical axis in the center of the lens.

FIGS. 44A and 44B are block diagrams showing alternative configurations of an optical system employing an adaptive exposure circuit.

FIGS. 54A and 54B are diagrams of apodized poly-optic lenses for reducing inter-zonal interference.

FIGS. 62A–62F are diagrams associated with another embodiment of a multi-direction reader employing a kaleidoscope mirror for projecting multiple rotated images of a bar code onto a detector array.

FIG. 64A is a diagram of an optical diffuser, while FIG. 64B is a diagram illustrating the effect of a system employing the optical diffuser of FIG. 64A, and FIG. 64C is a diagram comparing the operation of a system without an optical diffuser.

FIG. 67 is a diagram of a signal processor circuit including a finite impulse response high pass filter.

FIGS. 68A and 68B are graphs of exemplary impulse response coefficients for the signal processor of FIG. 67, and FIGS. 69A and 69B are exemplary waveform diagrams also associated with the signal processor of FIG. 67.

FIG. 73C is a table showing preferred characteristics of the multi-focal lens of FIGS. 73A–73B.

DETAILED DESCRIPTION OF THE PREFERRED EMBODIMENTS

Figure 1:
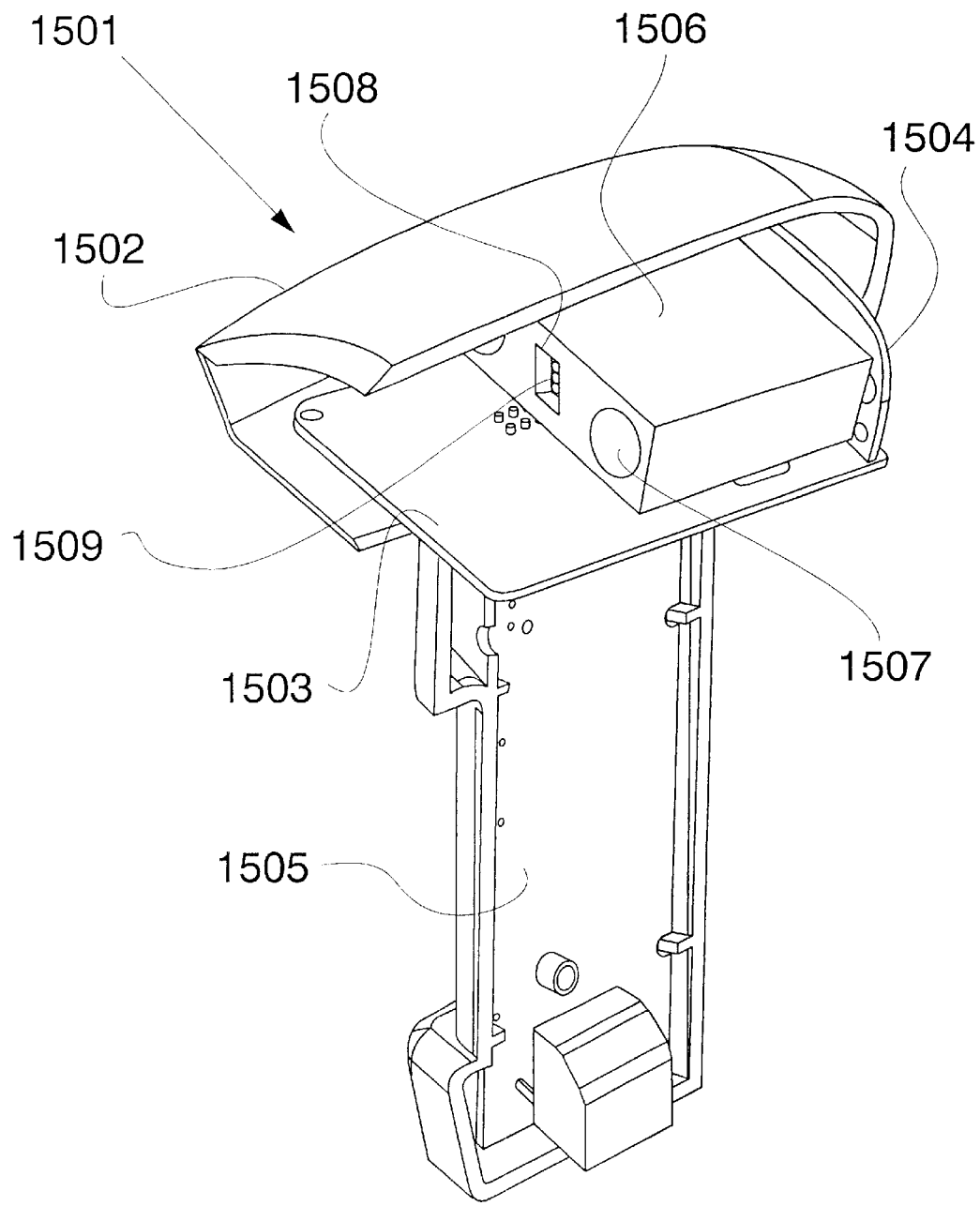
FIG. 1 is diagram showing a perspective partial cut-away view of a preferred handheld bar code reader using ambient light.

FIG. 1 is a cut-away view of a preferred embodiment of a bar code reader. The bar code reader 1501 depicted in FIG. 1 is a handheld unit with relatively large depth of field that can operate in ambient light by employing a preferred combination of the techniques and components as will be described in detail herein. The handheld bar code reader 1501 comprises a housing 1502 encasing most or all of the optical system and electronics. The bar code reader 1501 further comprises a digital board 1503 on which is mounted an optics chassis 1506, and an analog board 1504 connected to the back of the optics chassis 1506 and also connected to the digital board 1503. A handle board 1505 is also encased in a portion of the housing 1502 forming a handle below the scan head 1522.

The scan head 1522 and optics chassis 1506 are shown in more detail in FIGS. 70A–70C, along with other optical system and related components, and described in more detail later herein. On the optical chassis 1506 is mounted an imaging lens 1509 such as imaging lens 1749 shown in FIGS. 73A–73B. The imaging lens 1509 is preferably a multi-focus lens providing an enlarged depth of field. Details regarding a variety of suitable multi-focus lenses and other optical schemes, as well as preferred electronics for facilitating operation in ambient light, are described in more detail later herein.

Figure 1A:
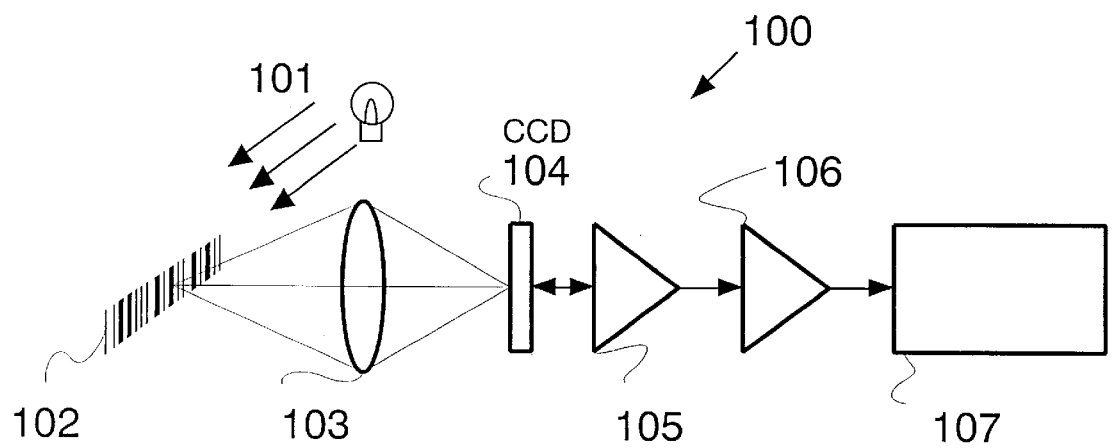
FIG. 1A is a block diagram of an optical reading system in accordance with one or more aspects of the present invention.

FIG. 1A is a block diagram of an image reading system 100 in accordance with one or more aspects of the present invention.

The image reading system 100 of FIG. 1A comprises an optical collection system 103, a CCD detector 104, a pre-amplification block 105, a signal processing block 106, and a decoding block 107. The optical collection system 103 operates in the presence of ambient illumination 101, gathering ambient light reflecting off a target (such as a bar code label 102) and focusing the gathered light on the CCD detector 104. The CCD detector 104 interacts with the pre-amplification block 105 to obtain a CCD input signal comprised of imaging data. The CCD input signal may be processed by the signal processing block 106 and provided to the decoding block 107 for decoding, as further explained herein.

Figure 2:
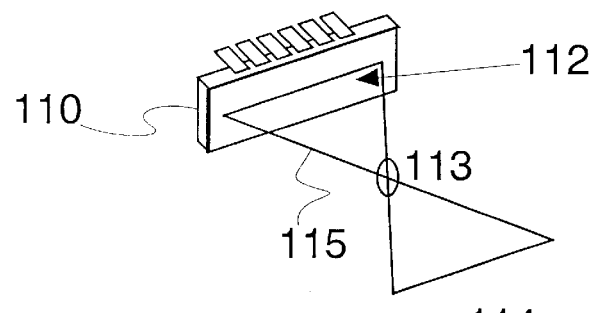
FIG. 2 is a diagram of a CCD detector receiving a focused beam of light.

FIG. 2 is a diagram of a CCD detector 110 receiving a focused beam of light 115. Light is reflected from a target located at a target line 114. The reflected light is passed through a lens 113 and focused onto the CCD detector 110. The CCD detector 110 may be embodied as a linear integrated chip comprising an array of photodiodes 112. In operation, the CCD detector 110 acts in a manner similar to a video camera, with the array of photodiodes 112 corresponding to pixel locations. The pixel size and spacing along with the focusing limitations of the lens 113 generally define the depth of field and the minimum bar code size for an imager incorporating such a CCD detector 110.

Figure 3A:
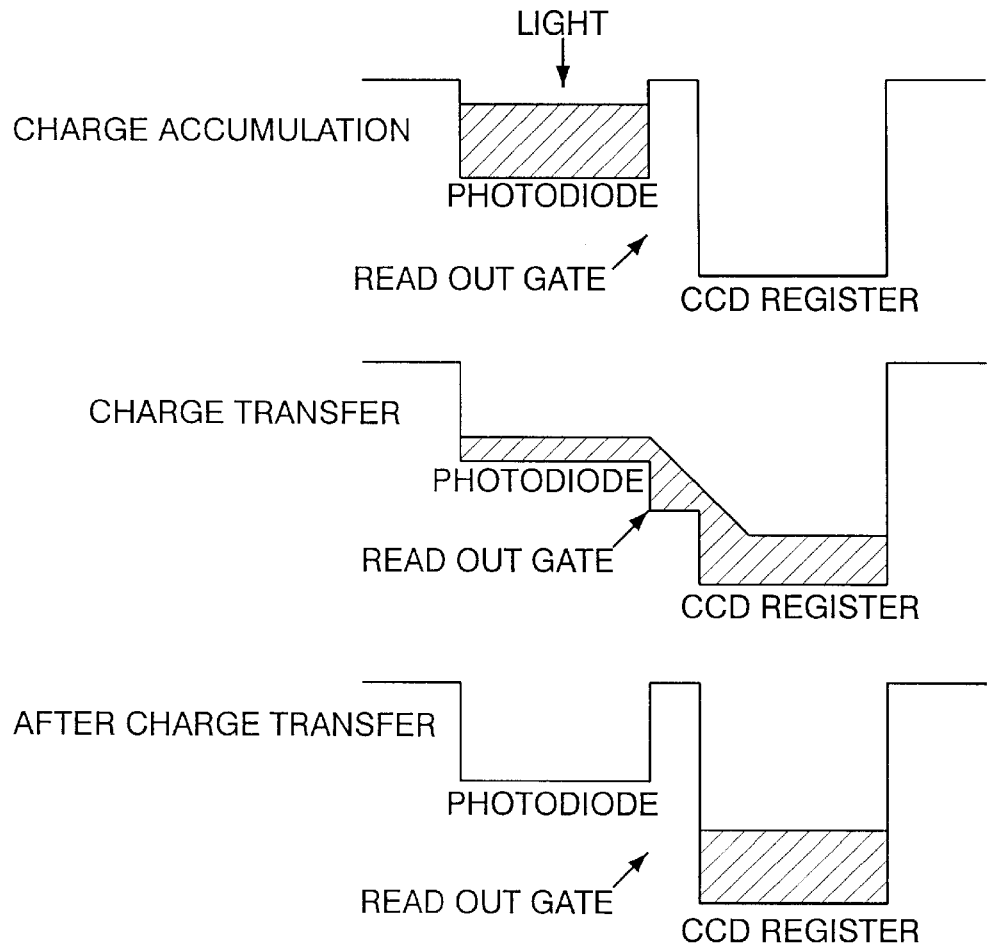
FIG. 3A is a potential diagram illustrating the processes of charge accumulation and charge transfer from a photodiode to a CCD shift register location.

Linear CCD detectors have four basic-elements. These four basic elements relate to photon to electron conversion, charge storage, charge transfer, and charge to voltage conversion. Photon to electron conversion is performed by multiple photodiodes (e.g., pixels 112). Typical photodiodes have a quantum efficiency of 50%, which means that one electron charge is generated for every two photons that hit the photodiode. The electron charges are stored in a potential well, which acts like a capacitor. When an exposure period is complete, a read out gate pulse received from a controller allows the accumulated charges to be dumped into a CCD shift register. A potential diagram illustrating the processes of charge accumulation and charge transfer from a photodiode to a CCD shift register location is shown in FIG. 3A.

Figure 3B:
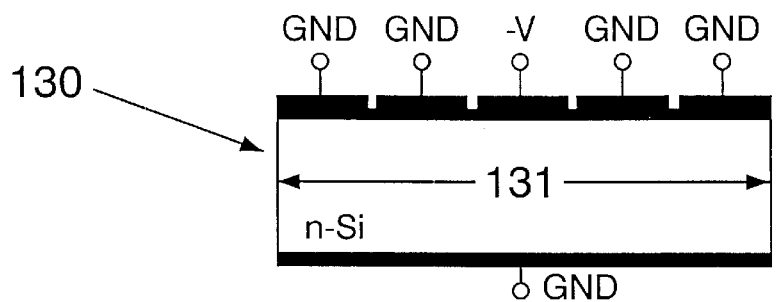
FIG. 3B is a physical illustration of a charge coupled device having five potential wells.
Figure 3C:
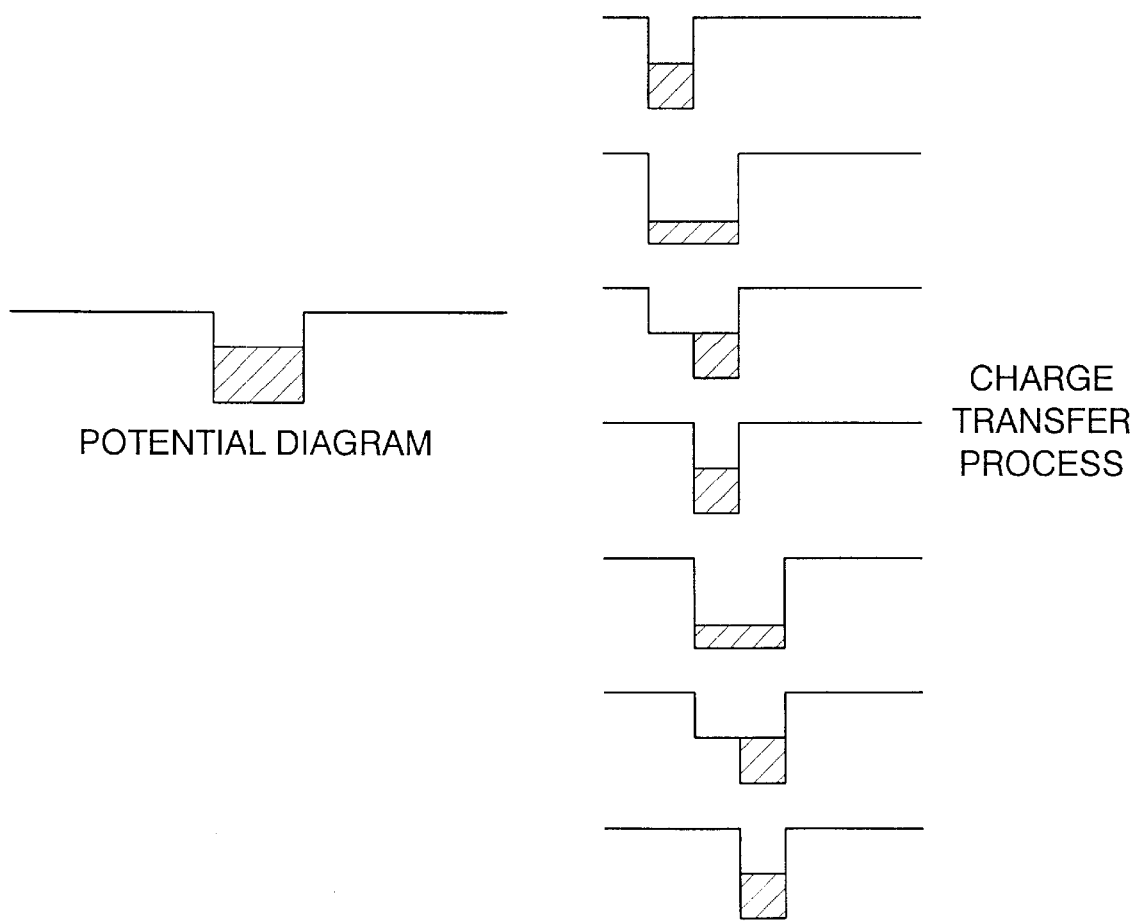
FIG. 3C is a potential diagram illustrating a transfer of charge along a CCD shift register.

Charge transfer along the shift register occurs while the photodiodes collect charge during the next exposure period. The charge coupled device may be embodied as a distributed gate metal-oxide silicon field-effect transistor (MOSFET) 130, a physical illustration of which is shown in FIG. 3B. The distributed gate MOSFET 130 has a long source-drain channel 131 and contains a plurality of gates 132 (one gate 132 per pixel 112). Charge is injected at each gate location (e.g., shift register location) by a photodiode, by the process depicted in FIG. 3A. Charge is transferred along a chain of shift register locations by controlling the gate voltages. For the MOSFET 130 of FIG. 3B, three clocks are needed to transfer the charge along the shift register. Photodiodes can thus inject charge every three gates. Alternatively, two clocks may be used so as to allow the photodiodes to inject charge every two gates. A potential diagram illustrating the described charge transfer process is shown in FIG. 3C.

At the end of the analog shift register, an amplifier converts the charge to voltage. This conversion is typically accomplished by allowing a capacitor to integrate the charge and then buffering the voltage to an output pin. A MOSFET is used to clear the charge from the capacitor between transfers of each pixel. The conversion process may also involve amplification of the converted voltage level. The output voltage generally has a DC bias level equal to about half of the power supply voltage. The higher the input light intensity, the lower the DC bias voltage, as the photoelectric charge is in the form of injected electrons.

Figure 4:
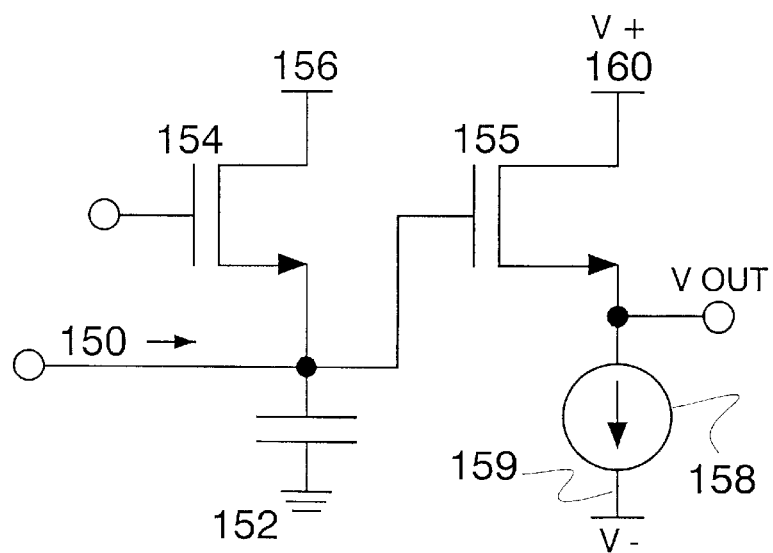
FIG. 4 is a diagram of a simplified output stage of a CCD detector.

FIG. 4 is a diagram of a simplified output stage of a CCD detector 110 such as shown in FIG. 2. In FIG. 4, a flow of electrons 150 is accumulated by an integration capacitor 152 (also referred to a sense capacitor). A transistor 154, such as a MOSFET, clears the stored charge between each pixel. The MOSFET 154 may be referred to as a reset transistor or a reset MOSFET. The MOSFET 154 is connected to a reference voltage source 156. The voltage level of the sense capacitor 152 may be read through a buffer stage 155, which also may comprise a MOSFET. The buffer MOSFET 155 is connected at one end to a positive bias voltage 160, at the other end through a current sink 158 to a negative bias voltage 159. In one embodiment, the current sink 158 comprises a resistor, and the negative bias voltage 159 is set to ground level.

Further information pertaining to the operation of charge-coupled devices may be found in J. Millman, *Microelectronics, Digital and Analog Circuits and Systems*, (McGraw-Hill 1979), pp. 298–312, J. D. Mosley, "CCD Imaging Arrays," *EDN Magazine*, (Aug. 20, 1990), pp. 116–126, and in the 1993 *Linear Sensor IC Databook* published by Sony Corporation.

Figure 5:
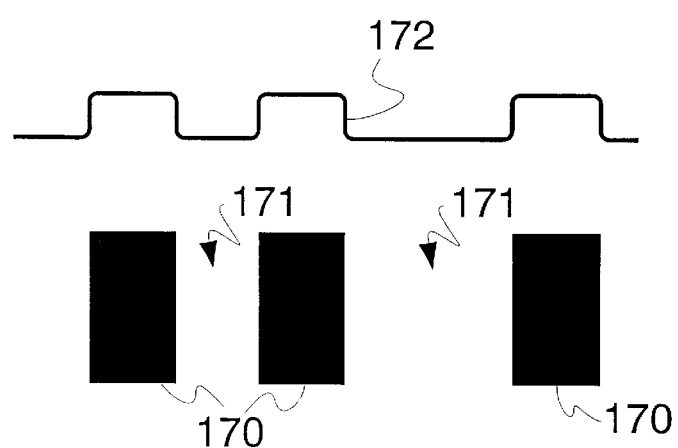
FIG. 5 is a diagram of a bar code and a corresponding waveform after filtering.

The CCD detector 110 provides data in the form of a discrete time analog signal. The analog signal appears similar to "stair-steps", with data from each pixel contributing to one of the steps. Most CCD chips have an output signal that is in a low state when the image is bright (white) and a high state when the image is dark (black). The signal output from the CCD detector 110 may be low pass filtered to arrive at a smooth signal, such as shown in FIG. 5. In FIG. 5, an exemplary portion of a bar code is shown having darker bars 170 and lighter spaces 171. A corresponding CCD output signal 172 is shown, after low pass filtering, above the bar code portion. The filtered CCD output signal 172 is shown in a high state when the darker bars 170 are read, and a low state when the lighter spaces 171 are read. The CCD output signal 172 may have a sizable DC component (e.g., 4.5 volts).

The amplitude of the CCD output signal 172 depends mainly on the sensitivity of the photodiode array and the exposure time. During the exposure time, the photodetectors in the CCD detector 110 collect charge. Periodically, the accumulated charge is dumped into an analog shift register. The information in the analog shift register is serially read out to form an analog CCD signal which, when filtered, corresponds to the CCD output signal 172.

All of the accumulated data must be transferred from the photodetectors and read out between exposures, so that residual charge does not distort the data from the next exposure period. If it is required to have an exposure time faster than the data read out time, a shuttered CCD device may be used, thereby allowing the exposure time to fill some fraction of the read out time.

The CCD detector 110 may particularly be embodied as a CCD chip of the ILX series as manufactured by Sony, such as an ILX-503A chip (having 2048 pixels) or ILX-505A chip (having 2592 pixels). The Sony ILX-703A may be used in applications requiring an electronic shutter. Descriptions of these devices may be found in the Sony 1993 CCD Linear Sensor IC Databook.

Figure 6B:
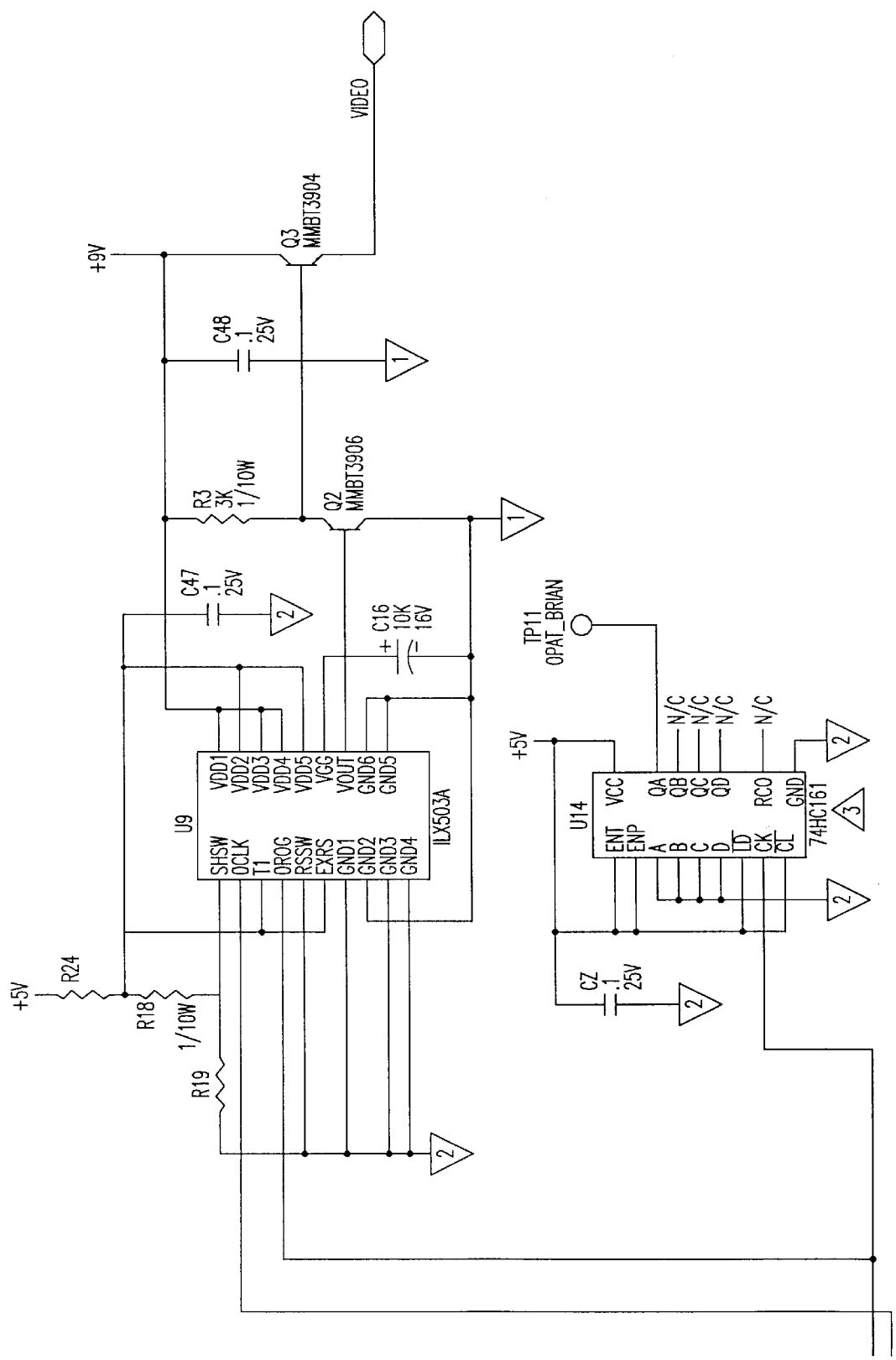
FIG. 6 is a circuit diagram of a driver circuit for driving a CCD chip.

FIG. 6 is a circuit diagram of a driver circuit suitable for driving an ILX-503 or ILX-703 CCD chip 204. The FIG. 6 driver circuit generates a pixel clock signal ($\phi$CLK) 201 and a read out gate clock signal ($\phi$ROG) 202 to facilitate transfer of charge from the photodetectors to the analog shift register. The pixel-clock signal 201 is generated by a resonator oscillator circuit 203 as depicted in FIG. 6. The read out gate clock signal 202 is generated by a read out gate clock generator circuit 205 as also depicted in FIG. 6. The read out gate clock generator circuit 205 comprises an oscillator circuit 207 followed by a pair of one-shot circuits. Another one-shot circuit 208 acts to temporarily disable the pixel clock signal 201 when the read out gate clock signal 202 is generated. The CCD chip 204 generates a CCD video output signal 206.

The CCD output signal 206 may, as noted, be provided to a low-pass reconstruction filter and thereafter to other circuitry for signal processing, decoding and other functions as further described herein. The low-pass reconstruction filter may be embodied as part of the pre-amplification block 105 or the signal processing block 106. The low pass filter preferably is constructed so as to block out signals having a frequency higher than one-half the frequency of the pixel clock signal 201. The low pass filter preferably has a steep filtering characteristic, since a gradual filter may increase the number of pixels per bar required for reading a bar code. The low pass filter may also provide gain, if necessary, depending on the light level and the exposure time.

To achieve necessary coverage, multiple linear CCD arrays may be used for imaging. Sensitivity tends to decrease with larger imagers, making the use of multiple linear CCD arrays preferable in certain applications. Moreover, cost tends to increase geometrically with larger CCD arrays. Although a number of embodiments are described herein in terms of linear CCD arrays, it should be noted that many principles of the embodied devices described are applicable to area CCD sensors as well.

Figure 7:
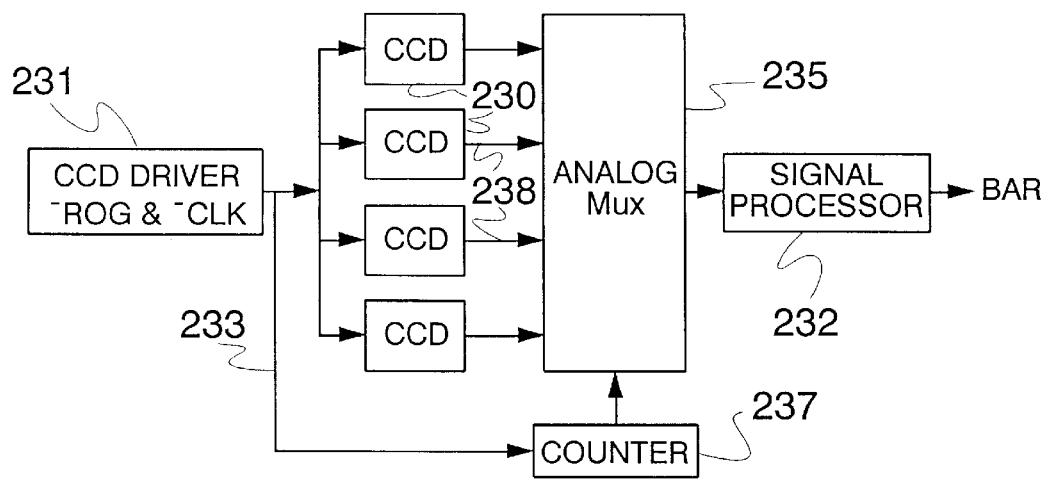
FIG. 7 is a block diagram of a multiple-CCD detector system.

FIG. 7 is a block diagram of a multiple-CCD detector system, which may be configured, for example, to implement a low-cost multiple scan line system. In FIG. 7, a plurality of CCD detectors 230 are clocked by a single CCD driver circuit 231, such as shown previously in FIG. 6. The CCD. driver circuit 231 provides a pixel clock signal and a read out gate clock signal 233 to each of the CCD detectors 230. The CCD detectors 230 are coupled to a signal processor 232 via a high speed analog multiplexer 235, which selects the CCD detectors 230 in sequence for processing. A counter 237 may be coupled to the CCD driver circuit 231 so as to count clock pulses and switch the high speed analog multiplexer 235 at appropriate times. The signal processor 232 receives a CCD output signal 238 from each CCD detector 230 in sequence, as controlled by the analog multiplexer 235, and thereby processes the CCD output signals 238 repetitively, in a sequential fashion.

The CCD detectors 230 may be physically placed in a variety of different patterns so as to generate a desired imaging pattern. The CCD detectors 230 may be completely separate, mounted on a common circuit board, or constructed on the same chip substrate.

There are a variety of sources of noise in CCD chips which may need to be accounted for in designing a CCD-based optical system. Four sources of noise in particular are noted here. The first is photodetector shot noise, which may be described by the following equation:

$$I_{rms} = \sqrt{(2eI_d B)}$$

where $I_d$ is the dark current (in amps) of the photodetector, B is the bandwidth of the system (in hertz), and e is the charge on an electron (i.e., $1.6 \times 10^{-19}$C). Dark current $I_d$ is a strong function of temperature, doubling every 25° C. (in the case of the ILX-503A chip). The effect of photodetector shot noise becomes more pronounced the longer the photodetector integrates. Thus for longer exposure times, the photodetector shot noise will increase. The effect of this shot noise, however, tends to be offset by the fact that longer exposure leads to more signal. The signal-to-noise ratio due to shot noise is proportional to the square root of the exposure time.

A second source of noise is associated with the process of charge transfer. This source of noise results from surface states (i.e., 1/f) and thermal noise generated by the charge transfer MOSFET. Charge transfer noise manifests as a linear growth of noise from the starting pixel to the ending pixel. While the first pixel to be transferred stays in the charge transfer register for only a short time, the last pixel remains much longer, therefore accumulating much more noise than the first pixel. Because charge transfer efficiencies are generally high, this noise is usually not significant enough to degrade performance.

A third source of noise is known as kTC noise. This type of noise is caused by a switched capacitor effect related to the reset transistor at the end of the CCD chain. A similar effect may also occur in switched capacitor filters. This source of noise is typically the dominant noise source in the CCD chip, but can be mitigated or removed by other techniques discussed herein, such as correlated double sampling.

Figure 9A:
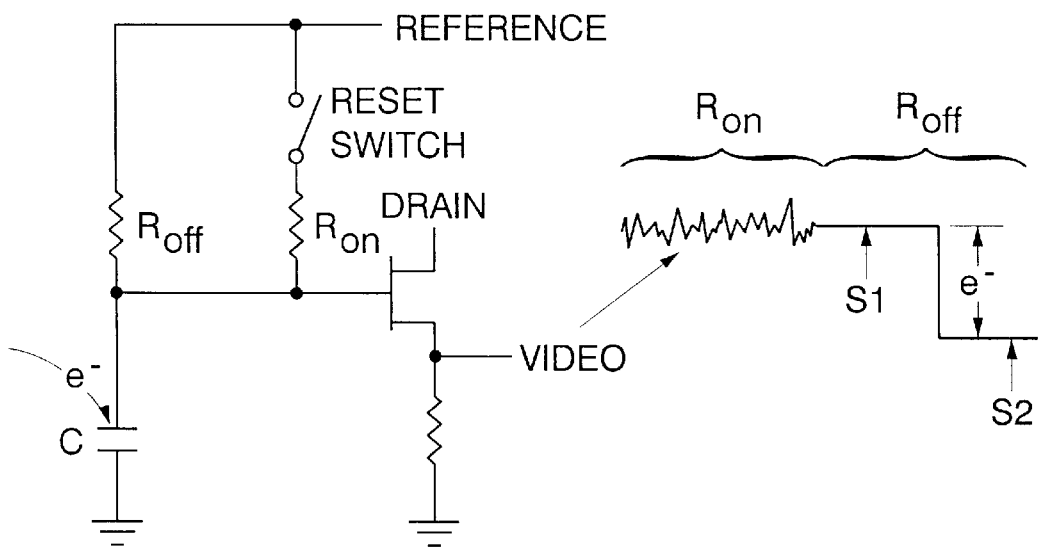
FIG. 9 is a circuit diagram of a CCD output stage.
Figure 9B:
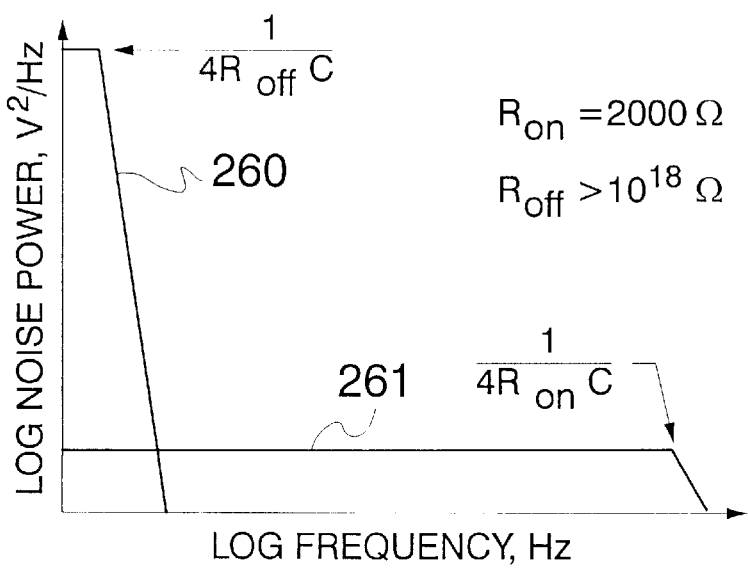

A graph of kTC noise power as a function of frequency is shown in FIG. 9B for a CCD output stage shown in FIG. 9A. The CCD output stage in FIG. 9A corresponds to that of FIG. 4, except that the reset MOSFET 154 in FIG. 4 is modelled by its internal resistances in an OFF state (i.e., $R_{off}$) and in an ON state (i.e., $R_{on}$). In FIG. 9B, one graph 260 shows kTC noise power when the reset MOSFET 154 is turned off and thus has a resistance of $R_{off}$ while another graph 261 shows kTC noise power when the reset MOSFET 154 is turned on and thus has a resistance of $R_{on}$.

A fourth source of noise results from the charge-to-voltage conversion process. The charge-to-voltage amplifier is subject to surface states (i.e., 1/f) and thermal noise of the FET, as well as thermal noise due to other resistances. This noise source dominates after the kTC noise and is not affected by exposure time. This noise source has only a weak temperature dependance.

Figure 8A:
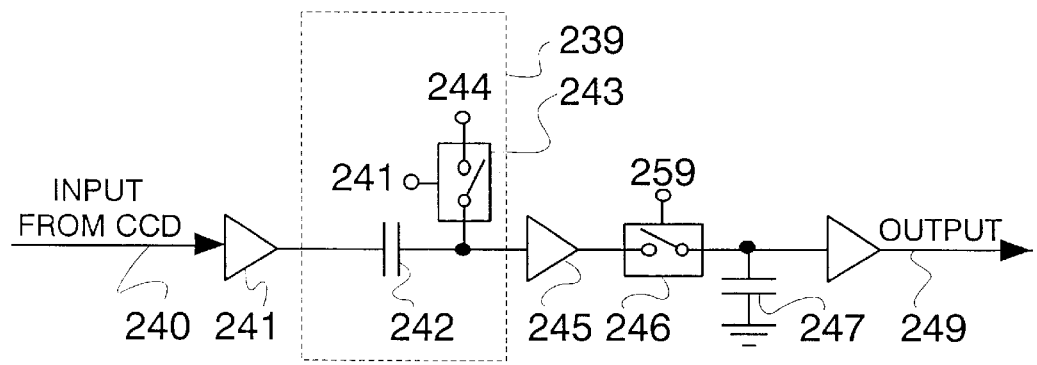
FIG. 8A is a block diagram of a correlated double sampling circuit.
Figure 8B:
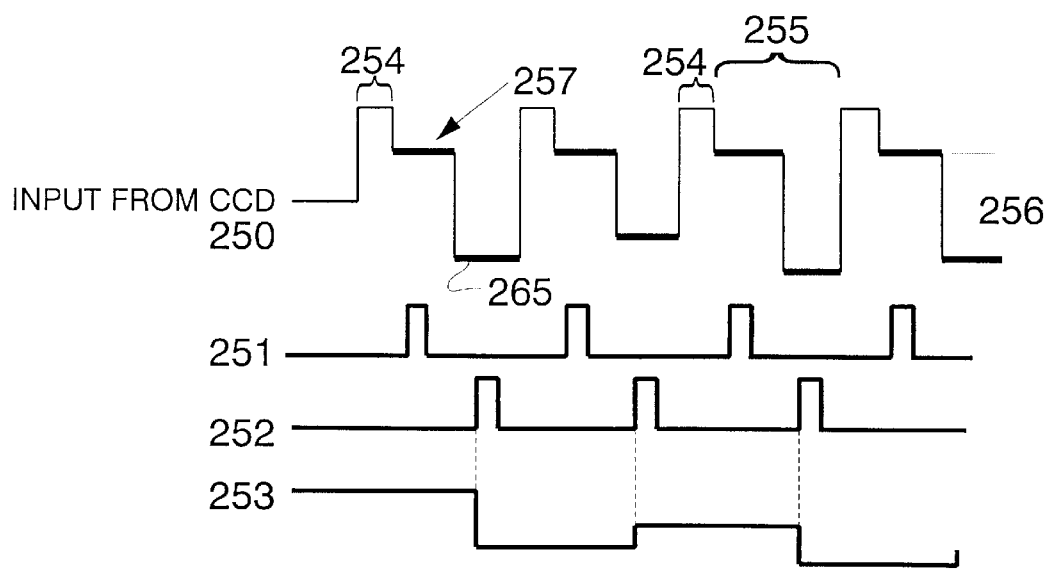
FIG. 8B is a graph of waveform diagrams associated with the sampling circuit of FIG. 8A.

FIG. 8A is a block diagram of a particular type of correlated double sampling circuit such as may be employed to reduce kTC noise. FIG. 8B is a diagram of waveforms illustrating some of the noise reduction properties of the circuit of FIG. 8A.

A correlated double sampling circuit such as shown in FIG. 8A may advantageously be employed to remove reset noise generated by the periodic resetting of the sense node by the reset MOSFET in the CCD output stage (shown, e.g., in FIG. 9A), thereby improving signal-to-noise ratio. In general, reset noise may be expressed in terms of the following relationship:

$$N_r(V) = \sqrt{(4kTBR)}$$

where k=Boltzmann's constant=$1.38 \times 10^{-23}$, T=absolute temperature (Kelvin), B=noise power bandwidth (Hertz), and R=resistance (Ohms). The correlated double sampling circuit generally operates by sampling the CCD output voltage once after the reset pulse has been switched off and once again after signal charge has been read out, thereby providing a direct measurement of charge. This charge measurement is generally independent of reset noise, since the reset noise will be "correlated" over the duration of a pixel period. In other words, the noise voltage due to the channel resistance will not change over the period when the two samples are taken, allowing the reset noise to be eliminated externally from the CCD chip.

As shown in FIG. 8A, an input signal 240 (such as output from CCD chip 204 of FIG. 6) is buffered by an amplifier 241. The output of the amplifier 241 is connected to a DC restoration circuit 239 comprising an analog switch 243, a capacitor 242, and a bias voltage 244 (which may be ground), configured as shown. A clamp signal 255 controls the analog switch 243. The DC restoration circuit 239 is connected to another buffer 245. Buffer 245 is connected to another analog switch 246. The analog switch 246 is controlled by a sample signal 259. The other end of the analog switch 246 is connected to a capacitor 247 and to another buffer 248. Buffer 248 outputs an output signal 249.

The input signal 240 may appear, for example, like the illustrative input waveform 250 of FIG. 8B. The waveforms of FIG. 8B have been idealized somewhat for purposes of explanation. The heavier shaded lines in the sample input waveform 250 illustrate relatively low frequency noise 257 appearing in the input signal 240. A feedthrough pulse 254 occurs in the input waveform 250 when the reset MOSFET is active. During the interval of the feedthrough pulse 254, relatively high bandwidth noise may occur. However, once the feedthrough pulse 254 is ended and the reset MOSFET is inactive, a generally low frequency, constant noise pattern will be expected. This low frequency noise 257 occurring in the interval 255 between feedthrough pulses 254 may be removed or substantially reduced by the correlation operation of the circuit of FIG. 8A.

In operation, the input signal 240 is applied to the input buffer 241. When the clamp signal 255 (shown as waveform 251 in FIG. 8B) is active, the capacitor 242 is coupled to the bias voltage 244 through the analog switch 243. The capacitor 242 is thereby charged to the reset voltage level 256, as shown in relation to waveform 250 of FIG. 8B. The clamp signal 255 is then deactivitated, releasing the clamp (i.e., opening the analog switch 243) but allowing the capacitor 242 to remain charged at the reset voltage level 256.

The input waveform 250 then switches to a level 265 determined by the amount of charge collected by a particular photodiode in the CCD detector. The output of the buffer 241 follows the input waveform 250, which forces the opposite end of the capacitor 242 to a new voltage level, since the capacitor 242 maintains the same voltage across it that it had prior to the changing levels in the input waveform 250. The voltage at the input of the buffer 245 therefore comprises the difference between the voltage level 265 of the input waveform and the reset voltage level 256. Because the reset voltage level 256 of the input waveform 250 contains noise 257 that is correlated over a pixel period, common mode noise is thereby removed from the output of the DC restoration circuit 239.

The voltage level of the capacitor 242 is sampled when the sample signal 259 (shown as waveform 252 in FIG. 8B) is activated. When the sample signal 259 is activated, capacitor 247 charges to a voltage level determined by the voltage of the capacitor 242. The sample signal 259 is then deactivated, causing switch 246 to open, while capacitor 247 holds the voltage level until the next sample period of sample signal 259.

An output waveform 253 associated with input waveform 250 is also shown in FIG. 8B. The output waveform 253, such as may appear at the output signal 249 of the correlated double sampling circuit of FIG. 8A, comprises a sequence of sampled voltage levels of the input waveform 250, and is offset by the bias voltage 244. As noted, the output waveform 253 generally has a significant reduction in common mode noise.

Figure 10A:
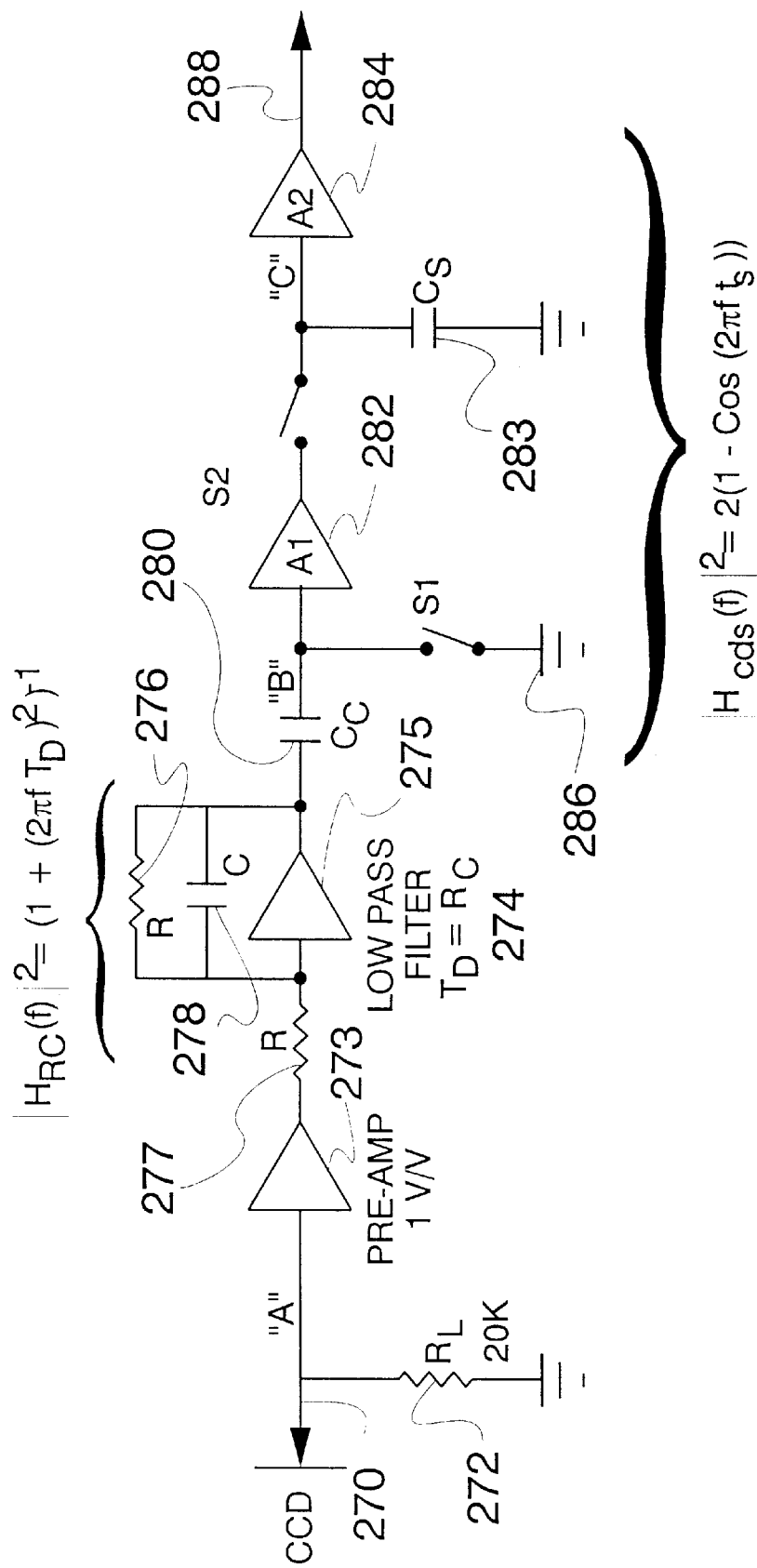
FIG. 10A is a block diagram of a dual sampler processor.
Figure 10B:
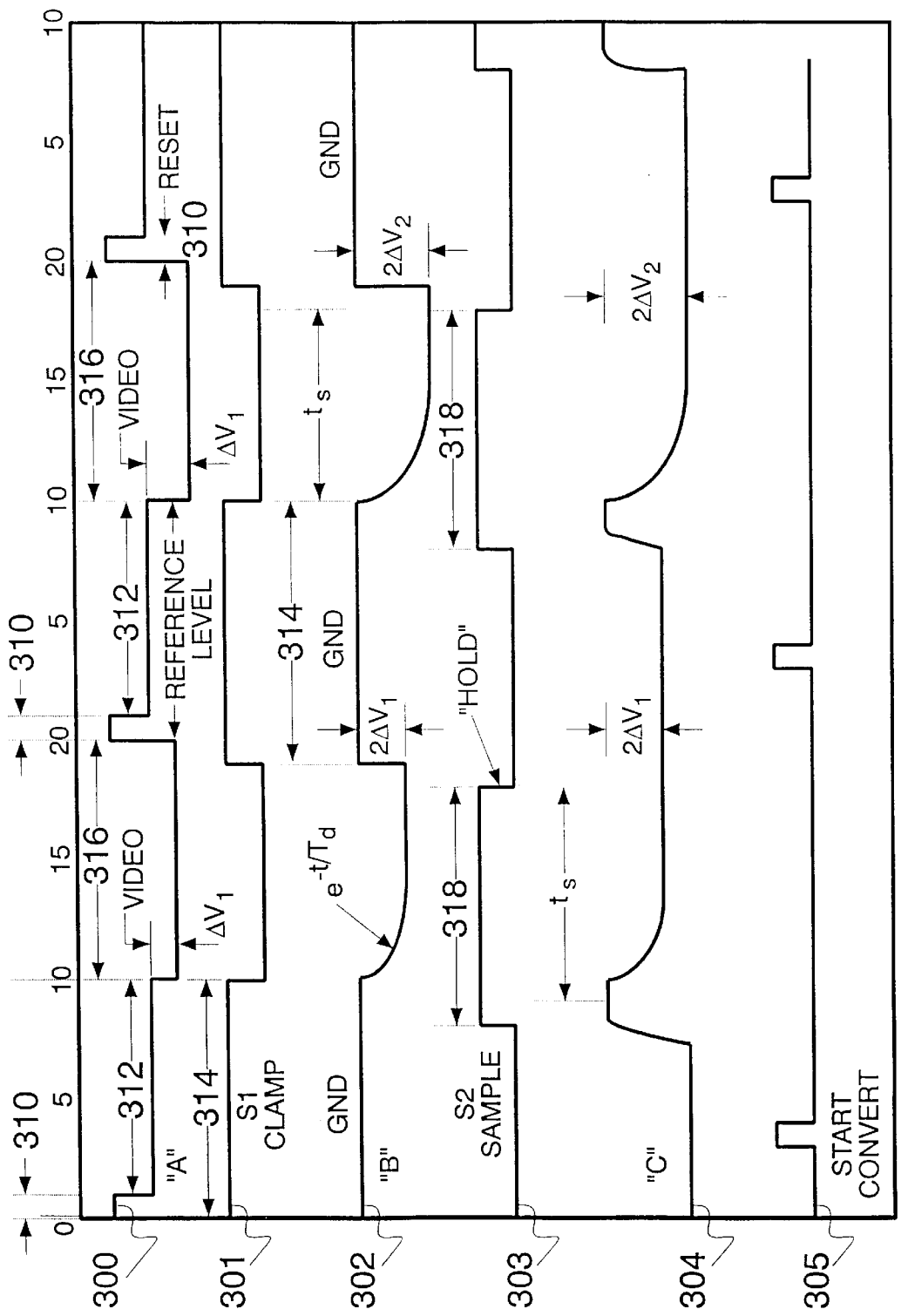
FIG. 10B is a graph showing timing diagrams for the dual sampler processor of FIG. 10A.

A more detailed diagram of a particular type of correlated double sampling circuit, known as a dual sampler processor, is shown in FIG. 10A. Timing diagrams for the correlated double sampling circuit of FIG. 10A are shown in FIG. 10B. In FIG. 10A, a CCD signal 270 is connected to a pre-amplification stage 273. A resistance RL represents the output resistance of the CCD detector. The pre-amplification stage 273 is connected to a low pass filter stage 274 comprising an amplifier 275, two resistors 276 and 277, and a capacitor 278, configured as shown. The transfer function of the low pass filter stage is:

$$|H_{RC}(f)|^2 = 1/(1+(2\pi T_D)^2)$$

where $T_D$=the RC time constant of resistor 276 and capacitor 278. The low pass filter stage 274 is connected to a capacitor 280. Capacitor 280 is connected to a buffer stage 282 and one end of a switch Si. The other end of the switch Si is connected to ground 286. The buffer stage 282 is connected to a second switch S2. The other end of the switch S2 is connected to a capacitor 283 and is buffered by another buffer stage 284. Buffer stage 284 outputs a correlated signal 288.

Operation of the correlated double sampling circuit shown in FIG. 10A may be explained with reference to the timing diagrams of FIG. 10B. The CCD signal 270 may be divided into a plurality of pixel periods, each of which comprises input from a particular pixel, as noted. Timing of the dual sampling processor may be divided into five non-exclusive time intervals within a pixel period. These time periods may be referred to as (1) reset, (2) reference, (3) clamp, (4) video dump, and (5) sample. Each of these time periods are explained more fully below.

The reset period 310 shown with respect to waveform 300 in FIG. 10B is commenced when the reset switch (e.g., reset MOSFET as shown in FIG. 4) is turned on, which starts a pixel readout sequence. Waveform 300 in FIG. 10B is an example of a CCD video output signal starting from the time the reset switch is turned on. During the reset period 310, the sense capacitor 152 in the CCD output stage (e.g., as shown in FIG. 4) is set to the voltage level of the reference voltage source 156, thereby setting a positive charge packet in sense capacitor 152 to be eroded by signal electrons. The time constant associated with this operation is preferably very small. For example, the time constant may be 800 picoseconds, where the sense capacitor 152 has a value of 0.4 pF and an "on" resistance of 2 kΩ. As a consequence of the small time constant, the reset pulse width applied to the reset MOSFET 154 to control clearing the charge on the sense capacitor 152 can be made quite small if desired (e.g., a few nanoseconds).

Application of a reset pulse to the reset MOSFET 154 generates a feed-through pulse seen in the CCD signal 270. This feed-through pulse is caused by an effective capacitor divider network comprising the sense capacitor 152 and a gate-to-source capacitance $C_{gs}$ of the reset MOSFET 154.

After the reset period 310, a reference period 312 occurs after the reset switch (i.e., MOSFET 154) is turned off. The voltage level at the sense node (e.g., at the sense capacitor 152) quickly decays to the reference potential 156 during this time. The sense node retains the reference potential until signal charge is dumped onto the sense capacitor 152.

A clamp period 314 occurs during the reset period 312. During the clamp period 314, the clamp switch Si is turned on, thereby forcing the voltage level at the input to the first buffer stage 282 to ground level or, alternatively, a non-zero reference level if desired. This action establishes a precise reference level for each pixel before video dump occurs. It also eliminates reset noise introduced during the time the reset switch 154 was on. The clamped level is considered the first "sample" taken by the dual sampler circuit. The clamp is released (i.e., switch S1 turned off) at the start of a following video dump period 316.

After the clamp period 314 follows the video dump period 316. During the video dump period 316, charge from the summing well is transferred onto the sense node (i.e., at the sense capacitor 156) when the output transfer gate becomes active. This causes the sense node to be discharged by an amount proportional to the signal level in that summing well of the CCD.

During the video-dump period 316 occurs a sample period 318. The video signal 300, after it has settled, is sampled and held by the action of switch S2. Switch S2 is turned on before video dump to assure that sampling begins when the clamp switch is "on" at ground potential. If sampling were not to start until after video dump, the response would exhibit a slight non-linearity resulting from the finite bandwidth and response time of the sample-and-hold circuit. Because switch S2 is turned on before video dump, sampling begins at the same potential for each pixel. The time period when the clamp is released to when the video is held is referred to as the clamp-to-sample time or sample-to-sample time $t_s$.

A preferred timing guideline is to position the reset clock far from the video dump edge due to its large amplitude. This positioning allows sufficient settling time of the reference level before the video signal is sampled. The reset clock feedthrough pulse is eliminated as a result of the clamp switch, as the video signal is clamped over the entire pixel period except during the sample-to-sample time $t_s$.

The sample-to-sample time $t_s$ and electrical bandwidth $T_D$ are preferably selected to achieve low noise performance. The correlated double sampling processor acts as a band-pass filter in that low frequency noise is rejected when $t_s$ is made smaller (because these low frequencies become correlated), while high frequency noise is rejected when the bandwidth is made smaller. The center frequency of the effective band-pass filter is tuned by adjusting $t_s$ and $T_D$ while maintaining a high signal amplification. The optimum center frequency is selected when the noise is minimized for a given CCD noise input spectrum.

Preferably, the correlated double sampling circuit is configured so as to completely eliminate kTC noise and to optimally filter white and 1/f noise generated by the on-chip CCD amplifier, thereby improving overall signal-to-noise ratio.

Figure 11A:
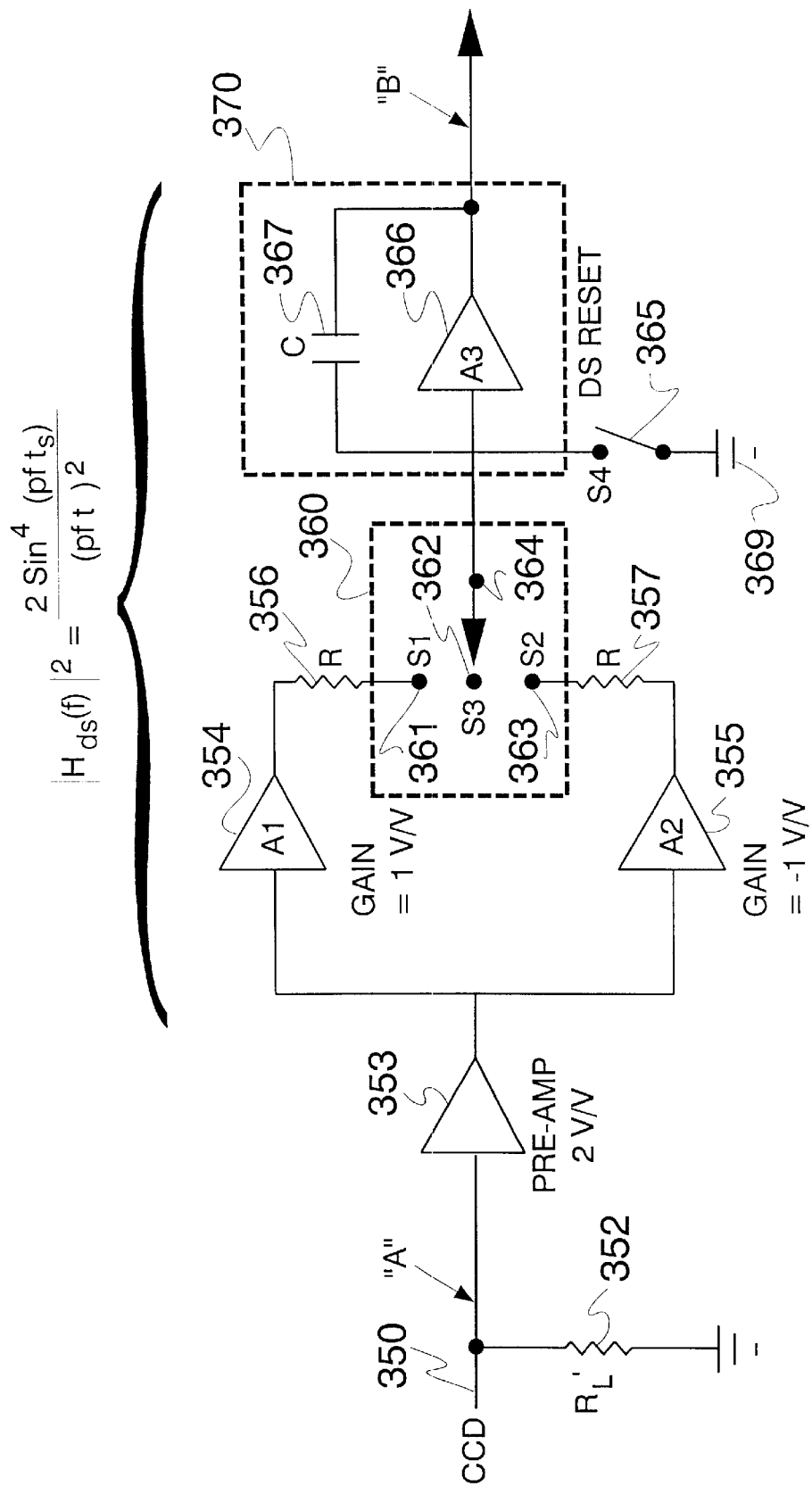
FIG. 11A is a circuit block diagram of a dual slope processor.
Figure 11B:
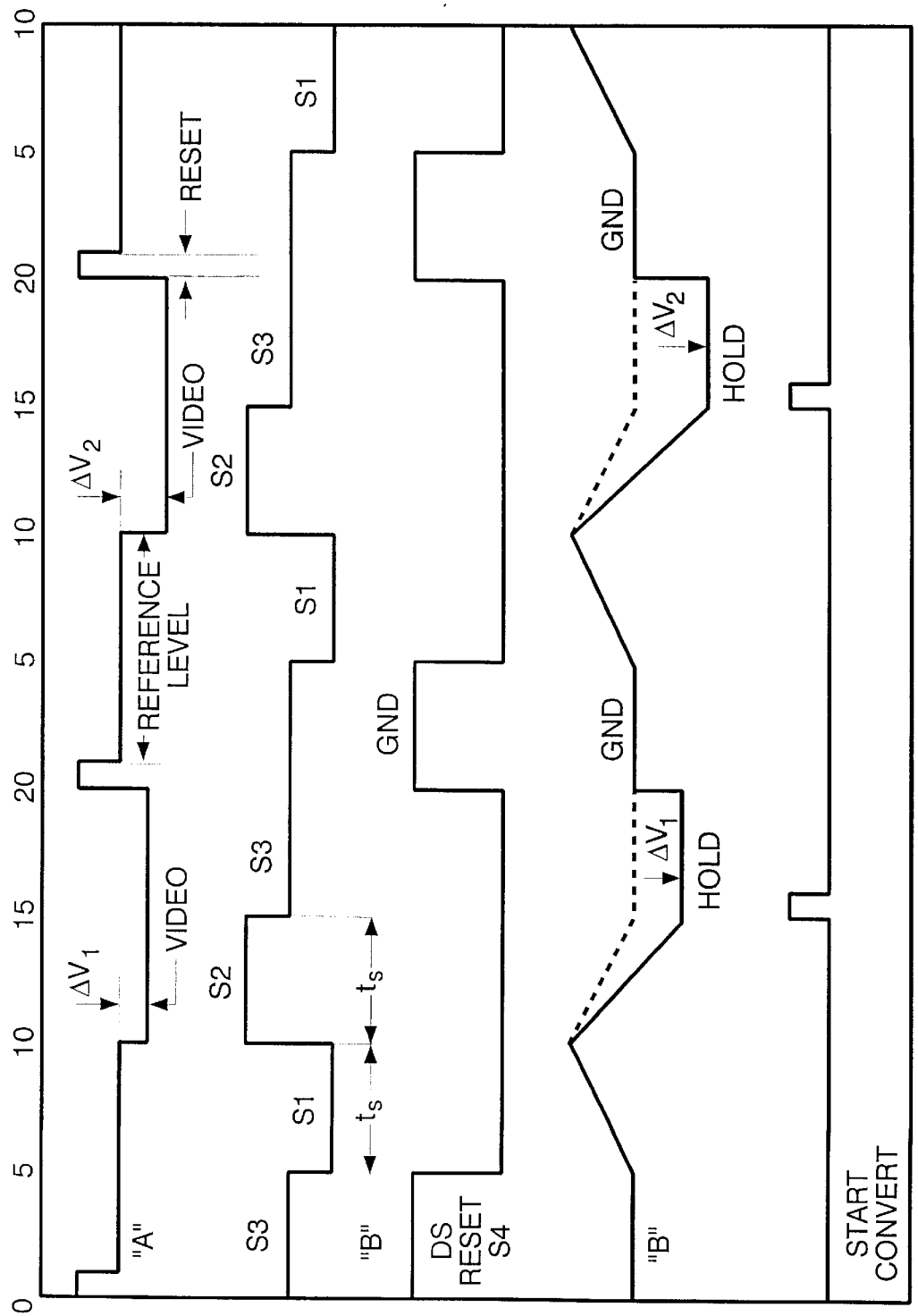
FIG. 11B is a graph showing timing diagrams for the dual slope processor of FIG. 11A.

Another type of correlated double sampling circuit that may be used is a dual slope processor. The performance of the dual slope processor when operating at a slow data rate is very similar to that of the dual sampler processor, but the dual sampler processor is preferred at high pixel rates. A diagram of a dual slope processor is shown in FIG. 11A. Timing diagrams for the dual slope processor of FIG. 11A are shown in FIG. 11B.

In the dual slope processor of FIG. 11A, a resistor 352 represents the output resistance of a CCD detector. A CCD output signal 350 is connected to a pre-amplifier 353. The output of the pre-amplifier 353 is connected to an inverting amplifier 355 and a non-inverting amplifier 354, each of which have a gain of unity. The output of the inverting amplifier 355 and the output of the non-inverting amplifier 354 are each connected to a three-position switch 360. The output of the non-inverting amplifier 354 is connected through a resistor 356 to one position 361 of the three-position switch, while the output of the inverting amplifier 355 is connected through a resistor 357 to another position 363 of the three-position switch 360. A third position 362 of the three-position switch 360 is left open. A common end 364 of the three-position switch 360 is connected to an integrator 370. The integrator 370 comprises an operational amplifier 366 and a capacitor 367. The input and the output of the operational amplifier 366 are connected to opposite ends of the capacitor 367 as shown in FIG. 11A. Another switch 365 is connected from the input of the integrating amplifier 366 to ground 369.

In operation, the CCD video signal 350 is amplified by the pre-amplifier 353. The pre-amplifier 353 may have a gain of, for example, 2 V/V. The output of the pre-amplifier 353 is fed into the integrator 370 by way of the three-position switch 360. Processing of the CCD video signal 350 begins by first resetting the integrator 370 to ground potential by turning on switch 365 and setting switch 364 to position 362. After-resetting the integrator 370, switch 365 opens, and the three-way switch 360 switches to the first position 361 so as to allow the reference voltage level to be integrated onto the integrating capacitor 367 for a sample time $t_s$.

The effect of integrating is to subtract-the reset potential and thereby eliminate common mode reset noise. After integrating for $t_s$ seconds, charge is dumped onto the sense node (e.g., the sense capacitor 152) of the CCD. Simultaneously the three-position switch 360 is switched to the second position 363 to connect the integrator 370 to the output of the inverting amplifier 355. The reference level plus the video level are integrated for $t_s$ seconds when the switch 360 opens to the third position 362. The signal is then held by the integrator 370.

Output signals from either the dual sampler or dual slope processors may be digitized by suitable means, such as and analog-to-digital converter, and processed digitally, or may be processed using some or all of the analog techniques described further herein.

Figure 12:
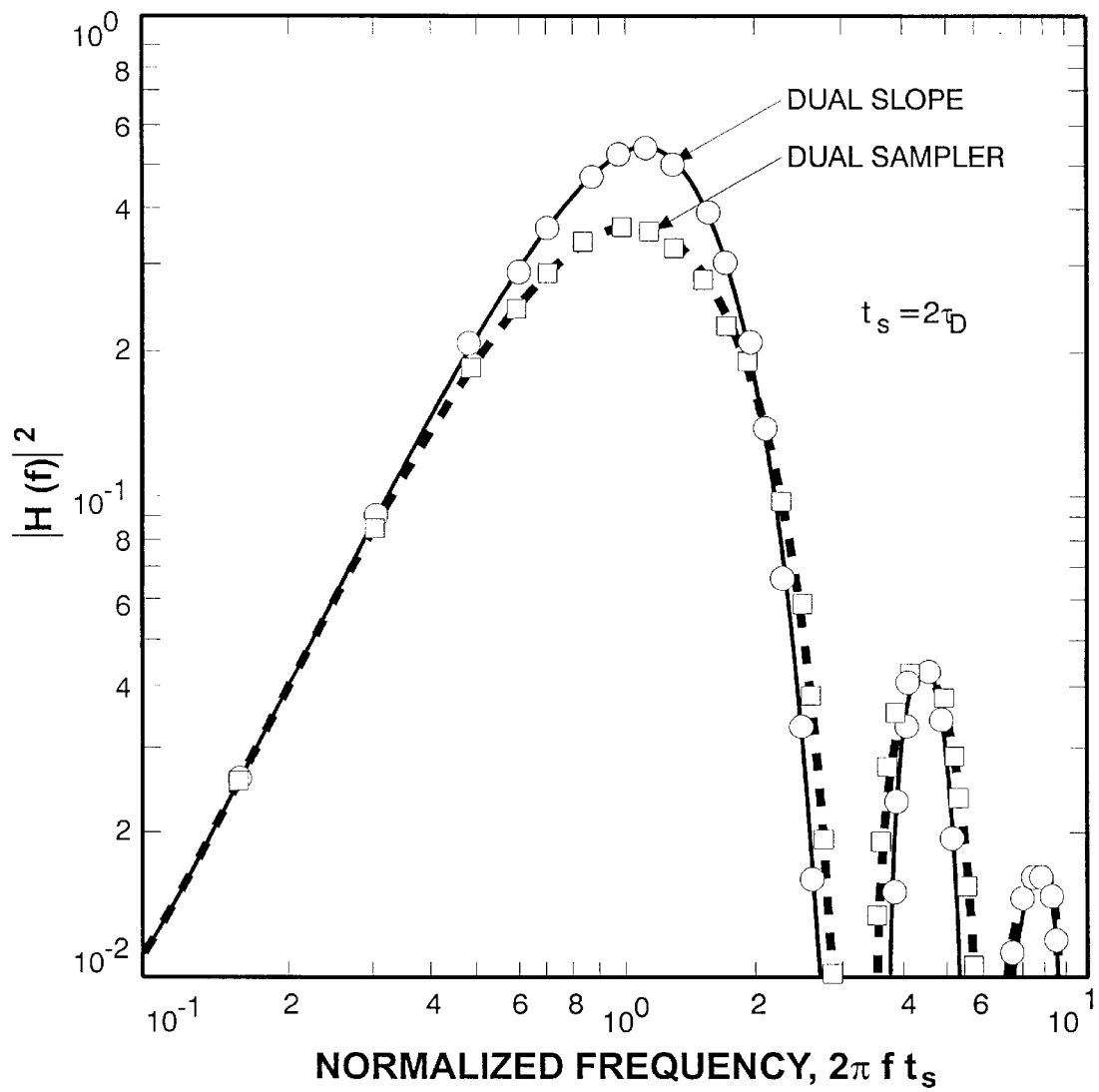
FIG. 12 is a graph of transfer functions for the dual sampler processor of FIG. 10A and the dual slope processor of FIG. 11A.

Transfer functions for the dual sampler and dual slope processors as a function of normalized frequency $(2\pi ft_s)$ are compared in FIG. 12, assuming $t_s=2T_D$ for the dual sampler processor. As shown in FIG. 12, the filtering action is very close between the two different types of processors, although the correlated dual sampler processor is preferred for higher data rates.

The particular characteristics of CCD detectors place special requirements on the optical system. For example, a CCD-based bar code reader designed to read fast moving bar code labels must have a relatively short exposure time. In order to read in ambient light conditions, with little or no self generated light, the optical system of such a bar code reader is thus preferably configured so as to gather the maximum light available.

The invention contemplates a number of different optical structures that are suitable for use in the preferred embodiments. These optical structures include, for example, poly-optic and multi-focus lenses, graded index elements, optical flats, prisms, and others. These structures may be used alone or in combination to increase the light gathering power and depth of field of the various embodiments described herein.

Figure 13A:
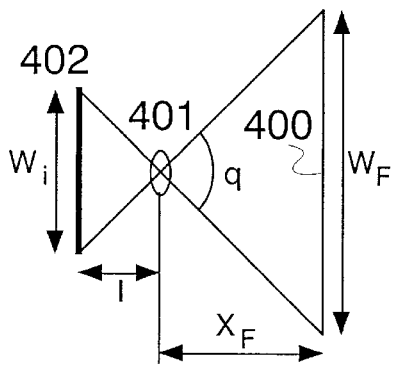
FIG. 13A is a diagram of an optical system based on a single lens model.

A simple optical system for a linear CCD is a single lens system. A single lens model is diagrammed in FIG. 13A, which shows some of the basic relationships between reading distance and length of scan line. The single lens model of FIG. 13A shows the gathering of light from a target 400 focused through a lens 401 and projected onto an imager (e.g., CCD detector) 402. As shown in FIG. 13A, the lens 401 can be thought of as projecting from the imager 402 a virtual scan line of length $W_F$ at a distance $X_F$ where the lens 401 is focused. The ratio of the virtual scan line length $W_F$ to the imager length $W_i$ is the ratio of the focal distance $X_F$ to the imager distance I:

$$W_F = Wi \, X_F / I$$

The imager distance I can similarly be calculated from the lens equation:

$$I = X_F f / (X_F - f)$$

Each pixel is "projected" along the length of the virtual scan line WF. The image of the pixels by virtue of such projection is magnified by the $X_F/I$ ratio.

The width $W_F$ corresponds to the field of view of the imager 402 at a distance $X_F$. The imager 402 will have an angle of view θ as follows:

$$\theta = 2 \, \text{Arctan} \, (W_i / 2 X_F)$$

Design of an optical system may involve considerations of focus blur, diffraction, aberrations, variable light intensity, light scattering, label reflectivity, and label print contrast ratio. These topics are discussed briefly below before a more complete description is provided of the preferred embodiments of optical structures in accordance with various aspects of the present invention.

Figure 13B:
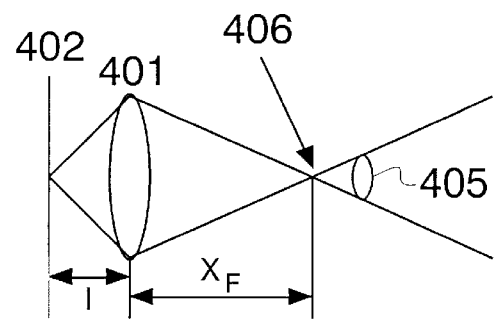
FIG. 13B is a diagram of a single lens model showing creation of a blur spot when the target image is moved away from the focal point.

The phenomenon of focus blur relates to the distance of the target image from the focal spot of the lens. If a bar code is located at a distance $X_F$ from the lens and within the field of view width $W_F$, then the bar code will be in focus on the imager 402. If, as shown in FIG. 13B, the bar code is moved closer to or farther away from the lens 401, the image will become blurry. This blurriness results from the bar code being imaged by a "virtual spot" 405 or blur spot that is larger than the focal spot at the optimum focal point 406. The size of the blur spot 405 is a linear function of distance from the focal point 406, as can be seen in FIG. 13B. The blur spot 405 grows more rapidly with distance for a wider lens aperture (opening) than for a narrower lens aperture. The ratio of the aperture size to the focal length is called the f-number or f-stop and is written as f/#. Thus, for example, an f/4 lens will have half the depth of field of a f/8 lens, because the diameter of the aperture of the f/8 lens is half the aperture diameter of the f/4 lens.

An analogy can be drawn between a CCD imaging system and a laser optic system, where the waist of the laser beam corresponds to the focal point of the imaging system, and the size of the laser spot corresponds to the image of the point spread function at the target (e.g., bar code). In practice, the spot at the focal point 406 (or "waist") may not be of negligibly small size, but rather may be somewhat larger due to the effects of diffraction and lens aberrations. The size of the lens aperture affects the spot size resulting from diffraction, which may occur when only a portion of a wavefront of light is allowed through the aperture. Larger apertures generally result in a smaller spot size, while smaller apertures result in a larger spot size. The effects of diffraction also depend on the wavelength of the light, whether ambient or self-generated. For example, blue light tends to create a smaller spot size than red light.

In an optical model for CCD-based image reading systems, the effects of focus blur and diffraction spot size may estimated as a root mean square (i.e., the square root of the sum of the squares of both spot sizes).

In addition to diffraction, lens aberrations (i.e., deviations from ideal lens shape) may lead to larger waist spot sizes. The resulting waist spot size may be expressed as D(1+K), where D is the diffraction limited spot size and K is an aberration factor. For an aberration free lens, K=O.

There are several types of aberrations, including spherical aberration and chromatic aberration. Spherical aberration is the primary type of aberration with large aperture lenses (larger than f/3). Spherical aberration arises from the difference between a perfect shaped lens and a spherical shaped lens. To form a perfect (diffraction limited) image, a spherical wavefront is required. However, a spherical lens shape is not the correct shape to create a spherical wavefront. The correct lens shape depends on the object-to-image distance ratio (referred to as the magnification ratio or conjugate ratio). The difference between this perfect shaped lens and a spherical shaped lens causes spherical aberration.

Figure 14A:
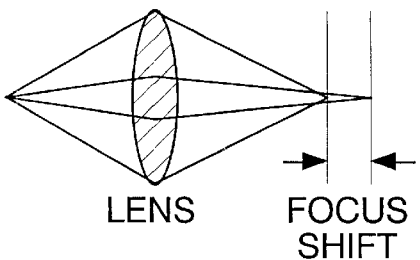
FIGS. 14A–14D are diagrams of various types of aberrations and distortions that may be associated with an optical system.

The effect of spherical aberration, as shown in FIG. 14A, is an effective shift in focal length depending on where radially on the lens the light passes (i.e., ray height). The region of the lens near the center has one focus, while concentric rings of the lens radiating outward from the center will have differing focal lengths depending on their distance from the center. Spherical aberration can be minimized or eliminated by using a properly shaped spherical lens (e.g., plano-convex, double-convex, meniscus), shaping the lens correctly (such as with aspheric lenses), or by using multiple lenses (e.g., doublets or triplets).

Chromatic aberration relates to the variation of focal length as a function of wavelength. The focal length variation occurs because the index of refraction of an optical substance varies with wavelength (an effect called dispersion). Chromatic aberration is the primary type of aberration with apertures smaller than f/2, when astigmatism is not present. Chromatic aberration can be corrected by using two different lenses with different dispersion properties.

Figure 14B:
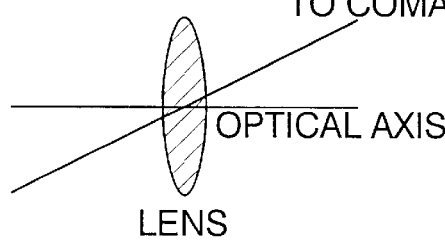

Coma relates to a variation in magnification as a function of ray height when imaging objects not on the optical axis. The effect of coma, illustrated in FIG. 14B, for example, is typically overshadowed by the effect of astigmatism, but can nevertheless be corrected by proper placement of the aperture.

Figure 14C:
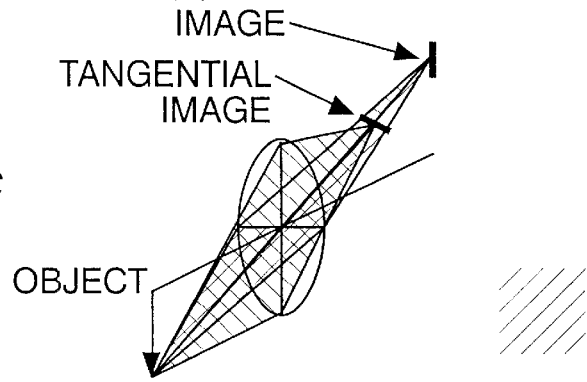
Figure 14D:

Astigmatism is the difference in focus between the horizontal and vertical axis. The effect of astigmatism, illustrated in FIG. 14C, for example, is to cause the image of tangential lines (i.e., vertical axis) to appear at one distance and radial lines (i.e., horizontal axis) to appear at a different distance. Lenses with or without astigmatism will generally exhibit field curvature, which is the bending of the image plane. Field curvature is characterized by different tangential or sagittal lines, as shown in the comparative diagram of FIG. 14D. In a non-astigmatic system, the tangential field curvature and sagittal field curvature are the same and lie on the Petzval surface, while in an astigmatic system they are different.

Figure 15:
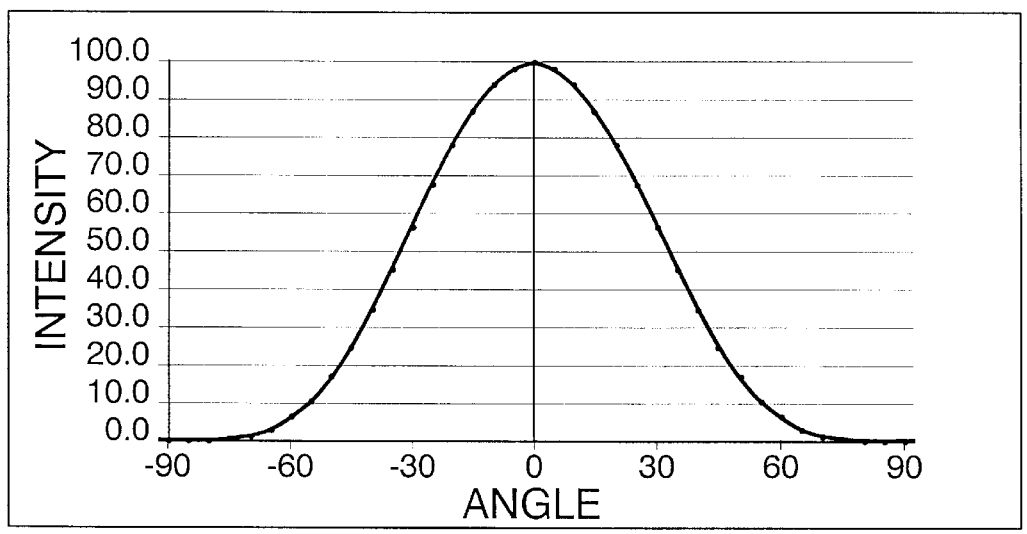
FIG. 15 is a graph illustrating a cosine law effect.

Another consideration is cosine law effect, a term which describes the variation of light intensity across an imager. Cosine law effect is most pronounced with a wide angle field of view. Several factors each having a "cosine" component combine to form an intensity distribution that varies as the cosine to the fourth power as a function of field angle. Wider field angles thus produce larger variations in signal intensity over the imager, while narrower field angles produce smaller signal intensity variations. Cosine law effect should be taken into account so as to collect enough light (i.e., obtain a sufficient signal level) at the edges of a virtual scan line. A graph of the cosine law effect is shown in FIG. 15.

Figure 16:
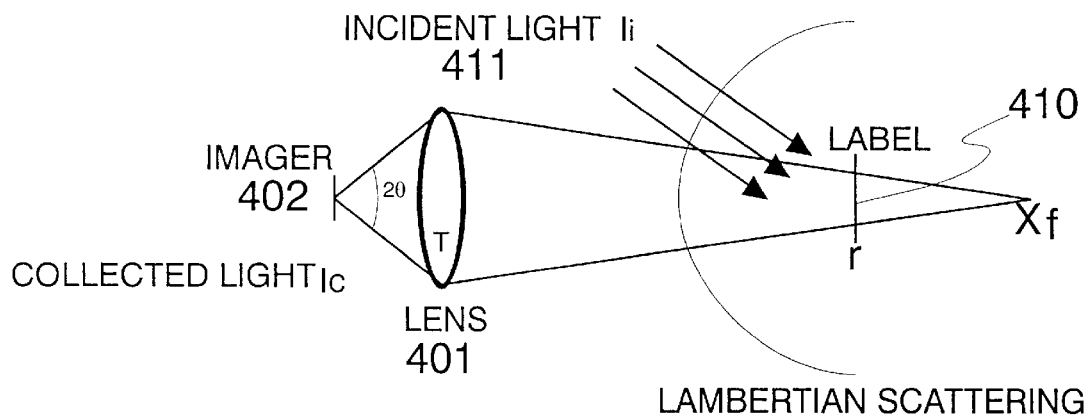
FIG. 16 is a diagram illustrating light collection.

The amount of light collected by the imager 402 depends in part on the intensity of the light (whether ambient or not) and the reflectivity of the bar code label. A light collection model is illustrated in FIG. 16. If a target label 410 with reflectivity r is illuminated with light 411 having an irradiance $I_i$ lumens/m$^2$, then $I_i \cdot r$ lumens/m$^2$ will generally be re-radiated from the label. A Lambertian (perfectly diffuse) source that emits N lumens/m$^2$ into a hemisphere emits N/π lumens/steradian·m$^2$ at normal incidence to the source. Therefore, the radiance of the target label (at normal incidence) having irradiance $I_i \cdot r$ may be expressed as $I_i \cdot r/\pi$ lumens/steradian·m$^2$. An imaging system will receive an irradiance at the imager 402 equal to πTN' sin$^2$θ, where N' is the object radiance in lumens/steradian·m$^2$, T is the transmission of the system, and a is the half angle from the center of the imager to the edge of the lens. Recalling that the imager distance I can be expressed as $I = X_F f / (X_F - f)$, where f is the local length and $X_F$ is the distance to focus, the amount of collected light $I_c$ in lumens/m$^2$ is therefore given as follows:

$$I_c = I_i \cdot rT \sin^2\theta$$

and $$\theta = \operatorname{Arctan}\{(X_F - f)/2AX_F\}$$

For small aperture size:

$$I_c = I_i \cdot (rT/4A^2) \cdot (X_F - f)^2 / X_F^2$$

where

| | | |
|---|---|---|
| $I_i$ | = Incident Light | (lumens/m$^2$) |
| $I_c$ | = Collected Light | (lumens/m$^2$) |
| $r$ | = Label Reflectance | (percentage) |
| $T$ | = Lens Transmission | (percentage) |
| $\theta$ | = Aperture Half Angle | (degrees) |
| $A$ | = $f/\#$ of Aperture | (unitless) |
| $f$ | = Focal Length of Lens | (meters) |
| $X_F$ | = Distance to Focus | (meters) |

Thus, the amount of light collected at the imager 402 is independent of distance of the target label from the lens 401. The collected light is, however, proportionally affected by the intensity of the light (ambient or otherwise) illuminating the label, the reflectance of the label, and the lens transmission. The collected light is inversely proportional to the f-number (f/#) squared, and depends to some degree on the position of focus ($X_F$) relative to the focal length.

To determine the modulation level of the CCD video output signal, the collected light $I_c$ may be multiplied by the print contrast ratio of the target label. It should be noted that the above calculations do not take into account any signal modulation reduction resulting from modulation transfer function (MTF) effects or cosine law effects.

Further information relating to optics and optical systems may be found in W. J. Smith, *Modern Optical Engineering— The Design of Optical Systems* (McGraw-Hill, 2d ed. 1990).

A convenient model for estimating optical system performance and determining parameters for optimum lens design is given as follows:

$$\text{Focus Blur (mils)} = \sqrt{[(\text{Foc})^2 + (\text{Diff})^2]}$$

where Foc is geometric focus blur, and Diff is diffraction limited minimum spot size;

$$\text{Foc (mils)} = 1000 \cdot [f/(f/\#)] \cdot [(R - R_o)/R_o]$$

where R is distance from lens (inches), $R_o$ is focal point (inches), f is focal length of lens (inches), and f/# is relative aperture (f-stop);

$$\text{Diff (mils)} = 9.61 \times 10^{-5} \lambda R \cdot (f/\#)/f$$

where R is distance from the lens (inches), λ is nominal wavelength (nanometers); f is focal length of the lens (inches), and f/# is relative aperture (f-stop);

$$\text{Resolution (mils)} = 1000 WR/[I(f, R_o) N] \approx 1000 WR/(fN)$$

where R is distance from the lens (inches), W is width of the CCD array (inches), $I(f, R_o)$ is CCD image plane (inches), and N is the number of pixels in CCD array;

$$\text{Field of View (mils)} = 8.333 \, WR/[I(f, R_o)] \approx 8.333 \, WR/f$$

where R is distance from the lens (inches), W is width of the CCD array (inches), and $I(f, R_o)$ is CCD image plane (inches). Based on the above model, other optical parameters may be be-determined as follows:

| | |
|---|---|
| Diffraction | $= 2.44 \lambda A X / i$ |
| Minimum Spherical | $= 0.067 X / A^3$ |
| Chromatic | $= X / (2 \cdot V \cdot A)$ |
| Coma | $= \theta \cdot X / (56 A^2)$ |
| Astigmatism | $= \theta^2 \cdot X / (2A)$ | where λ is the wavelength in meters, A is the relative aperture (f/# or f-stop), V is the Abbe number, and θ is the half field angle in radians.

Typically, at least 2.5 pixels per minimum element width are needed to resolve bar codes. Focus blur can frequently be 1.9 times bigger than the minimum element width. Spots as big as 2.4 times the minimum element width may still provide workable results in low noise systems.

Certain of the preferred embodiments make use of shaped apertures and specialized lenses in order to increase light gathering capability and allow operation in reduced light, such as in ambient light conditions. Since in many applications a bar code reader images only bars/spaces and not necessarily true two dimensional images, some optimization of the lens aperture is possible. Increasing the size of the aperture in the direction of the bars generally provides greater collection with minimal effect on the depth of field characteristics. While this is strictly true when the bars are parallel with respect to the aperture, as the bars are rotated when reading the bar code at an angle the elliptical point spread "spot" shape grows with respect to the bar code.

Figure 17:
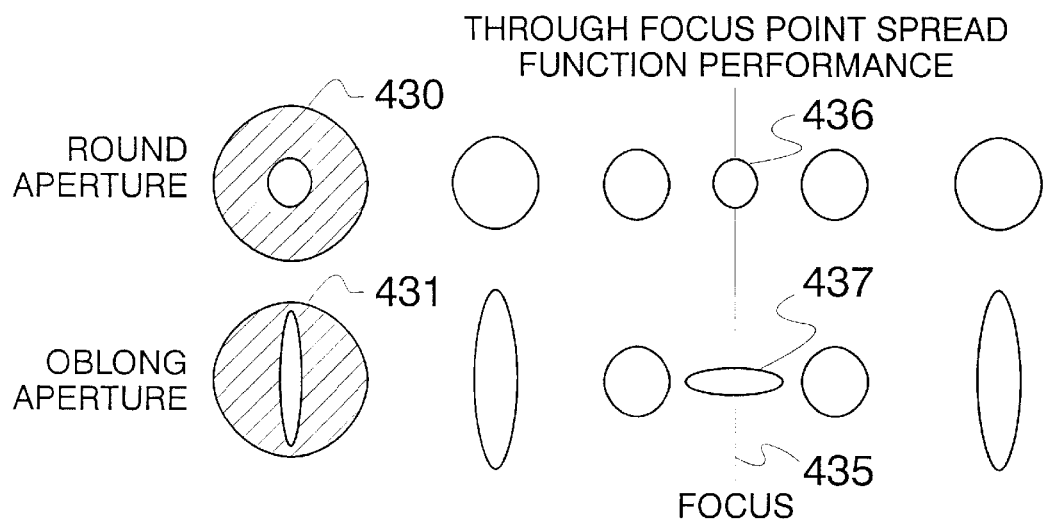
FIG. 17 is a diagram comparing the point spread function shapes through focus for a round aperture and an oblong/elliptical aperture.

This phenomenon is illustrated in FIG. 17. FIG. 17 is a diagram comparing the point spread function shapes through focus for a round aperture 430 and an oblong or elliptical aperture 431, both having the same light collection. As shown in FIG. 17, at a focal point 435, the round aperture through focus point spread spot 436 and the elliptical aperture through focus point spread spot 437 are each at a minimum. However, the elliptical aperture through focus point spread spot 437 is larger in the lateral direction than the round aperture through focus point spread spot 436.

Figure 18:
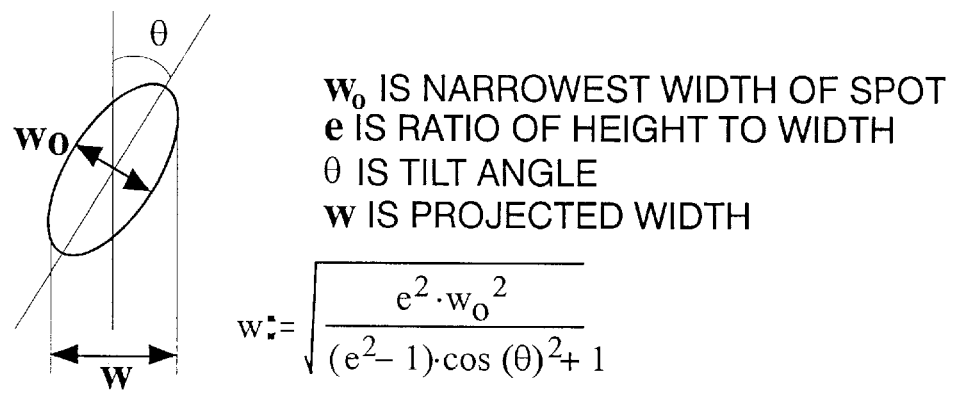
FIG. 18 is a diagram illustrating change in elliptical spot size with respect to tilt angle.

The elliptical spot size changes with respect to the tilt angle, as illustrated in FIG. 18. In FIG. 18, $w_o$ represents the narrowest width of the spot, a represents the tilt angle (e.g., with respect to the vertical bars of a bar code), and w represents the projected width. The projected width may be characterized by the following equation:

$$w=\{(e^2 \cdot w_o^2)/[(e^2-1) \cdot (\cos \theta)^2 + 1]\}^{1/2}$$

where e represents the ratio of height to width. The area of the elliptical spot is given by the following equation:

$$Area = \pi \cdot e \cdot w_o^2$$

The above equation indicates that the increase in area of the elliptical spot is directly proportional to the height to width ratio.

Figure 19:
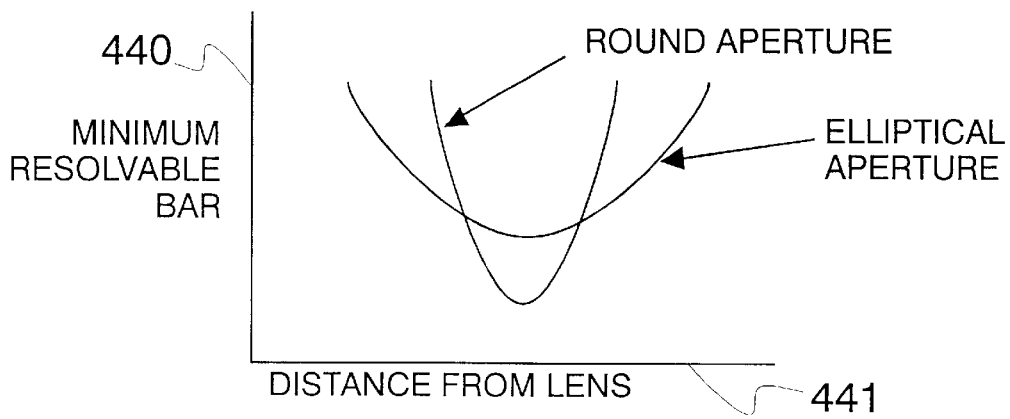
FIG. 19 is a graph showing illustrative depth of field plots for a round aperture and for an elliptical aperture collecting the same amount of light.

A narrower aperture, such as the elliptical aperture 431 (or other oblong aperture, such as a rectangular aperture) shown in FIG. 17, generally tends to increase the depth of field. The height of the aperture 431 in the direction parallel to the bars is enlarged to equalize the collection. FIG. 19 is a graph showing illustrative depth of field plots for a round aperture 430 and for an elliptical aperture 431 collecting the same amount of light. The graph of FIG. 19 plots the minimum resolvable bar width on one axis 440 against the distance from the lens on the other axis 441. As shown in FIG. 19, the narrower aperture creates a larger depth of field than the wider aperture, but has a larger minimum spot size due to diffraction.

Figure 20A:
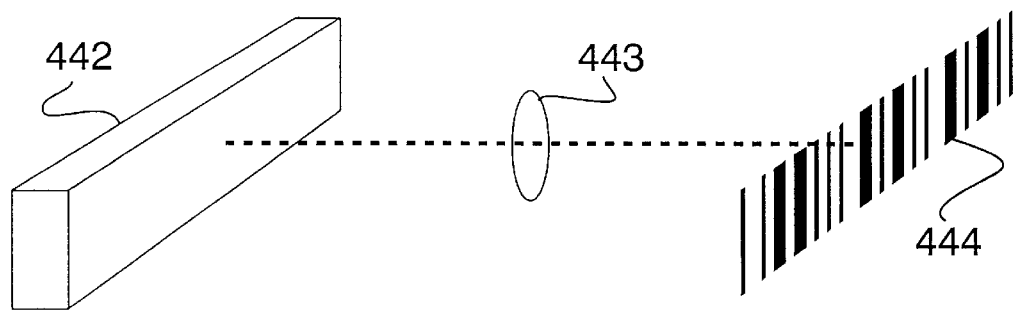
FIG. 20A is a diagram of an unapertured lens interposed between a target and an imager.

An optical system employing a small, round aperture (e.g., aperture 4301 generally has a relatively good depth of field but suffers from the need for a long exposure time. Such a system is shown, for example, in FIG. 20A. In FIG. 20A, light is reflected from a target 444 (e.g., a bar code, shown from a back view) and focused through a round lens 443 (or lens having a round aperture) onto a CCD detector 442. In the optical system of FIG. 20A, as little as 0.02% of the reflected light may reach the CCD detector 442.

Figure 20B:
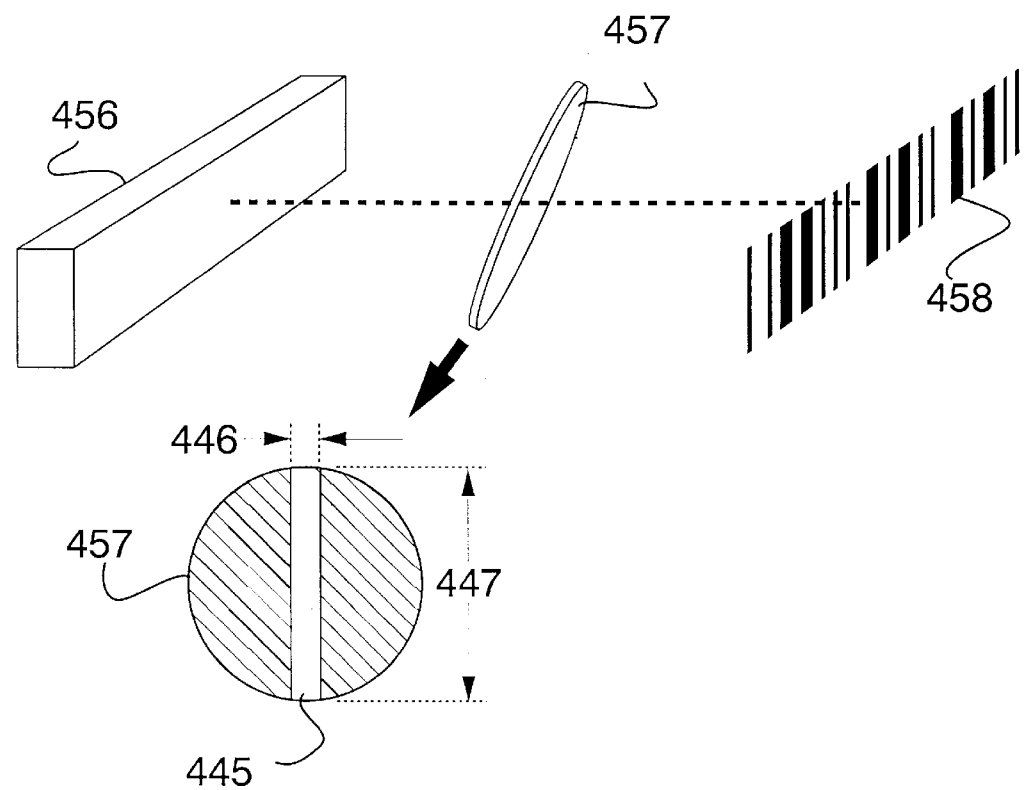
FIG. 20B is a diagram of an apertured lens in a similar relative position.

An oblong aperture (e.g., aperture 431) speeds up exposure time by allowing more light collection. A system comprising and oblong aperture is shown, for example, in FIG. 20B. In the optical system of FIG. 20B, light is reflected from a target 458 (e.g., a bar code, shown from a back view) through an apertured lens 457 (or an oblong or similarly shaped lens) onto a CCD detector 456. In one embodiment using a rectangular-shaped aperture 445, a narrow axis 446 of the aperture 445 corresponds to an f-stop for the desired depth of field (e.g., f/20), while a long axis 447 of the aperture 445 has a larger f-stop (e.g., f/5) and therefore gathers more light. Although the range of angles of bar codes that the optical system of FIG. 20B will detect may be reduced in comparison to the FIG. 20A system by use of a oblong aperture, the collected light can be a substantially increased (e.g., by as much as ten times or more).

Figure 50:
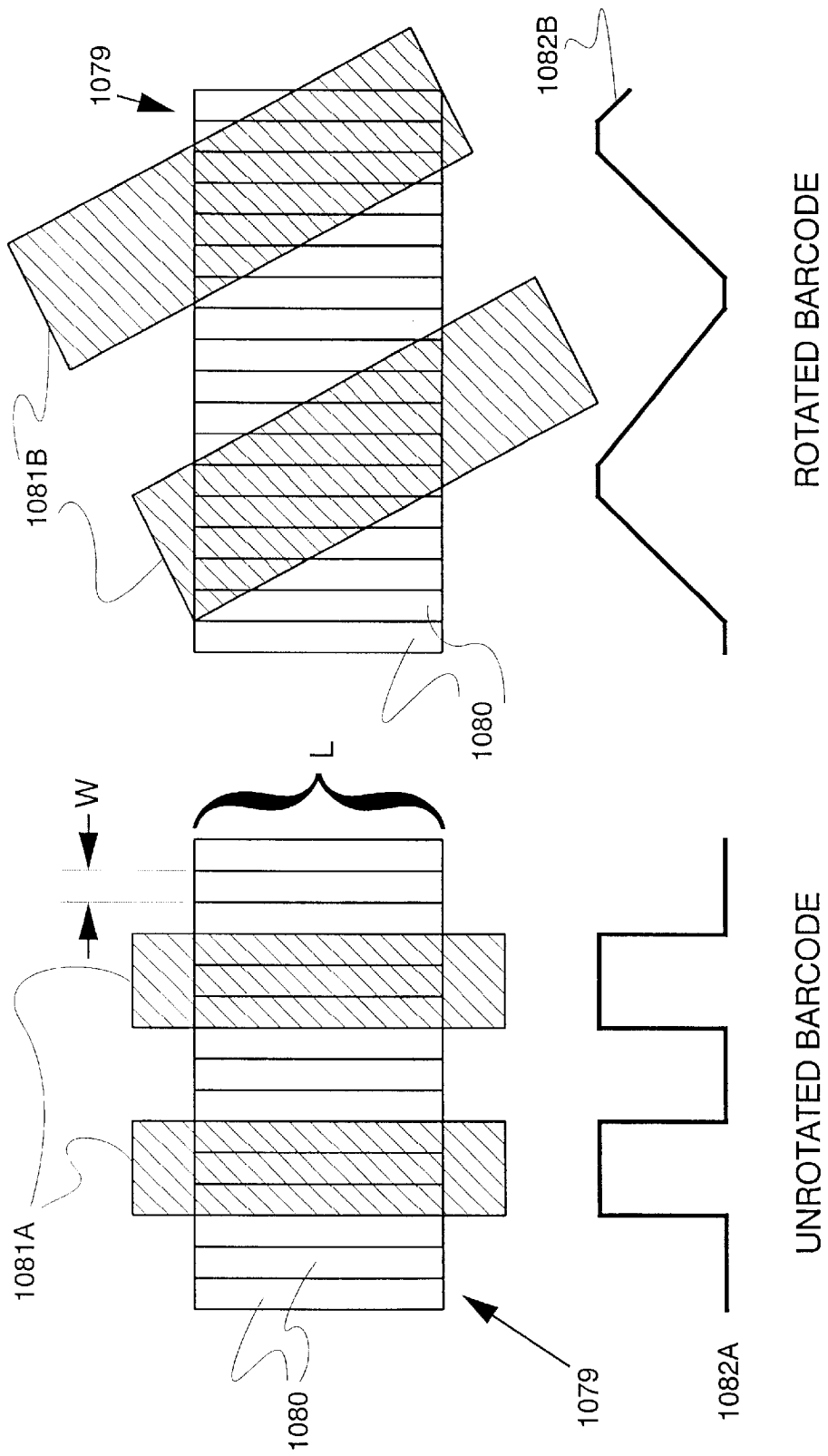
FIGS. 50A and 50B are diagrams illustrating the effect on an output signal of rotating a bar code with respect to a CCD array.

A preferred embodiment of a CCD imaging device employs a CCD detector 1079 as shown in FIG. 50A whose pixels 1080 are rectangular in shape, with their long axes perpendicular to the line formed by the linear array of pixels 1080. Like the oblong-shaped aperture 431 described above in FIG. 17, the FIG. 50A rectangular pixel structure enhances the detection efficiency of the CCD detector 1079 without significantly degrading spatial resolution, so long as the CCD detector 1079 is not rotated at too much of an angle with respect to the barcode (or other image) being read. FIGS. 50A and 50B are diagrams illustrating the effect on an output signal 1082A, 1082B of rotating a bar code with respect to the CCD detector 1079. As shown in those figures, the unrotated bars 1081A projected onto the CCD detector 1079 in FIG. 50A result in a relatively clean square-wave output signal 1082A. In contrast, the partially rotated bars 1082A projected onto the CCD detector 1079 in FIG. 50B result in an output signal 1082B with sloped rising and falling edges due in part to the spreading of the bars 1081A across a greater number of pixels 1080.

Figure 51:
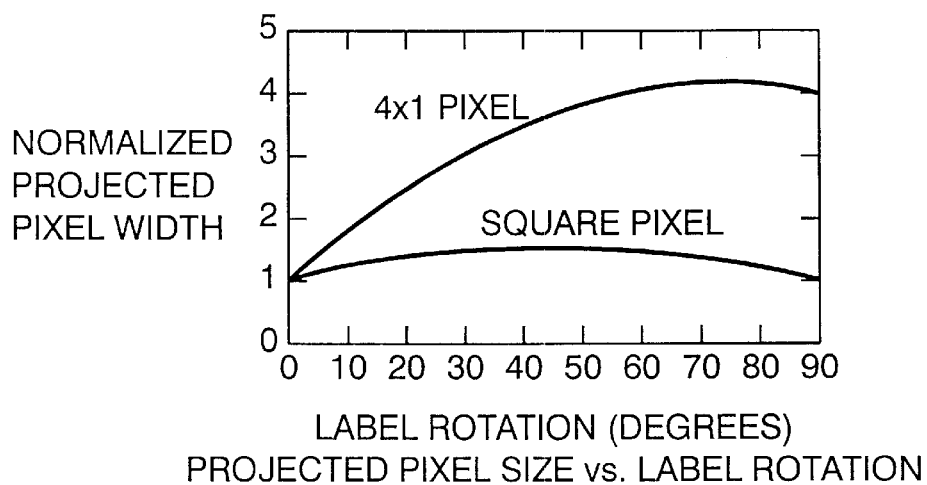
FIG. 51 is a graph comparing pixel width versus roll angle for a CCD array with square pixels and one with rectangular pixels (having a 4:1 aspect ratio).

To reduce the effect of image rotation in the FIG. 50A embodiment having rectangularly shaped pixels 1080, the pixel aspect ratio should be selected so that the resolution of the bar code (or other image being read) is not impaired with labels that have a tolerable amount of roll with respect to the imaging device. Moreover, if the pixels are too tall, the projected image of the pixels will provide too little resolution to properly image the barcode. FIG. 51 is a graph comparing pixel width versus roll angle for a CCD array with square pixels and with rectangular pixels (having a 4:1 aspect ratio). As shown in FIG. 51, the angle of bar code label rotation does not significantly affect the normalized projected pixel width for a CCD array with square pixels; however, it does affect the normalized projected pixel width for a CCD array with rectangular pixels having a 4:1 aspect ratio. Thus, it is possible that more rectangular pixels would be needed to obtain the same performance as square pixels for handling rotated bar code labels.

The maximum acceptable aspect ratio $K_{max}$ of pixels 1080 for a given maximum roll ($\theta$) and minimum number of pixels per bar (N) can be determined mathematically, according to relationships expressed in the following equations:

$$W_{eff}(\theta, K) = K \cdot \sin(\theta) + \cos(\theta) \tag{51.0}$$

$$N = W_{eff}(\theta, K \cdot f) \cdot \cos(\theta) \tag{51.1}$$

where $W_{eff}$ is the projected or effective width (i.e., how big the pixel width looks with a certain rotation), and K is the aspect ratio. The value f is a factor reflecting the tolerance of the signal processing electronics to a distorted output signals. For a derivative based signal processor (described elsewhere herein), f is generally equal to about 0.8. The minimum number of pixels per bar (N) is typically at least 2.5.

According to equation 51.0, the effective pixel width Weff changes according to the rotational angle $\theta$. For $\theta=0°$, $W_{eff}=1$, while for $\theta=90°$, $W_{eff}=K$. For $0° < \theta < 90°$, $W_{eff}$ varies according to the graph of FIG. 51. According to equation 51.1, as the bar code is rotated it looks bigger by a factor of $\cos \theta$, in partial dependence on the effect of the signal processing (as indicated by the factor f). The more pixels 1080 per bar are allowable (i.e., the larger N is), the taller pixels 1080 can be, thus increasing sensitivity to incoming light. An example wherein the maximum tolerable roll ($\theta$) is ±23° with respect to the imager, and wherein f=0.8 and the number of pixels per bar N is 3.75, the maximum acceptable pixel aspect ratio is found to be:

$$K_{max}(N, \theta, f) = K_{max}(3.75, 23°, 0.8) = 10 \tag{51.2}$$

Thus, in the above example, the maximum acceptable pixel aspect ratio is about 10 to 1.

Use of rectangular pixels such as described above with respect to FIGS. 50A and 50B is not limited to CCD devices, but may be applied to any pixel-based photodetection device.

Figure 52A:
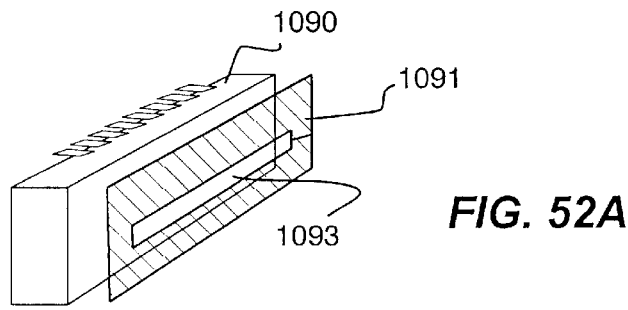
FIGS. 52A and 52B are diagrams showing an oblique view and a side view, respectively, of a masked CCD array.
Figure 52B:
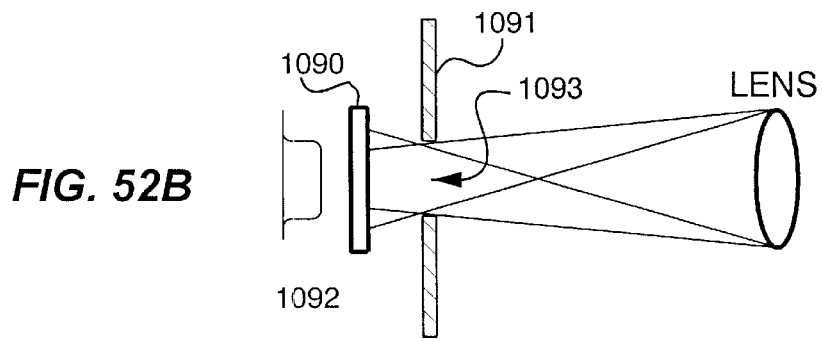

If an existing CCD detector 1079 has an aspect ratio that is considered larger than optimum to handle rotated bar code labels at all tolerable angles, there are several ways to modify the system to provide a more acceptable aspect ratio without requiring the CCD detector 1079 itself be modified. For example, as shown in FIGS. 52A and 52B, the CCD detector 1079 may be transformed into a CCD detector 1090 having a more acceptable aspect ratio by use of a metal mask 1091 over the pixels. The metal mask 1091 has a slit 1093 which allows light to reach only the portions of the CCD pixels conforming to the height of the mask, thereby allowing relatively simple mechanical adjustment of the effective height of the CCD pixels.

Use of a metal mask 1091 may prove to be more economical than use of a different CCD detector having the proper pixel aspect ratio. The mask 1091 can be applied externally in front of the CCD detector 1090, as shown in FIGS. 52A and 52B. The mask 1091 is preferably physically close (e.g., touching) to the imager plane so as to reduce the effect of vignetting, which would cause light rays to spill over into regions of the CCD photodetectors not intended for light collection. FIG. 52B shows a flux density graph 1092 adjacent to the CCD detector 1090, which illustrates a gradual roll off of flux density caused by small amounts of vignetting even with a properly positioned mask 1091. If, however, the mask 1091 is too far away, it ceases to be useful for reducing the pixel aspect ratio and simply reduces light collection efficiency.

In a preferred embodiment, the top layer metal mask of the CCD chip itself is modified so as to provide an appropriate sized slit 1093 in front of the CCD photodetectors. For example, with a Sony ILX-526 CCD chip, a preferred mask slit on the top layer metal mask of the chip has a height dimension and a width dimension so as to provide a 10:1 pixel aspect ratio.

Figure 52C:
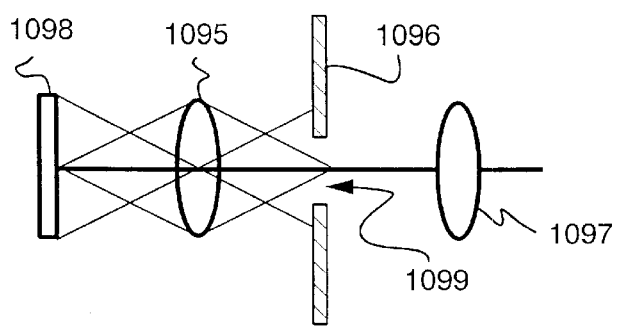
FIG. 52C is a diagram of a masked CCD array embodiment including an additional lens for reducing the effect of vignetting.

An alternative modified CCD imaging system with an external mask is shown in FIG. 52C, wherein extra optics are used to re-image the pixels to a new imaging plane. In the FIG. 52C imaging system, an imaging lens 1097 is positioned in front of a mask 1096 (opposite the CCD array 1098) having a slit 1099. The mask 1096 is positioned further away from a CCD detector 1098 than the FIG. 52A–52B system. In between the mask 1096 and the CCD detector 1098 is positioned a second lens 1095. The second lens 1095 reduces or eliminates vignetting by re-directing light focused by the imaging lens 1097 onto the CCD detector 1098. Hence, the corrective mask 1096 is more effective in this system than in the system of FIGS. 52A–52B, and the problems associated with vignetting are less of an issue. The FIG. 52C system does, however, have the additional complexity of a second lens and a longer path length for the optical system.

Figure 53:
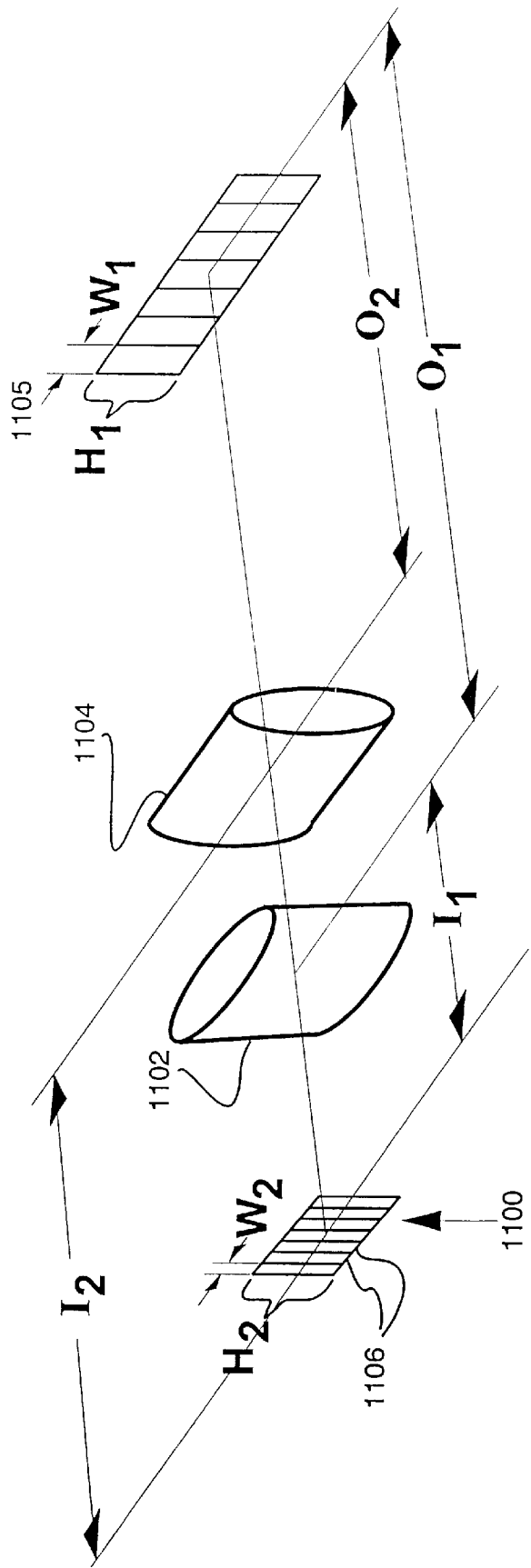
FIG. 53 is a diagram of an imaging system including an anamorphic lens system.

Another alternative for modifying pixels of a CCD detector with too large an aspect ratio is an anamorphic lens system, such as shown in FIG. 53. The FIG. 53 system includes a CCD detector 1100 in front of which is positioned a first aspheric cylinder lens 1102 in a vertical orientation with respect to the CCD detector 1100 and a second aspheric cylinder lens 1104 in front of the first aspheric cylinder 1102 and in a horizontal orientation with respect to the CCD detector 1100. Each aspheric cylinder lens 1102, 1104 provides significant modulation along one axis only. The horizontally oriented aspheric cylinder lens 1104 is provided with a lower magnification power than the vertically oriented aspheric cylinder lens 1102, thereby reducing the effective aspect ratio of the pixels 1106 of CCD detector 1100. An element of height H1 and width W1 (i.e., aspect ratio of H1:W1) is therefore, by the operation of aspheric cylinder lenses 1102 and 1104, altered in apparent dimension at the CCD detector 1100 to have an aspect ratio of H2:W2. Alternatively, the "projection" of the pixels 1106 of the CCD detector 1100 onto the bar code plane are reduced in height from H2:W2 to H1:W1, where H1/H2<W1/W2.

The distance from the CCD detector 1100 to the vertically oriented cylinder lens 1102 is given as $I_1$, and the distance from the CCD detector 1100 to the horizontally oriented cylinder lens is given as $I_2$. Likewise, the distance from the bar code 1105 to the vertically oriented cylinder lens 1102 is given as $O_1$, and the distance from the bar code 1105 to the 1017 horizontally oriented cylinder lens is given as $O_2$. The height reduction of the system is $M_2/M_1$, where $M=O_1/I_1$ and $M_2=O_2/I_2$. Exemplary distance relationships between the various components are given in FIG. 53 for a height reduction of ⅓.

A possible drawback with the FIG. 53 system is that aspheric cylinders may be hard to manufacture.

A preferred embodiment of the present invention also makes use of a multi-focus lens system (e.g., a poly-optic system). Generally, use of a multi-focus lens allows an increase in depth of field without sacrificing the ability to collect light. Each lens element (called a zone) of a multi-focal lens is focused at a different distance. In one embodiment, further described herein, the field from each zone is simultaneously focused on the CCD detector. In another embodiment, also described further herein, each zone is multiplexed (with an LCD shutter, for example) on the CCD detector instead of simultaneously superimposing all zones. In yet another embodiment, also described further herein, each zone is imaged onto one of a plurality of separate CCD detectors.

Figure 21A:
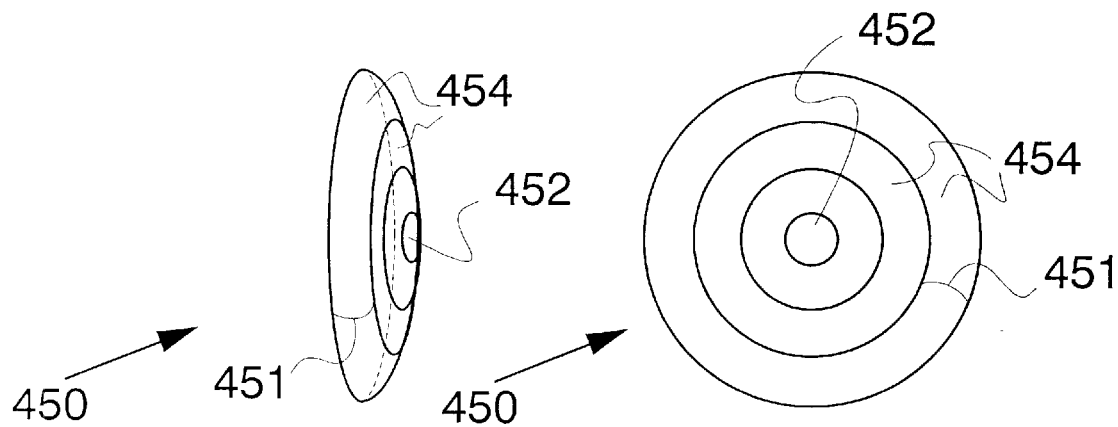
Figure 22A:
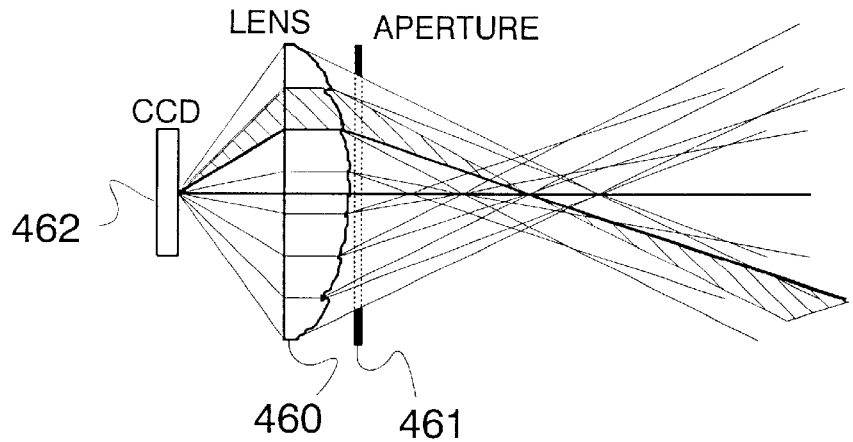
FIGS. 22A–22C are diagrams showing various views of a multi-focal lens system combined with an elliptical aperture.
Figure 22B:
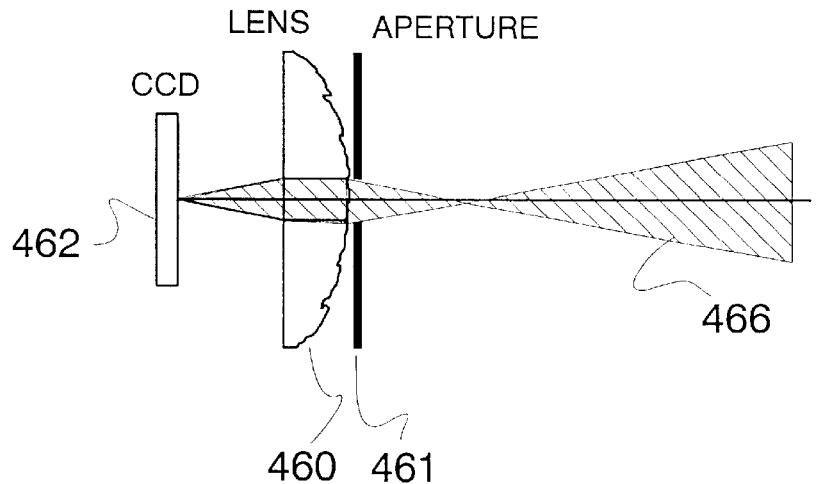
Figure 22C:
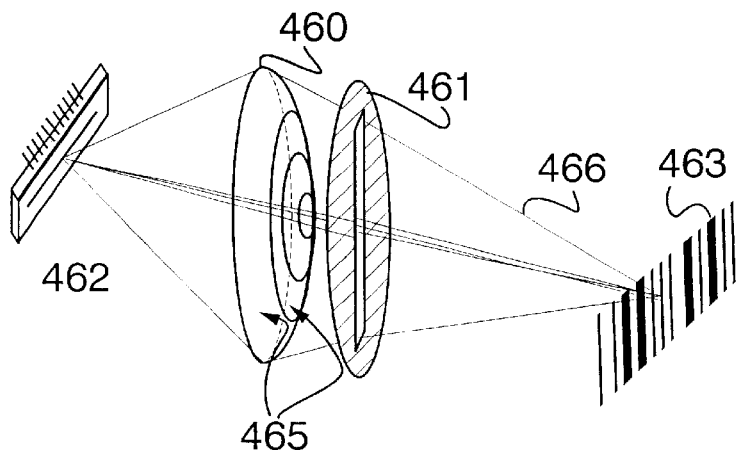

An exemplary embodiment of a multi-focus-lens system combined with an elliptical aperture is shown in various views in FIGS. 22A–22C. The symmetric multi-focal lens 450 has concentric zones and is depicted by itself in FIGS. 21A and 21B. FIG. 21A shows the multi-focus lens 450 from an oblique view, while FIG. 21B shows the same lens 450 from front view. As shown, the lens 450 is divided into a plurality of concentric zones 451. Such a lens 450 has a symmetric configuration and may be suitable for machining with a diamond turned lathe.

The lens and aperture system of FIGS. 22A–2C are shown from three different views. FIG. 22A shows a side view, FIG. 22B shows a top view, and FIG. 22C shows an oblique view. The lens and aperture system of FIGS. 22A–22C comprises an elliptical (or rectangular) aperture 461 located in front of a multi-focus lens 460. The elliptical aperture 461 preferably has a high aspect ratio. The elliptical aperture 461 and multi-focus lens 460 are placed before an imager 462, such as the CCD detector described earlier herein. In operation, light reflected from a bar code 463 passes through the elliptical aperture 462 and is focused by the multi-focus lens 460. Each zone 465 of the multi-focus lens 460 focuses the reflected light 466 in a different manner on the imager 462, because each zone 465 focuses at a different distance (i.e., has a different focal length in front of the lens 460). The depth of field is thereby expanded over that of a single-focus lens.

The response of a multi-focus lens (such as lens 450) may be determined under principles of superposition by summing the responses of each lens zone 451 by itself. If a shutter is used to screen out zones 451 of the multi-focus lens 450 (e.g. by use of an LCD), only one zone 451 (or however many zones are unscreened) at a time need be analyzed, and the result of each individual zone superimposed to obtain a composite response for the lens 450.

Figure 23A:
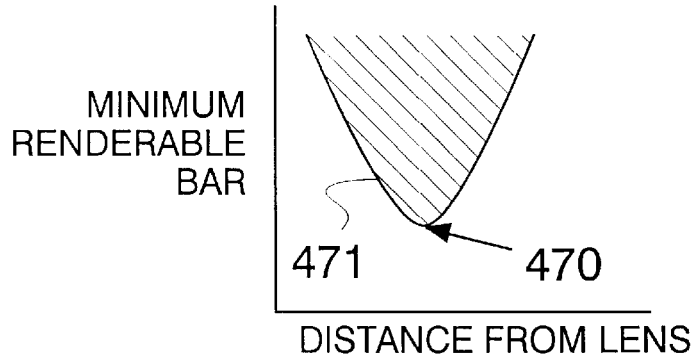
FIGS. 23A, 23B and 23C are graphs showing a minimum renderable bar width as a function of distance from a single-lens, a poly-optic lens with no interference, and a poly-optic lens with inter-zonal interference, respectively.
Figure 23B:
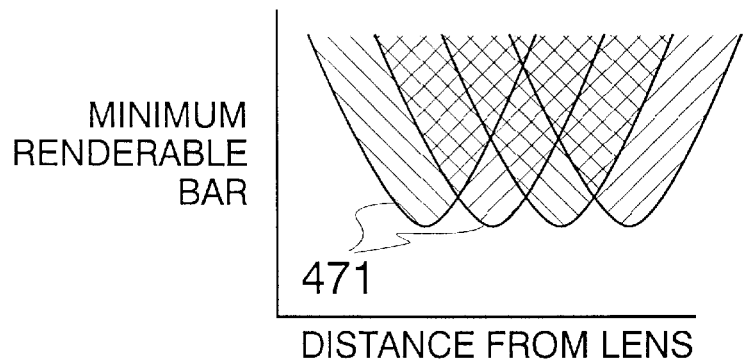

FIG. 23A is a graph showing the minimum renderable (i.e., resolvable) element width as a function of distance from the lens in a single-lens system. FIG. 23B is a graph showing minimum renderable bar width as a function of distance from the lens for a poly-optic (i.e., multi-focus) lens system, assuming no interference. Each parabolic-shaped plot 471 represents a particular zone 451 of the poly-optic lens 450. A focal point 470 corresponds to the minimum point of the parabola. The plots 471 are superimposed on one another to graphically show the creation of an enlarged depth of field for the poly-optic system. However, it is also possible that the different zones 451 may interfere with one another, causing "dead zones" in the depth of field plot. These dead zones 472 are depicted graphically in FIG. 23C, which is a similar plot to FIG. 23B but assumes that there is intra-lens interference from the poly-optic lens 450.

Interference between zones 451 may be caused by lobes in the line spread function of the lens 450, by mis-alignment of the optical centers of the zones 451, or a differene in the field of view of each zone 451. Different lens configurations generate different lobe patterns. Some point spread functions for a few common poly-optic lenses are shown in the FIGS. 24A through 30C and described below.

Figure 24A:
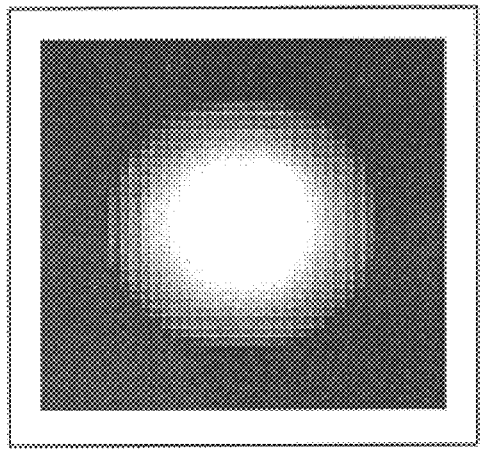
FIGS. 24A and 24B are diagrams of point spread functions for a center zone of the FIG. 21A–21B lens through focus and away from focus, respectively.
Figure 24B:
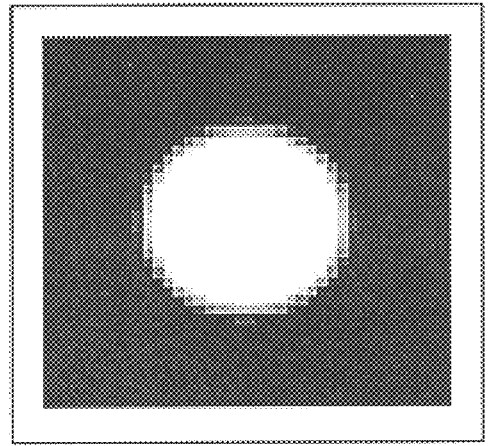
Figure 25A:
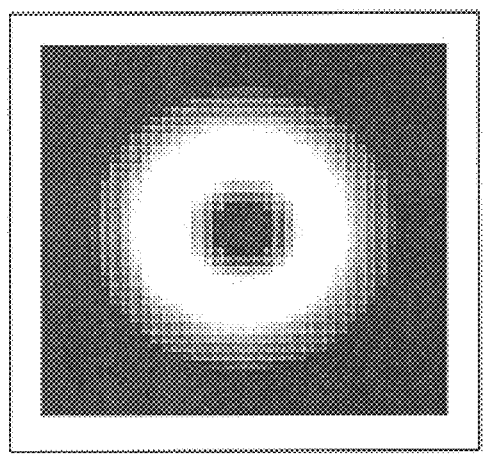
FIGS. 25A and 25B are diagrams of point spread functions for a ring zone of the FIG. 21A–21B lens through focus and away from focus, respectively.
Figure 25B:
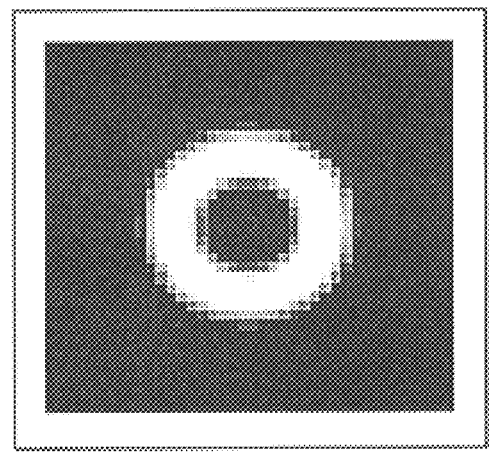

A simple multi-focus lens 450 configuration comprises a set of concentric zones 451, each with its own focal length, as shown previously in FIGS. 21A–21B. The point spread function through focus for the center zone 452 of the FIG. 21A lens is shown in FIG. 24A at focus and FIG. 24B away from focus. The point spread function through focus for a particular ring zone 454 (e.g., any other zone 451 besides the center zone 452) is shown in FIG. 25A at focus and FIG. 25B away from focus. The diagrams of FIGS. 24A and 25A are full scale, while the diagrams of FIGS. 24B and 25B are reduced relative thereto by a factor of 10:1.

FIGS. 26A through 30C depict point spread and line spread function plots of various combinations of center and ring zones of various focal lengths. The optical point spread function images appearing in FIGS. 26A through 30C have been approximated for simplicity. In general, the point spread function far from focus can be well approximated by geometric optics. For a circular aperture, the shape of the point spread function far from focus is similar to a cylinder. At or near focus, the point spread function's shape is determined by aberrations (if they are large) or by diffraction (if the aberrations are small). The point spread functions-depicted in FIGS. 26A through 30C are primarily diffraction limited (i.e., they assume only small aberrations) at or near focus. For a circular aperture, the shape of the point spread function at or near focus should be close to the shape of an Airy disk.

FIG. 26B is a diagram of one image 480 created from a center zone 452, while FIG. 26A is a diagram of another image 481 created from a ring zone 454, where the center zone 452 and ring zone 454 have differing focal lengths. FIG. 26C is a diagram showing a combined image 482 created from the combination of the center zone 452 with the ring zone 454 with only the center zone 452 in focus. In FIG. 26C, the image from the ring zone 454 is not readily visible mainly due to its low flux density, since it is out of focus. However, the plots of the line spread functions 483 and 484 clearly show the effect of the ring zone 454. The line spread functions 483, 484 each have a main peak 488 and 489, respectively, corresponding to the center zone 452 and a pair of much lower peaks 490 and 491, respectively, corresponding to the ring zone 454. As the center zone 452 goes out of focus, the effect of the ring zone 454 will become considerably more pronounced.

FIGS. 27A–27C illustrate point spread functions in between the focus of both zones. FIG. 27B is a diagram of an image 500 created by the center zone 452, while FIG. 27A is a diagram of an image 501 created by a ring zone 454, assuming differing focal lengths. FIG. 27C is a diagram of a combined image 502 created from both the two zones 452, 454, while in between the focus of both. It may be noted that, while there is a "dip" 503 or dead spot in the center of the combined image 502, the line spread functions 505, 506 are relatively free of the effect of this dip 503.

FIGS. 28A–28C illustrate point spread functions when the ring zone 454 is in focus. FIG. 28B is a diagram of an image 510 created by the center zone 452, while FIG. 28A is a diagram of an image 511 created by a ring zone 454, assuming differing focal lengths. FIG. 28C is a diagram of a combined image 512 created from both the two zones 452, 454. The combined image 512 of FIG. 28C is very similar to that of FIG. 26C, wherein only the center zone 452 was in focus. The line spread functions 515, 516 in FIG. 28C, however, show the effect of the out-of-focus center zone 452.

FIGS. 29A–29C illustrate a more severe effect, wherein a ring zone 454 is not blurred enough with respect to the center zone 452. The result is an image 522 having a ring structure. FIG. 29B is a diagram of an image 520 created by the center zone 452, while FIG. 29A is a diagram of an image 521 created by the ring zone 454. FIG. 29C is a diagram of a combined image 522 created from both the two zones 452, 454 contains the ring structure, as mentioned, which appears as diffuse light in a ring pattern around the center focal point. The line spread functions 525, 526 indicate the effect of this ring structure. The ring structure may cause excessive intersymbol interference (ISI) when attempting to read bar codes.

Because of the ISI that may be caused by a ring zone such as shown in FIG. 29C, an apertured ring zone (a sector) is preferred for reading bar codes. FIGS. 30A–30C are diagrams of images created under the same conditions as FIGS. 29A–29C, but for a system where the ringed zone is apertured with two circular apertures. FIG. 30B is a diagram of an image 530 created by the center zone 452, while FIG. 30A is a diagram of an image 531 created by the apertured ring zone 454. FIG. 30C is a diagram of a combined image 532 created from both the two zones 452, 454. The use of two circular apertures as shown in the horizontal line spread function 536 of FIG. 30C successfully removes the side lobes in the horizontal pattern. This form of aperturing can thus be used to read bar codes whose bars are vertically oriented without creating an undue amount of inter-symbol interference from the multi-focus lens.

FIG. 31A–31C are diagrams illustrating a particular apertured multi-zone lens configuration providing a line spread function similar to that in FIG. 30C. In FIGS. 31A–31C, a symmetric multi-focus lens 601 is shown from several viewpoints with a plurality of apertures 602, one aperture 602 located in front of each one of a plurality of zones 603 the lens 601. While FIG. 30C shows an image resulting from two circular apertures, the apertured multi-focus lens 601 of FIGS. 31A–31C provides a plurality of images from the multiple ring zones and a corresponding plurality of peaks in the vertical line spread function 535. However, the apertured multi-focus lens 601 of FIGS. 31A–31C would, like the configuration of FIG. 30C, also have a horizontal line spread function 536 relatively free from intersymbol interference.

The apertures 602 of FIG. 31A or 31B need not be circular, but may be square, rectangular, or any other suitable shape. In a preferred embodiment, each of the apertures 602 are roughly square in shape. When physically manufactured the square apertures can be melded into a continuous opening similar to that of the aperture 461 in FIGS. 22A–22C. While such a continuous opening may be "rectangular" in overall shape, it functions as a series of discrete, individual apertures, one for each lens zone.

The selection of the height of the apertures 602 in front of each zone may be a compromise balancing light collection requirements and roll response characteristics. The width of each aperture 602 controls the depth of field for its lens zone, and is preferably the same for each aperture 602 so as to minimize interzonal interference.

It is preferable for each of the apertured zones 603 to have a different focal length. This may be achieved in at least two different ways. In a first technique, a symmetric lens 610 is physically cut immediately below the center-zone 611, as shown in FIG. 32. The cut lens 612 will have the characteristics of an asymmetric multi-focus lens. In a second technique, the lens 620 may be molded in an asymmetric fashion, as shown in FIG. 33, such that the lower portions 621 of each ring zone have a different focal length than the upper portions 622 of each ring zone. An advantage of the latter technique is that the lens could be constructed so as to have its optical axis 625 in the center of the lens 620, as shown in FIG. 33.

Figure 34A:
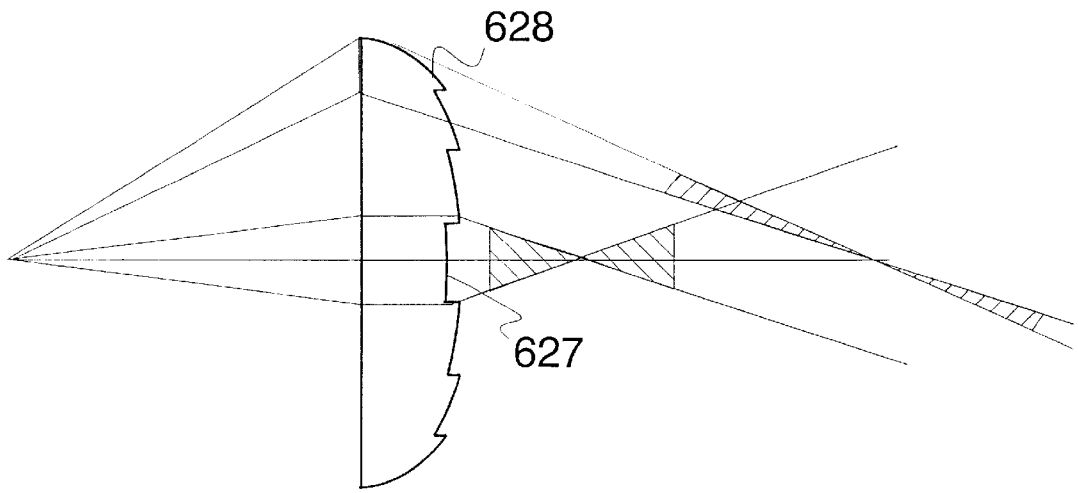
FIGS. 34A is a diagram showing off-axis tilt when the center zone focuses to the closest depth and the outside ring zone focuses to the farthest depth.
Figure 34B:
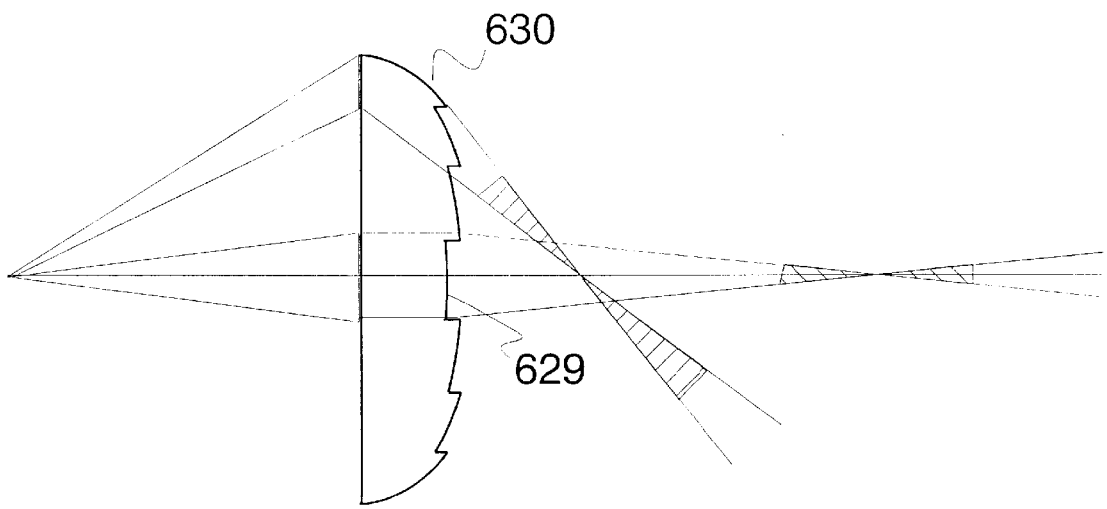
FIG. 34B is a diagram showing the reverse situation.

For the above asymmetric lens configurations, the off-axis tilt is typically smallest when the center zone 627 focuses to the closest depth and the outside ring zone 628 focuses to the farthest depth, as shown in FIG. 34A. FIG. 34B illustrates the reverse situation, which may lead to greater pointing problems.

An alternative optical collection system employs a "masked" or apodized multiple focus lens, such as shown in either of FIG. 54A or 54B. In FIG. 54A, a multiple-zone lens 1120 is shown having concentric ringed zones 1121a through 1121d, and further having darkened portions 1122 which are masked or apodized. The apodized portions 1122 can be created by depositing silver or other reflective material on the lens 1120. Likewise, in FIG. 54B, a multiple-zone lens 1130 is shown having concentric ringed zones 1131a through 1131d, and also having apodized portions 1132. The apodized lenses 1120, 1130 of FIGS. 54A and 54B provide a multiple focal plane optical collection system which maintains high collection efficiency while reducing interference between light rays from the different focal planes that are simultaneously incident on a CCD detector. The masking can therefore replace the aperture(s) of the embodiments shown in FIGS. 22A–22C and 31A–31C, inasmuch as the masking has a similar effect as the aperture(s) in reducing inter-zonal interference.

The FIG. 54A and 54B lenses 1120, 1130 preferably each comprise a set of concentric annular zones 1121a–d and 1131a–d, respectively, having varying focal lengths. The area of each zone 1121a–d and 1131a–d is preferably substantially equal, so that substantially equal amounts of light are collected from each zone. This condition requires that $r_N = r_{center} \sqrt{N}$ for an unmasked lens 1120 or 1130, where $r_N$ is the outer radius for zone N, and $r_{center}$ is the radius of the center zone 1121d or 1131d. The radii required to maintain constant collection area from zone to zone will change in a straightforward fashion from this equation to account for the reduction in area due to the masking.

Figure 55A:
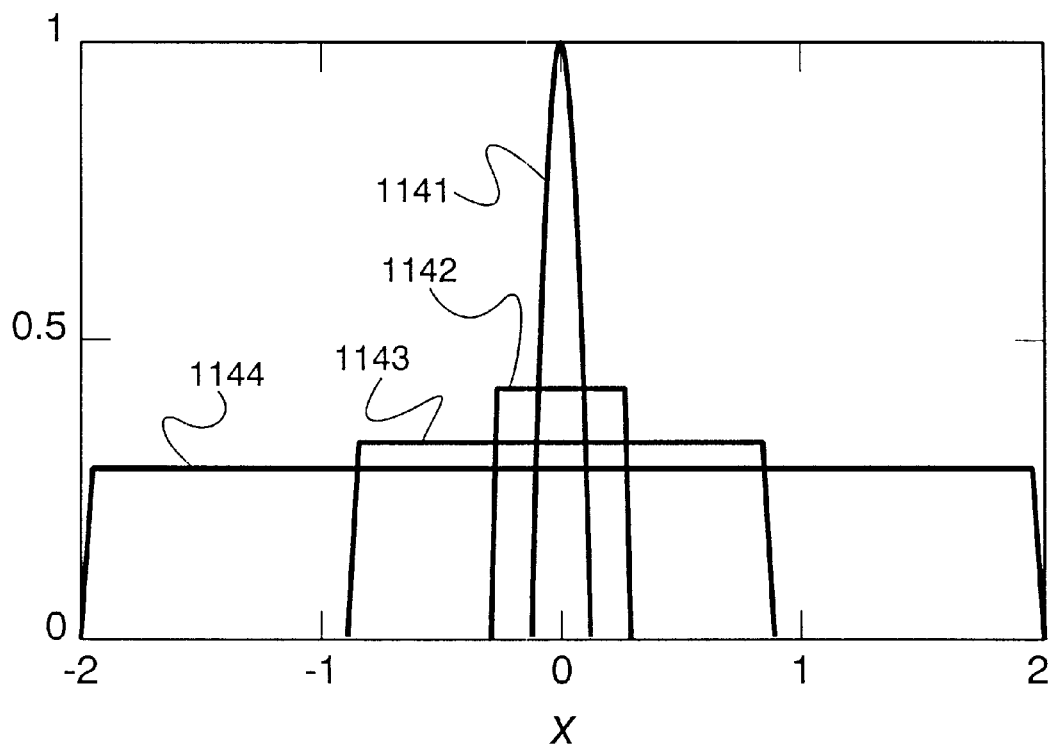
FIGS. 55A and 55B are line spread functions associated with the apodized lenses of FIGS. 54A and 54B.
Figure 55B:
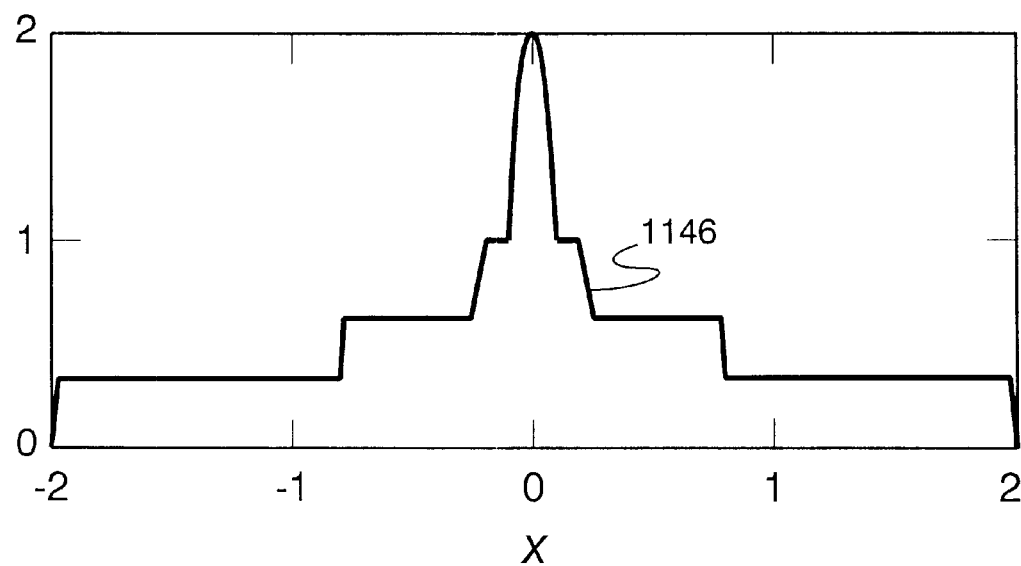

FIG. 55A is a graph of individual line spread functions 1141 through 1144 for each lens zone 1121a–d or 1131a–d of the multi-focal lenses of either FIG. 54A or 54B. Lobes that would otherwise exist in the horizontal line spread functions are reduced or eliminated by use of a mask (e.g., apodization on the lens itself) to maintain a constant vertical height for each zone 1121a–d or 1131a–d of the lens 1120 or 1130. The resulting composite or vertically-integrated horizontal line spread function 1146 is shown in FIG. 55B. As shown in FIG. 55B, the resulting vertically-integrated horizontal line spread function 1146 is relatively flat, without lobes.

The line spread function varies depending on the focal distance and the effect of aberrations and diffraction. For the regions of depth of field (i.e., non-intermediate regions) where geometric optics prevails over aberrations and diffraction, the FIG. 54A and 54B masking will provide a composite line spread function as shown in FIG. 55B. Near a focal plane, however, aberrations and diffraction may prevail over geometric optics causing reduced performance. Many of the families of masks that work well in near and far field will not work well at intermediate distances. Preferably, an optimal mask pattern is selected which minimizes side-lobes over a maximum range of distances. The optimal mask pattern selection depends upon a variety of factors, including the number and position of focal planes present in a particular optical collection system, the degree of aberration correction required, the angular field of view required, and/or the size of the barcodes to be read.

In addition to the poly-optic lenses of FIGS. 21A–21B and the apodized poly-optic lenses of FIGS. 54A–54B, another method for constructing multi-focus lenses having the desired properties is to combine a plurality of individual lenses, one for each zone. Each individual lens has an off-center circular aperture and is optimized for the desired focus condition of the corresponding zone. Each lens zone in turn is optimized. The final lens essentially comprises a piecewise continuous combination of each individual lens zone.

It may, on the other hand, be possible to make a multi-focus lens with just one continuous lens curvature. In such a case, the lens can be optimized in at least two ways. First, a global merit function can be made that takes into account the focal properties of each zone. The entire aspheric deformation coefficients can then be solved at once. The second method is to allow each zone a few deformation coefficients, giving the center zone the lowest order coefficients and the edge zone the highest order coefficients. The system is optimized in order, from the center zone to the edge. This method involves an iterative process, as the edge zones may need to cause slight modifications to the lower order coefficients so as to minimize aberrations.

Several particular optical structures are discussed below, many or all of which exemplify the advantages of poly-optic design thus far described.

Figure 35A:
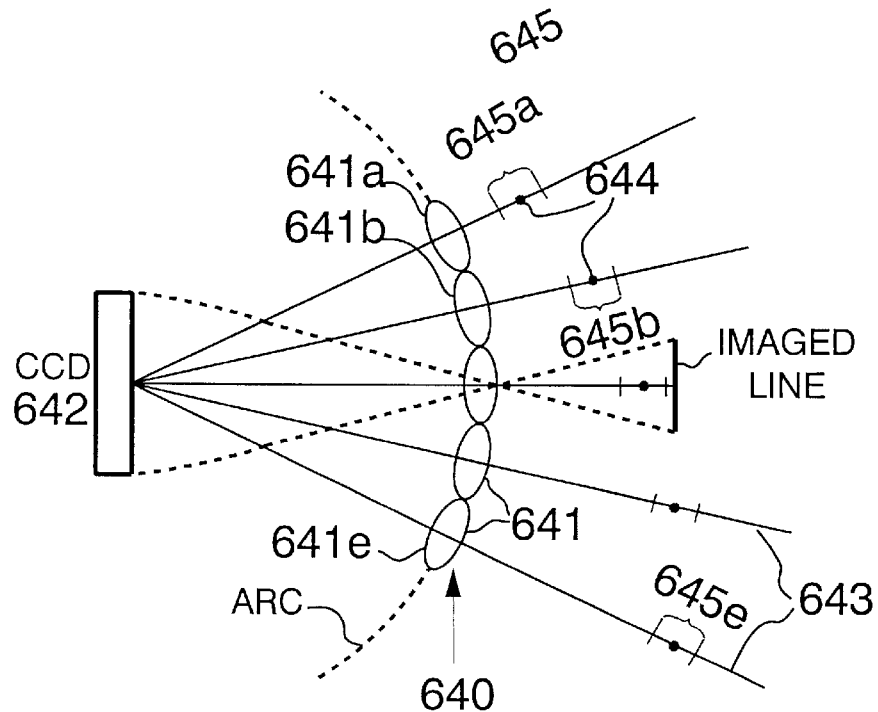
FIGS. 35A and 35B are diagrams showing different embodiments of a lens system having an array of lenses arranged in a pattern around an imaging device.

One particular optical lens structure is shown in FIG. 35A. In FIG. 35A, which is drawn from a top view, an array 640 of single-focus lenses 641 are arranged in an arc-like pattern around an imager (e.g., a CCD detector 642). Each lens 641 is a slightly different distance away from the CCD detector 642, so the pattern formed by the lens array is not a perfect arc. Alternatively, a set of different focal length lenses could be aligned in an arc to achieve the same result. The centers of the scan lines 643 associated with each of the lenses 641 fan out in a radial fashion from the CCD detector 642. The focal points 644 of the lenses 641 are staggered, so that the top lens 641a has the closest field depth 645a (because it has the nearest focal distance), the next lens 641b has the next closest field depth 645b, and so on, until the last lens 641e which has the farthest depth of field 645e.

Figure 36A:
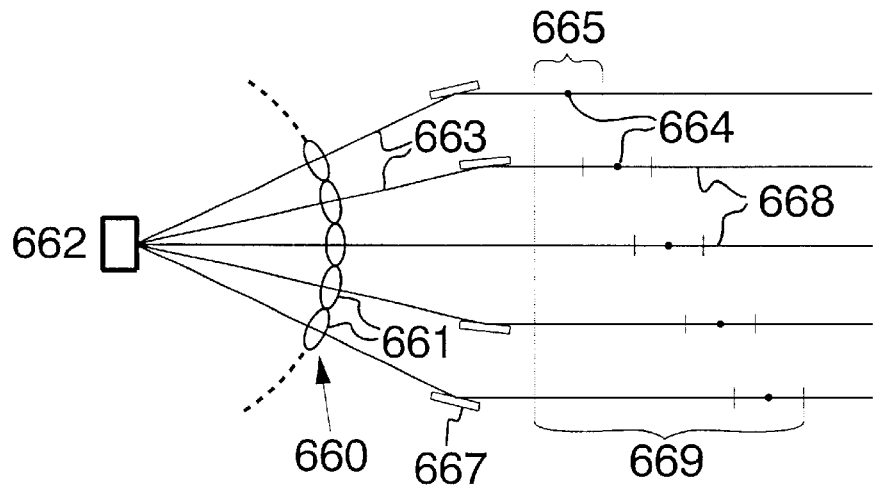
FIGS. 36A–36C are diagrams of various embodiments of a lens system for planar coverage having an array of lenses arranged in a pattern around an imaging device.
Figure 36B:
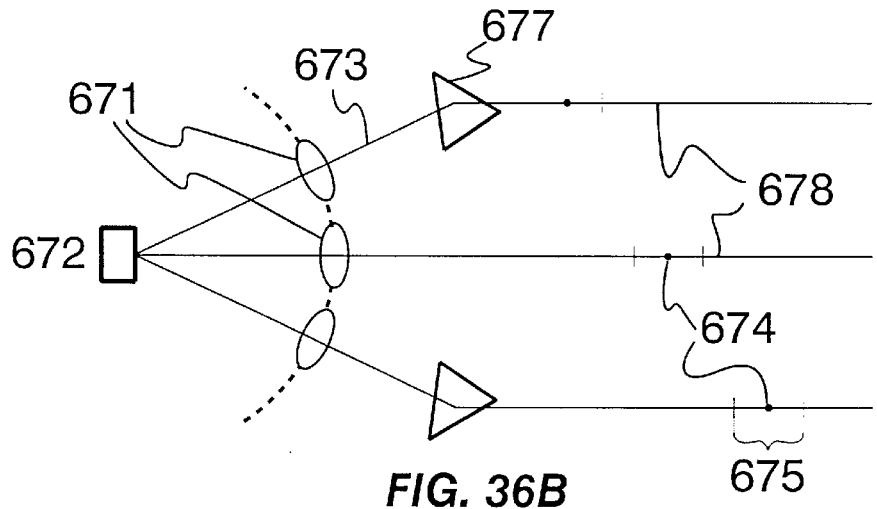
Figure 36C:
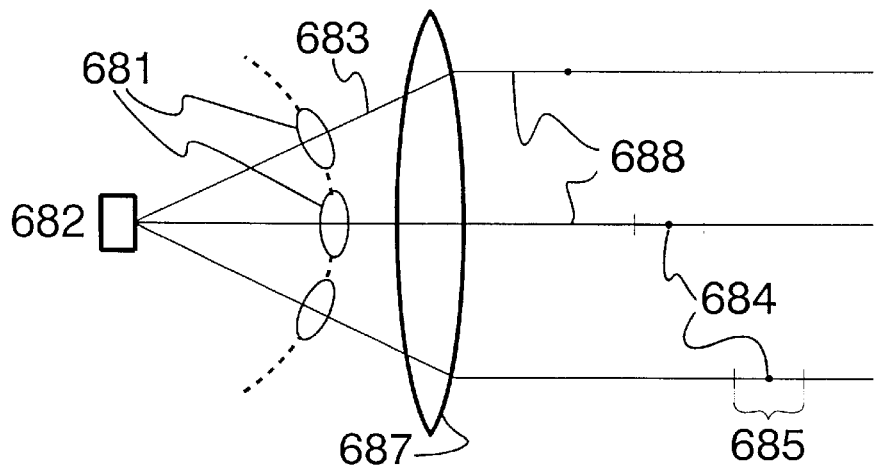

An advantage of the FIG. 36A embodiment is that it provides a more dense coverage of a plane. In place of mirrors 667, prisms or light-directing lenses may be used instead, or any combination of mirrors, prisms and/or light directing lenses. FIG. 36B shows the FIG. 36A embodiment implemented using prisms 677 instead of mirrors. FIG. 36C shows the FIG. 36A embodiment implemented using a single collimating lens 687 to perform a similar function.

Figure 37A:
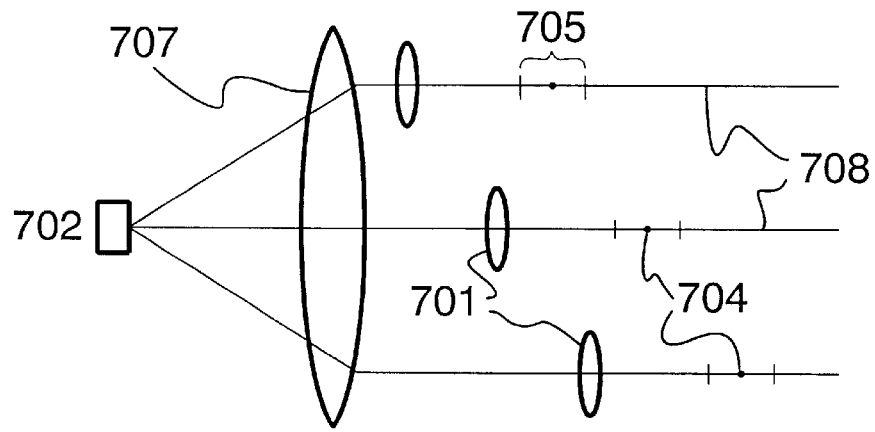
FIGS. 37A–37C are diagrams showing other embodiments of a lens system for planar coverage having an array of lenses arranged in a pattern around an imaging device and including a collimating lens.

Another embodiment of an optical structure is shown in FIG. 37A. The FIG. 37A structure is similar to that of FIG. 36C, but reverses positions of the large single lens 707 and the array of lenses 701. A large single collimating lens 707 is located in front of an imager (e.g., a CCD detector 702). A plurality of smaller lenses 701 are positioned in front of the larger lens 707, is and are staggered slightly in distance from the larger lens 707. Scan lines 708 from the smaller lenses 701 are directed in a collimated pattern to provide dense coverage of a plane. The scan lines 708 are directed by the larger lens 707 to the CCD detector 702. Each of the smaller lenses 701 has a different depth of field 705, so that a larger composite depth of field is created.

Figure 37B:
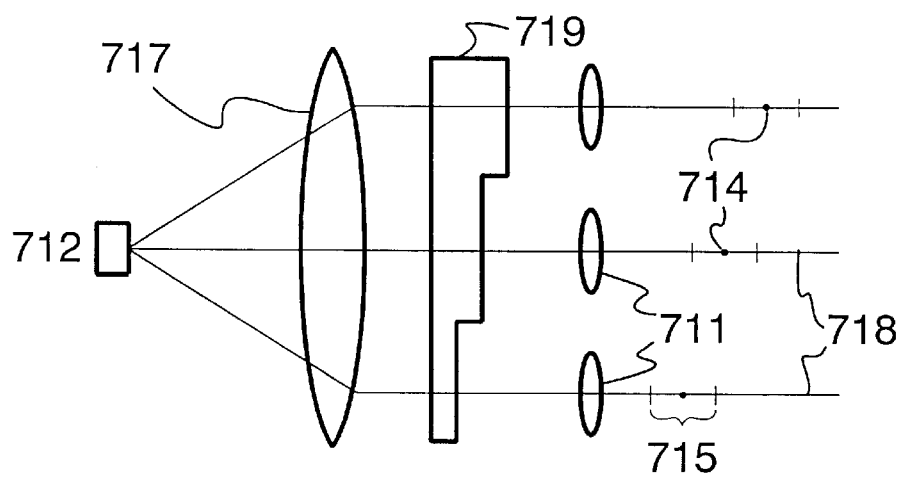

Another embodiment of an optical structure is shown in FIG. 37B. The structure of FIG. 37B is conceptually similar to that of FIG. 37A. FIG. 37B, like the structure of FIG. 37A, comprises a large collimating lens 717, convex in shape, positioned in front of a CCD detector 712. The FIG. 37B structure also comprises an array of smaller lenses 711. Rather than An advantage of the optical structure shown in FIG. 35A is that the structure may provide for a seamless depth of field without using shutters, so long as the lenses 641 are arranged so as not to cause interference with one another. Another advantage is that the structure mitigates the effect of coma, due to the radial fanning of the centers of the scan lines 643.

Figure 35B:
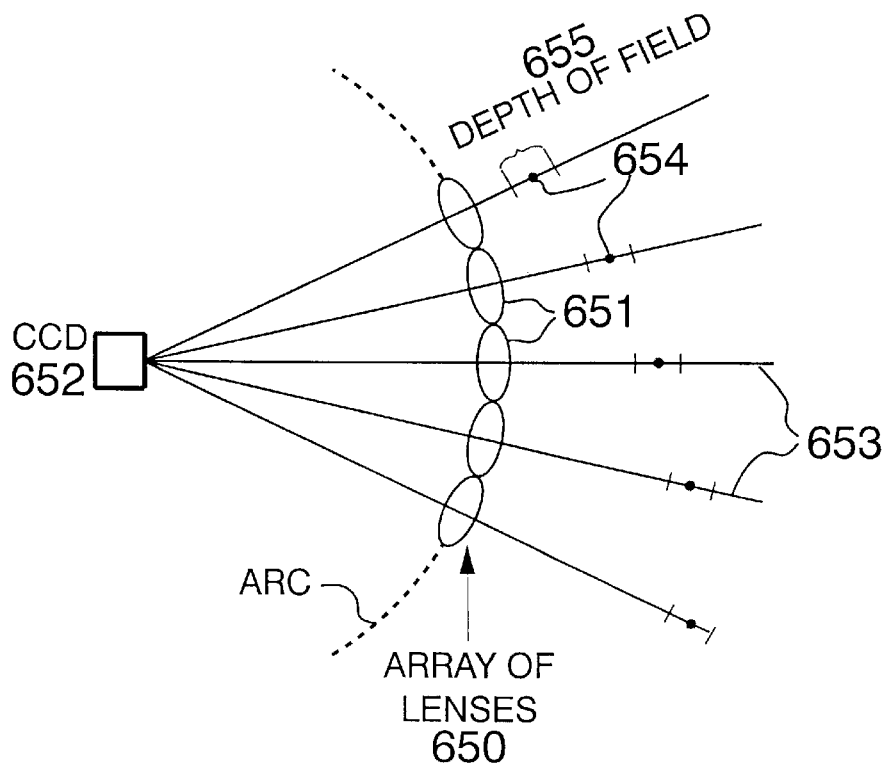

A related embodiment of an optical structure is shown in FIG. 35B. The FIG. 35B structure is similar to the FIG. 35A structure, except that the FIG. 35B embodiment is shown from a side view instead of a top view, so that the array 650 of lenses 651 expands the depth of field vertically rather than horizontally. The FIG. 35B structure has similar properties of an arc-like pattern of lenses 651, radially fanning scan lines 653, staggered depth of fields 655, and a corresponding mitigation of the effect of coma and aggregate expansion of depth of field for the system.

Another embodiment of an optical structure is shown in FIG. 36A, which is a modification of the system of FIG. 35B. Like FIG. 35B, the FIG. 36A embodiment depicts an array 660 of lenses 661 arranged in an arc-like pattern around a CCD detector 662. Scan lines 663 fan out radially from the CCD detector 662. The FIG. 36A embodiment further adds a set of mirrors 667 arranged to form the radial scan lines 663 into a collimated set of scan lines 668. The individual depths of field 665 are staggered for each lens 661 along the collimated scan lines 668. A composite depth of field 669 is shown adjacent to the collimated scan lines 668. staggering the distance of the smaller lenses 711 from the larger lens 717, however, in FIG. 37B is added a set of staggered optical flats 719 positioned between the larger lens 717 and the array of smaller lenses 711. The staggered optical flats 719 shift the focal point of the smaller lenses 711 and provide staggered of depths of field 715 along the collimated scan lines 718 associated with the array of lenses 711.

An advantage of the FIG. 37B system is that the smaller lenses 711 need not be staggered, and therefore may facilitate manufacture of the optical system.

Figure 37C:
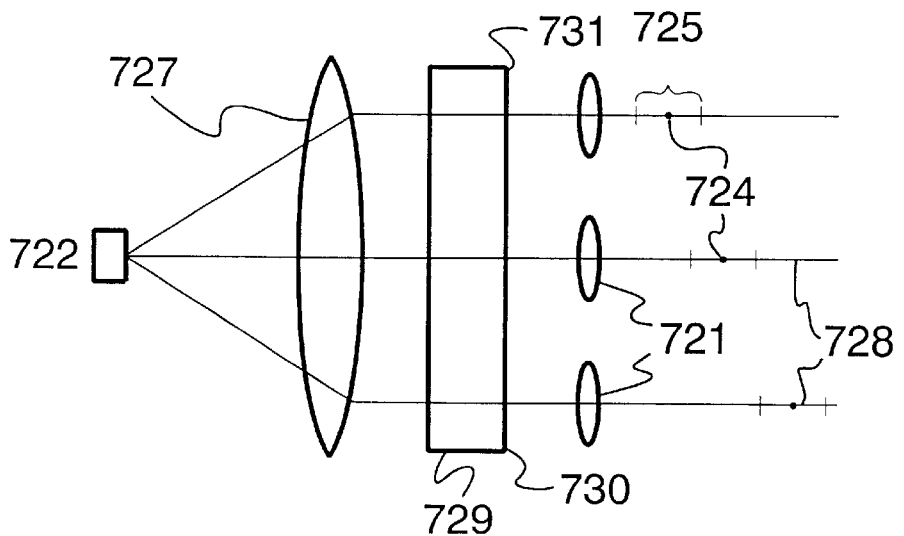

Another embodiment of an optical structure is shown in FIG. 37C. The structure of FIG. 37C is similar to that of FIG. 37B, except that a graded index element (also called a "GRIN" element) 729 is used in place of the staggered optical flats 719. An array of smaller lenses 721, as in FIG. 37B, is non-staggered. The smaller lenses 721 are positioned in front of the GRIN element 729, which is positioned in front of a large collimating lens 727 set before the CCD detector 722. Scan lines 728 form a collimated pattern, providing dense coverage of a plane. The GRIN element 729 is formed of a material having-a graded index, so that the path length differs along its axis. Thus, towards one end 730 of the GRIN element 729, the path is long, while towards the other end 731 of the GRIN element 729, the path is short. Accordingly, the field depths 725 are staggered along the collimated scan lines 728, as shown.

Figure 38A:
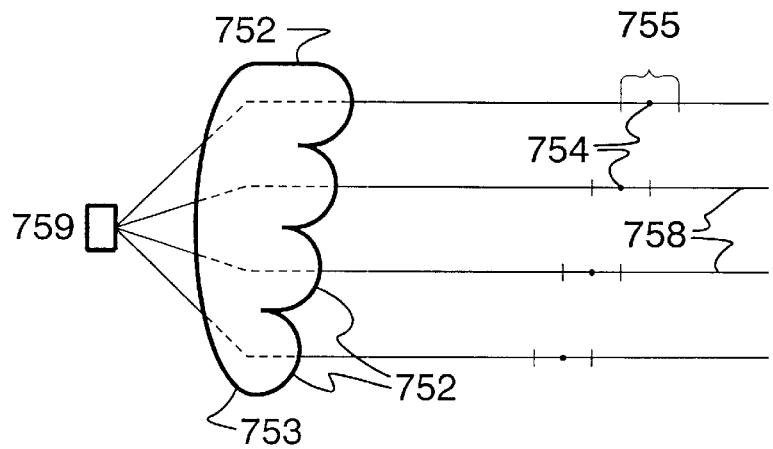
FIGS. 38A–38B are diagrams of alternate embodiments of a poly-optic lens system.

FIG. 38A shows another embodiment of an optical structure. The FIG. 38A structure is similar to that of FIG. 37B, except that some of the individual elements of FIG. 37B have been incorporated into a single element. A poly-optic lens 751 incorporates aspects of the large collimating lens 717, the staggered optical flats 719, and the array of smaller lenses 711 shown in FIG. 37B into a single structure. The back portion 753 of the poly-optic lens 751 is curved in the shape of the collimating lens 717 of FIG. 37B. The array of smaller lenses 711 from FIG. 37B appear as individual lens elements 752 in FIG. 38A. The individual lens elements 752 are staggered, so that varying amounts of optical material are located between each individual lens element 752 and the collimated lens backing 753. This varying amount of optical material acts in a fashion similar to the staggered optical flats 719 of FIG. 37B, thereby providing for differing focal lengths and staggered field depths 755 along collimated scan lines 758. The poly-optic lens 751 of FIG. 38A therefore has a composite depth of field similar to that of FIG. 37B.

Figure 38B:
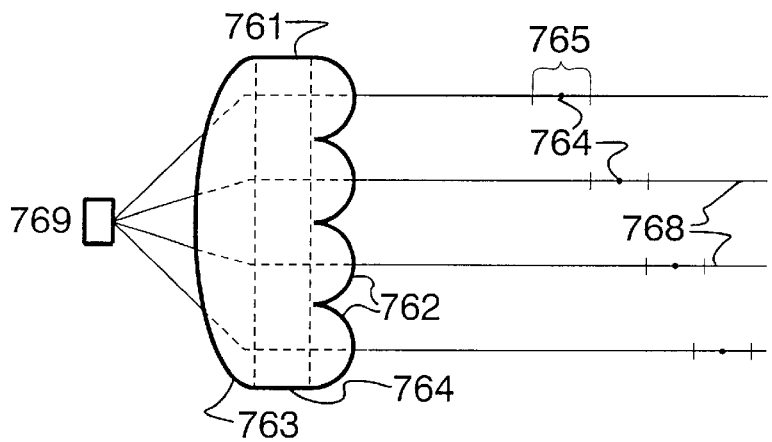

Another embodiment of an optical structure is shown in FIG. 38B. The FIG. 38B structure is similar to that of FIG. 37C, except that some of the individual elements of FIG. 37C have been incorporated into a single element. A poly-optic lens 761 incorporates aspects of the large collimating lens 727, the GRIN element 729, and the array of smaller lenses 721 shown in FIG. 37C into a single structure. The back portion of the poly-optic lens 761 is curved in the shape of the collimating lens 727 of FIG. 37C. The array of smaller lenses 721 from FIG. 37C appear as individual lens elements 762 in FIG. 38B. A GRIN element 764 is embedded between the individual lens elements 762 and the collimated lens backing 763, thereby providing for differing focal lengths and staggered field depths 765 along collimated scan lines 768. The poly-optic lens 761 of FIG. 38B therefore has a composite depth of field similar to that of FIG. 37C.

While FIGS. 36A through 39B are shown from a side view of the CCD detector, the CCD detector may also be rotated 90 degrees so that the lenses or other light collection elements are horizontally rather than vertically stacked, and so that the photodiodes receive the collected light in a manner similar to that shown in FIG. 35A. In general, horizontal stacking results in greater light collection, but vertical stacking results in less interference between lenses or lens elements.

Figure 39A:
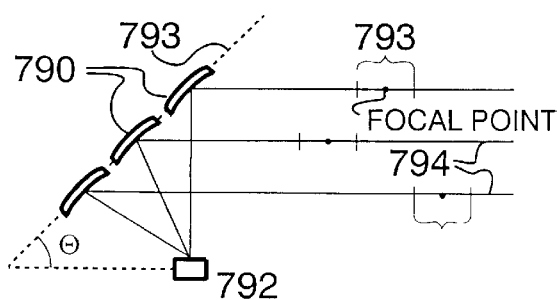
FIGS. 39A–39B are diagrams of alternate embodiments of an optical system using curved mirrors to collect light.
Figure 39B:
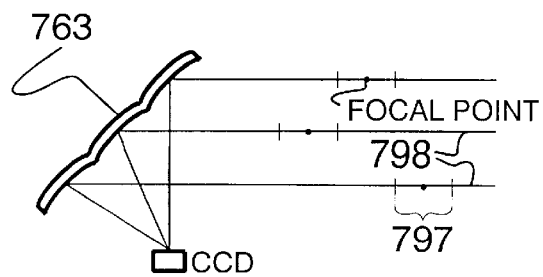

FIGS. 39A and 39B are alternative embodiments of optical structures using curved mirrors or similar elements. The optical system of FIG. 39A comprises an array of curved (i.e., focusing) mirrors 790 positioned in a diagonal line 791 at an angle θ with respect to a CCD detector 792. The array of curved mirrors with different focal lengths or different optical path lengths provide staggered field depths 793 along collimated scan lines 794 as shown. The structure of FIG. 39A minimizes the effects of chromatic aberration.

FIG. 39B shows a similar optical structure to FIG. 39A, but utilizes a single multi-faceted curved surface 796 rather than array of curved mirrors 790. The single multi-faceted curved surface 796 is positioned at a diagonal angle with respect to the CCD detector 792, and thereby provides staggered field depths 797 in a manner similar to the FIG. 39A structure along collimated scan lines 798 as shown. The FIG. 39B structure also minimizes the effects of chromatic aberration.

Figure 40A:
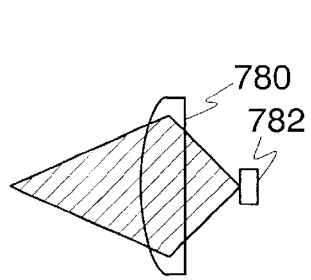
FIGS. 40A–40D are diagrams of a particular poly-optic lens from different angles illustrating light collection.

Another embodiment of a poly-optic lens system is shown in FIGS. 40A–40D. FIG. 40A is a diagram of a side view of a poly-optic lens 780 positioned in front of a CCD detector 782. As shown, light from a distant point is collected by the poly-optic lens 780 and focused on the CCD detector 782.

Figure 40B:
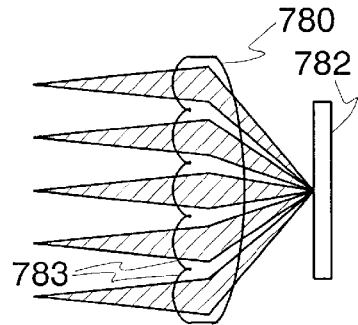
Figure 40C:
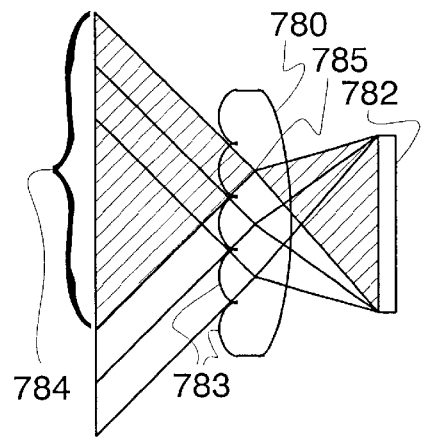
Figure 40D:
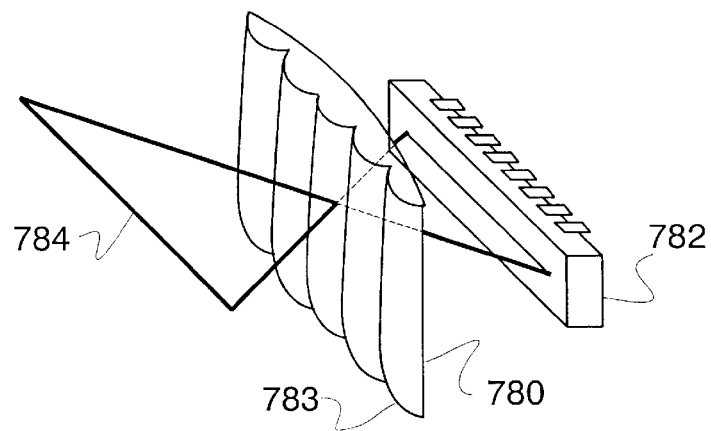

FIG. 40B is a diagram showing a top view of the same poly-optic system. Light from distant points on each of the collimated scan lines is collected by each individual lens element 783, and focused on the CCD detector 782. Preferably, each of the lens elements 783 has a different focal length. FIG. 40C is a diagram showing a top view of the same poly-optic system of FIG. 40B, but shows a target scan line 784 for several of the individual lens elements 783. Light reflected from a target scan line 784 passes through an axial point 785 in an individual lens element 783, as shown, and is projected onto the CCD detector 782. The target scan line 784 for each individual lens element 783 is slightly offset from the other target scan lines 784, due to the relative positions of the lens elements 783. FIG. 40D shows an oblique view of the same target scan line capture as FIG. 40C.

Figure 41A:
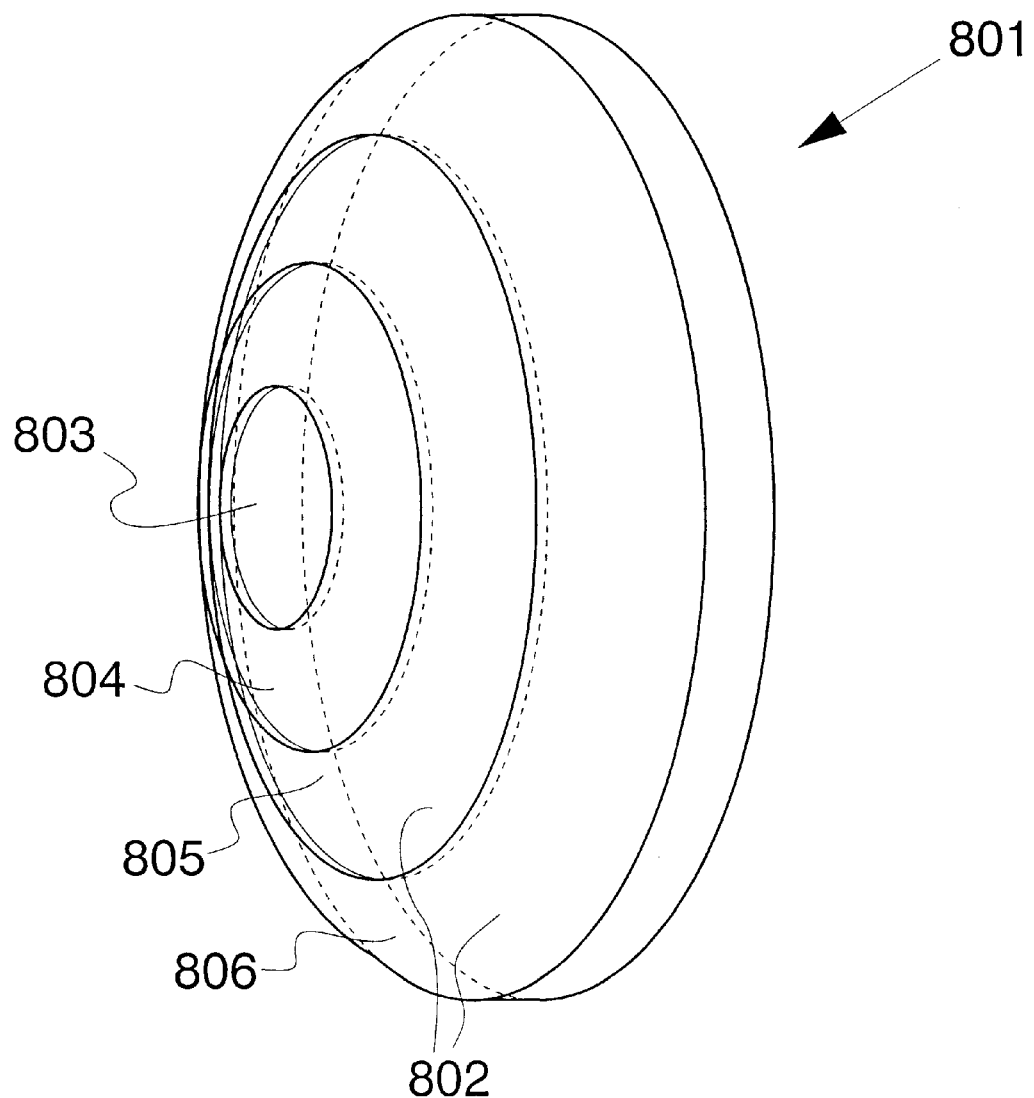
FIGS. 41A–41C are diagrams of a preferred poly-optic lens.
Figure 41B:
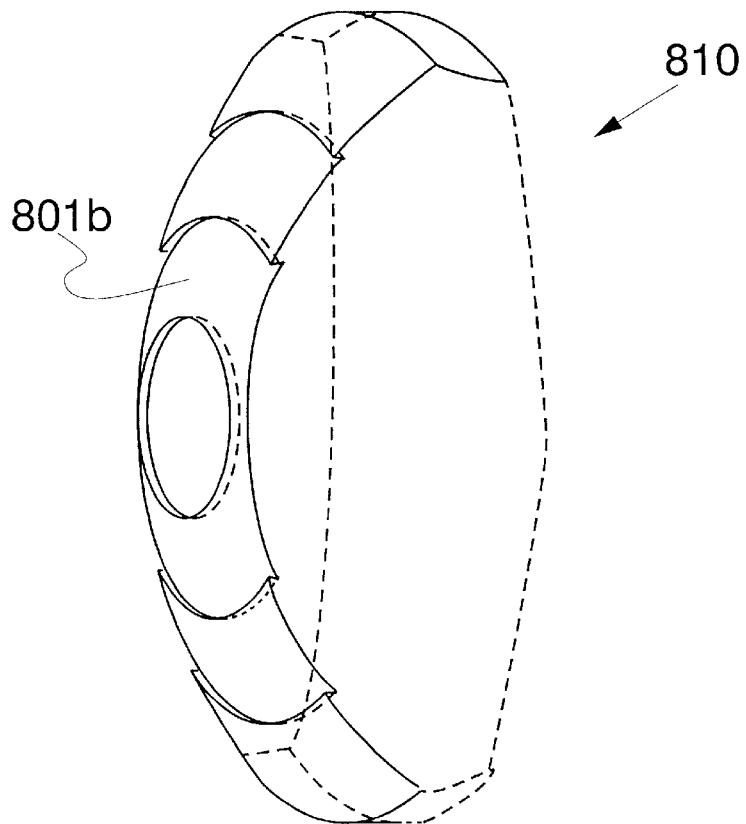
Figure 41C:
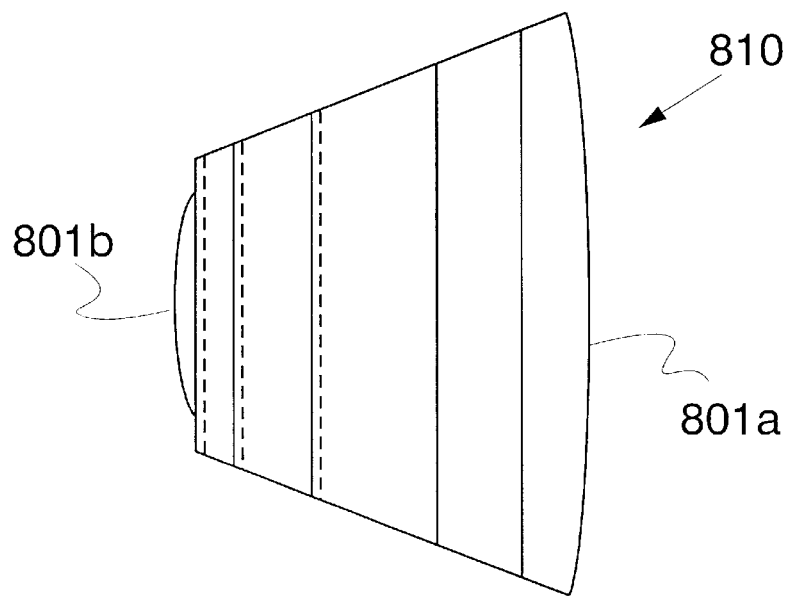

A preferred multi-focal lens is depicted-in FIGS. 41A–41C. An oblique view of a preferred lens 801 is shown in FIG. 41A. The lens 801 may be circularly symmetric, as shown. The back surface 801a of the lens 801 is preferably spherical, while the front surface 801b has four different aspheric curvatures as described below. The lens 801 of FIG. 41A may be provided with a rectangular opaque mask which provides a similar function to an aperture. Alternatively, the effect of the aperture can be obtained by cutting the lens 801 to obtain a cut-away lens 810, as shown in FIGS. 41B and 41C. FIG. 41B shows an oblique view of the cut-away lens 810, while the same cut-away portion is shown from a top view in FIG. 41C. The cut-away angle is selected so as to preferably allow for a 45-degree field angle.

The lens 801 comprises four zones 802, including a center zone 803 (Zone 1) and three outer ring-shaped zones 804, 805 and 806 (Zones 2 through 4, respectively). Zone 1 is preferably 0.426 inches wide, while Zones 2 through 4 are preferably 0.213 inches wide. The base radius (i.e., radius of the back spherical portion of the lens) is preferably 84.967 millimeters. The distance from the lens 801 to an imager (such as a CCD detector) is preferably 34.85272 millimeters. Preferred focus distances appear in Table 41-1.

TABLE 41-1

| Zone | Focus Distance (mm) |
|---|---|
| 1 | 48.3 |
| 2 | 76.2 |
| 3 | 122.0 |
| 4 | 191.0 |

The material of the lens 801 preferably comprises a plastic such as polystyrene, with an index of refraction of 1.59453059. Following are preferred dimensions and other characteristics according to lens zone 802.

Zone 1:

| | |
|---|---|
| Effective Focal Length | 23.4508 mm |
| Base Radius | 16.80842 mm |
| Conic | −0.8092686 |
| Aspheric Coefficients | |
| $r^2$ | $2.57577 \times 10^{-3}$ |
| $r^4$ | $-1.923724 \times 10^{-5}$ |
| $r^6$ | $5.448919 \times 10^{-7}$ |
| $r^8$ | $-1.765304 \times 10^{-8}$ |
| $r^{10}$ | $-2.931042 \times 10^{-10}$ |
| $r^{12}$ | $-5.210294 \times 10^{-13}$ |
| $r^{14}$ | $1.652903 \times 10^{-13}$ |
| $r^{16}$ | $8.778694 \times 10^{-15}$ |

Zone 2:

| | |
|---|---|
| Effective Focal Length | 28.087 mm |
| Base Radius | 19.64043 mm |
| Conic | −1.212117 |
| Aspheric Coefficients | |
| $r^2$ | $4.823852 \times 10^{-4}$ |
| $r^4$ | $-4.101818 \times 10^{-7}$ |
| $r^6$ | $3.891872 \times 10^{-9}$ |
| $r^8$ | $-1.945451 \times 10^{-11}$ |
| $r^{10}$ | $-5.040134 \times 10^{-14}$ |
| $r^{12}$ | $-6.846745 \times 10^{-17}$ |
| $r^{14}$ | $4.655883 \times 10^{-19}$ |
| $r^{16}$ | $7.854166 \times 10^{-21}$ |

Zone 3:

| | |
|---|---|
| Effective Focal Length | 32.0515 mm |
| Base Radius | 26.37444 mm |
| Conic | 0.1965319 |
| Aspheric Coefficients | |
| $r^2$ | $2.988976 \times 10^{-3}$ |
| $r^4$ | $-1.127446 \times 10^{-5}$ |
| $r^6$ | $-5.863206 \times 10^{-9}$ |
| $r^8$ | $8.905697 \times 10^{-13}$ |
| $r^{10}$ | $-1.472282 \times 10^{-14}$ |
| $r^{12}$ | $-7.391061 \times 10^{-17}$ |

Zone 4:

| | |
|---|---|
| Effective Focal Length | 35.2546 mm |
| Base Radius | 27.69962 mm |
| Conic | 0.1344306 |
| Aspheric Coefficients | |
| $r^2$ | $1.1298197 \times 10^{-3}$ |
| $r^4$ | $-8.30275 \times 10^{-6}$ |
| $r^6$ | $-4.769432 \times 10^{-9}$ |
| $r^8$ | $-6.74277 \times 10^{-12}$ |
| $r^{10}$ | $-1.675321 \times 10^{-15}$ |
| $r^{12}$ | $-1.827999 \times 10^{-17}$ |
| $r^{14}$ | $-4.208912 \times 10^{-21}$ |

A preferred aperture width is 0.043 inches.

Figure 57:
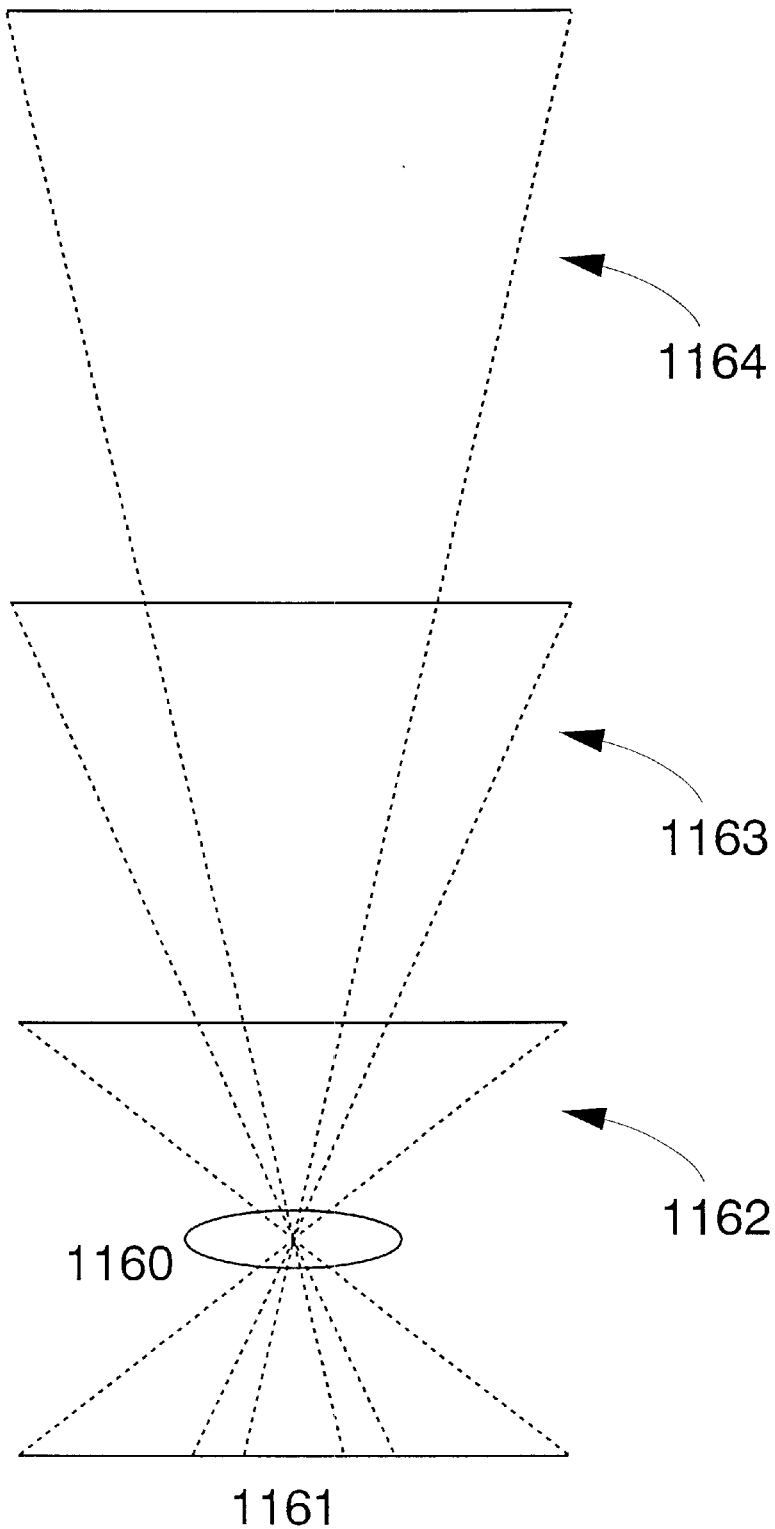
FIG. 57 is a diagram illustrating a multiple-focus optical system with a poly-optic lens having some of the aberrations of the zone uncorrected so as to narrow the angular field of view for the longer focal length zones.

Another embodiment of a multiple-focus optical system comprises a poly-optic lens wherein the longer focal length zones have a restricted angular field of view, as may be accomplished by a intentionally leaving some of the aberrations of the zone uncorrected, thereby restricting the angular field of view for that zone over which a clear image of the barcode is produced on the CCD detector. The effect of this structure is shown in FIG. 57, which depicts a poly-optic lens 1160 having three zones and positioned in front of a CCD detector 1161. By selectively leaving coma, astigmatism, and lateral chromatic aberrations uncorrected, a poly-optic lens 1160 is provided having three different fields of view 1162, 1163 and 1164, one for each zone. The field of view 1162 for the first zone is wide to allow reading of wide images (e.g., bar code labels) close in. The field of view 1163 for the second zone is narrower than the first field of view 1162, and the field of view 1164 for the third zone is yet narrower than the second field of view 1163. By progressively narrowing the field of view for the more distant focal regions, the poly-optic lens 1160 of FIG. 57 offers the advantage of minimizing inadvertent reading of bar codes or other images far from the bar code reader, as well as improving the aberration 102 correction in the regions where reading is desired thereby improving resolution.

Figure 42A:
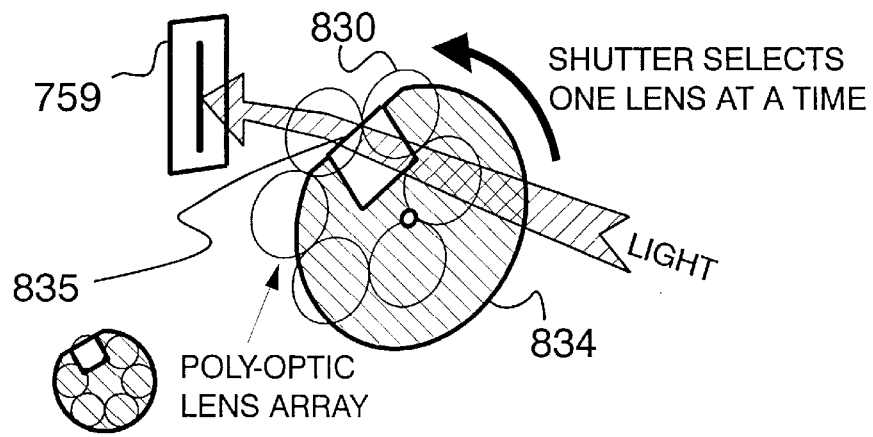
FIGS. 42A–42C are diagrams of other embodiments of optical systems using shutters to reduce inter-zonal interference.
Figure 42B:
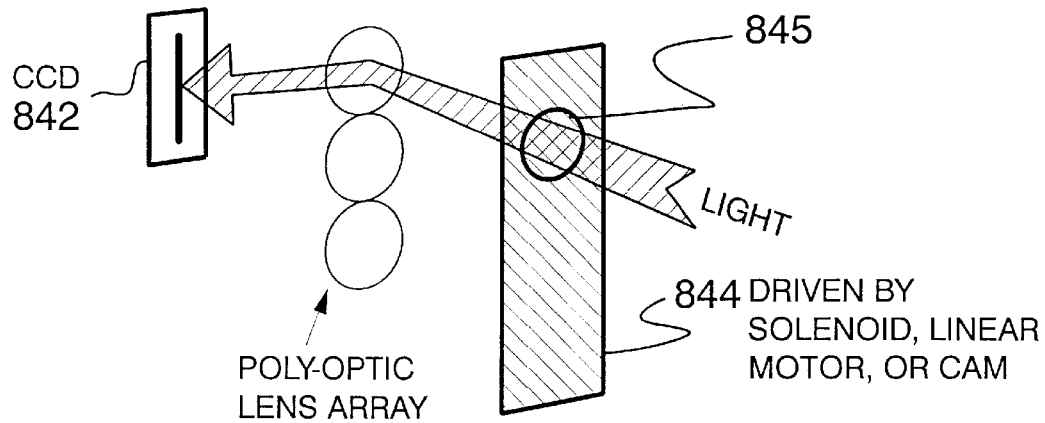
Figure 42C:
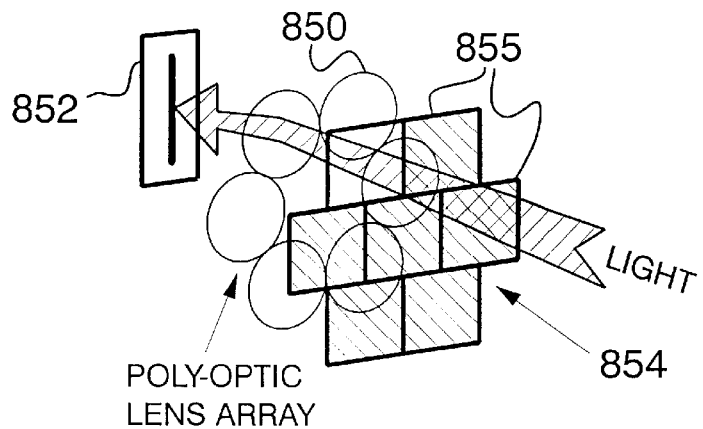

FIGS. 42A–42C are alternative embodiments of optical structures using shutters to reduce or eliminate inter-zonal interference. These embodiments use either mechanical or electro-optic shutters so that only one (or several) lenses are active simultaneously.

FIG. 42A shows an arrangement of lenses 830 in a circular pattern, forming a poly-optic array. The lenses 830 are positioned in front of a CCD detector 832. A mechanical shutter 834 is positioned in front of the lens array 830. The shutter 834 may be rotated mechanically around a motor shaft (not shown). The shutter 834 has an opening 835 (or aperture) which revolves in a circular fashion in response to a motive force applied to the motor shaft. In operation, the shutter 834 screens out all of the lenses 830 except one lens 830 (or several lenses 830, if desired) which collects light through the opening 835 in the shutter 834. The shutter 834 is rotated so that the opening 835 unscreens each lens 830 (or group of lenses 830) sequentially in the circular array. In this manner, the lenses 830 are prevented from interfering with one another.

FIG. 42B is a diagram of an alternate embodiment employing a shutter mechanism. In FIG. 42B, a poly-optic array of lenses 840 are arranged in a linear fashion. The lenses 840 are positioned in front of a CCD detector 842. A rectangular or other appropriately shaped shutter 844 is positioned in front of the array of lenses 840. The shutter 844 has an opening 845 (i.e., aperture) enabling a single lens 840 (or several lenses 840, if desired) to operate at a given time. The shutter 844 is movable along the axis 846 parallel to the array of lenses 840, and may be driven by a solenoid, a linear motor, or a mechanical cam (not shown). In such a manner, the position of the opening 845 may be shifted from one lens 840 to the next. In operation, the shutter 844 is driven along the axis 846 parallel to the lenses 840 so as to position the opening 845 in front of the desired lens 840 or lenses 840 in sequence. In this manner, the lenses 840 are prevented from interfering with one another.

FIG. 42C is a diagram of another embodiment employing a shuttering technique. In FIG. 42C, a poly-optic array of lenses 850 forms a circular cluster pattern as shown, or may form any other suitable pattern matched to a particular LCD shutter configuration. An LCD array 854 is positioned in front of the array of lenses 850. The lenses 850 are positioned in front of a CCD detector 852. The LCD array 854 comprises a plurality of electronically operated shutters 855. Each shutter 855 is individually responsive to an electronic shutter command from a shutter controller (not shown). The LCD shutters 855 are sequenced electronically so that one lens 850 (or several lenses 850, if desired) is operating at given time. In this manner, the lenses 850 do not interfere with one another. An advantage of the LCD array 854 is that it has no moving parts, and therefore may increase reliability.

The above described shuttering techniques may be implemented with a multi-focal plane optical collection system comprising, for example, either a single poly-optic element or a multi-element optical system.

Figure 23C:
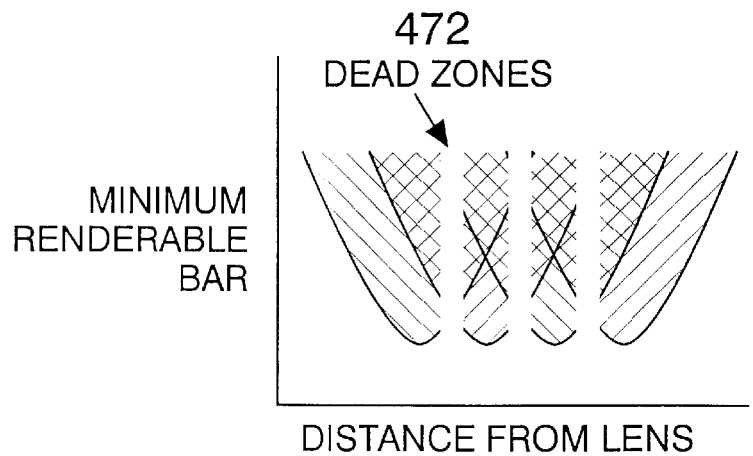

The effect of the shuttering techniques described in FIGS. 42A–42C may be explained with reference to FIGS. 23B and 23C, which, as noted previously, are graphs plotting minimum renderable bar size against distance from a lens. If all the lenses in the previously described poly-optic arrays of FIGS. 42A–42C operate simultaneously, then dead zones 472 such as shown in FIG. 23C may occur in the composite depth of field due to interzonal interference, such that a target image may be misidentified or missed entirely by the reading device. The shuttering techniques of FIGS. 42A–42C provide for sequential operation of the individual lenses, thereby minimizing or eliminating interzonal interference. The depth of field for each lens, as shown in FIG. 23B, is established separately for each individual lens. However, after sequencing through all the desired lenses using the described shuttering techniques, the composite depth of field becomes the aggregate of the individual depths of field, without the effect of inter-zonal interference. The result is a much larger effective depth of field than is possible with only a single lens, or without shuttering.

Figure 56B:
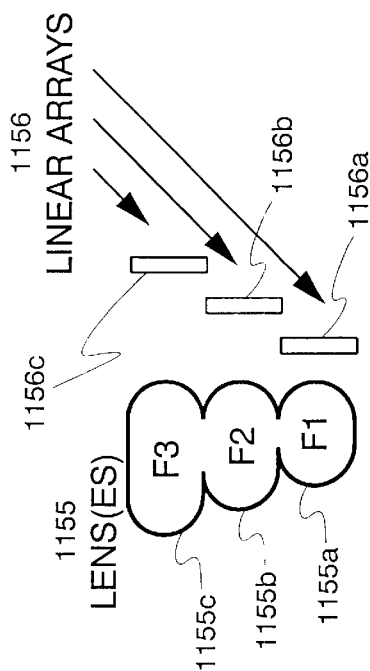
FIGS. 56A and 56B are diagrams illustrating a multi-element lens system for enhancing depth of field while minimizing interference among lens elements.
Figure 56A:
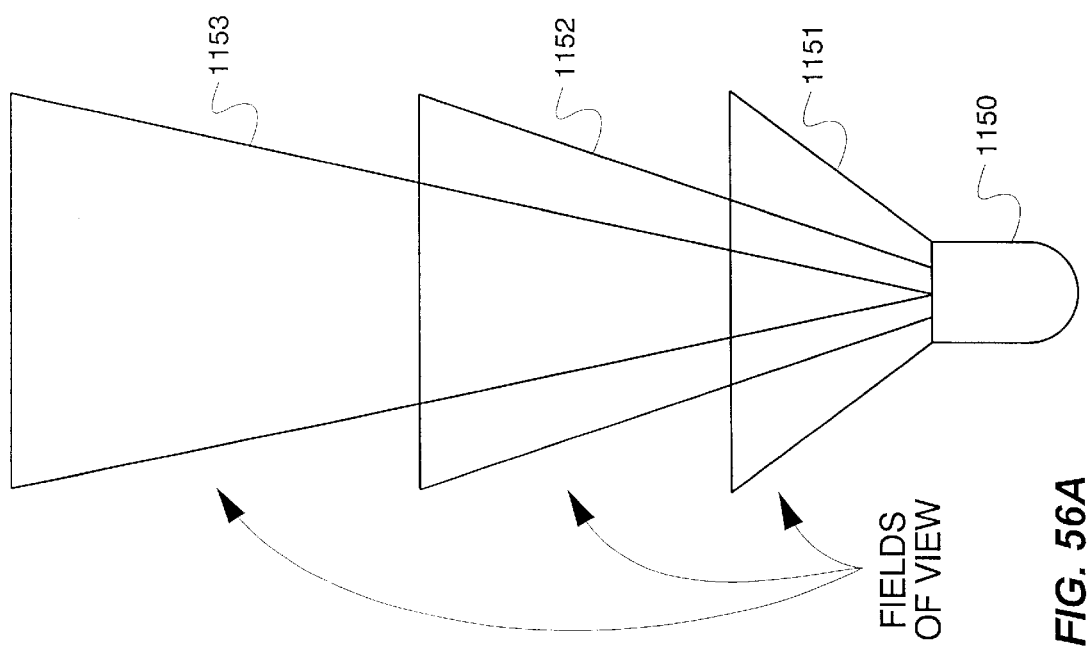

Another embodiment of a multi-focus optical system in which inter-zonal interference is reduced is shown in FIGS. 56A and 56B. The optical system as shown in FIG. 56B comprises a multi-element lens system 1155 and a plurality of photo-sensitive detectors such as linear CCD arrays 1156. The multi-element lens system 1155 comprises three lens elements 1155a–c, each having a different focal length and different field of view. A comparison of the respective fields of views 1151 through 1153 are shown in FIG. 56A. The closest field of view 1151 is associated with the first lens element 1155a; the middle field of view 1152 is associated with the second lens element 1155b; and the most sodistant field of view 1153 is associated with the third lens element 1155c. The lens elements 1155a–c may be embodied as a single poly-optic lens, or as three separate lenses adjacently positioned. While three lens elements 1155a–c are shown, more or fewer lens elements may be used as needed depending on the total depth of field requirements.

In operation, each lens element 1155a–c focuses light on a different one of the three linear CCD arrays 1156a–c. Thus, the first lens element 1155a has a focal length F1 and focuses light on a first linear CCD array 1156a; the second lens element 1155b has a focal length F2 and focuses light on a second linear CCD array 1156b; and the third lens element 1155c has a focal length F3 and focuses light on a third linear CCD array 1156c. Each linear CCD array 1156a–c thereby receives focused light from only one of the lens elements 1155a–c, and receives an image from only one focal plane. This technique achieves a result of non-interference between lens elements 1155a–c similar to the shuttering techniques described above with respect to FIGS. 42A–42C, with the advantage of shorter image reading times since all of the focal planes are imaged simultaneously or in parallel by the linear CCD arrays 1156a–c.

The poly-optic and shuttering lens techniques described are preferably used in conjunction with the aperturing techniques described elsewhere herein. Some of the various embodiments may be compared in speed and depth of field characteristics as follows. Use of a small, oblong aperture in connection with a single-focus increases speed over a small, round aperture, as the oblong aperture collects more light. Both the oblong aperture and the round aperture result in a relatively good depth of field. Use of a poly-optic lens configuration with large apertures results in even faster operation, but may result in a "perforated" field depth due to intra-lens or inter-lens interference. The perforation in the depth of field may be eliminated by using shutters or multiple CCD arrays (each associated with an independent lens element, as described previously). Use of a poly-optic lens configuration with oblong apertures results in even faster operation, and also may result in a perforated field depth. Again, shutters or multiple CCD arrays with-separate lenses may be used to reduce or eliminate the perforation in the depth of field.

A CCD detector used in conjunction with some of the above lens and/or aperture configurations may be used at a small fraction of saturation (e.g., 1% of full scale) in order allow it to run faster (i.e., achieve faster reading speeds). Running the CCD detector at less than full scale may result in a higher noise system, so correlated double sampling may be used to lower the noise level in the system. Correlated double sampling may also be beneficial where there is no self-generated illumination source being used because the incoming signal level may be reduced. Thus, by gathering enough light and operating in a low noise environment, a CCD detector may use ambient light to read images such as bar code labels.

The optical techniques described herein may be used in whole or part in conjunction with the adjustable-focus techniques described in U.S. Pat. Nos. 5,317,211 and 5,479,011, both of which are incorporated by reference as if fully set forth herein.

The optical system can in a variety of embodiments be configured to allow multidirectional imaging using a single detector array. Multidirectional scanning is particularly desirable in fixed reader applications where the relative orientations of bar code and reader may vary widely. One embodiment of an optical system allowing variously oriented images (e.g., bar codes) to be read in shown in FIG. 58. In the FIG. 58 embodiment, two cylindrical optics (such as-cylindrical lenses 1172 and 1174) are used to image the bar code 1175. A cylindrical optic (also called a cylindrical rotational filter) produces significant image modulation only in one axis, and therefore has resolution only in the direction perpendicular to the cylinder axis. On the other hand, many types of codes have uniaxial properties in that they contain modulation information only in the direction perpendicular to the bars. In order for a cylindrical optical element to resolve a bar code, the direction of resolution must be adequately aligned with the bar code's direction of modulation. Use of two cylindrical optics at different orientations allows multiple images to be overlapped with less interference, and thereby allows multidirectional reading of images in a configuration such as shown in FIG. 58.

Figure 58:
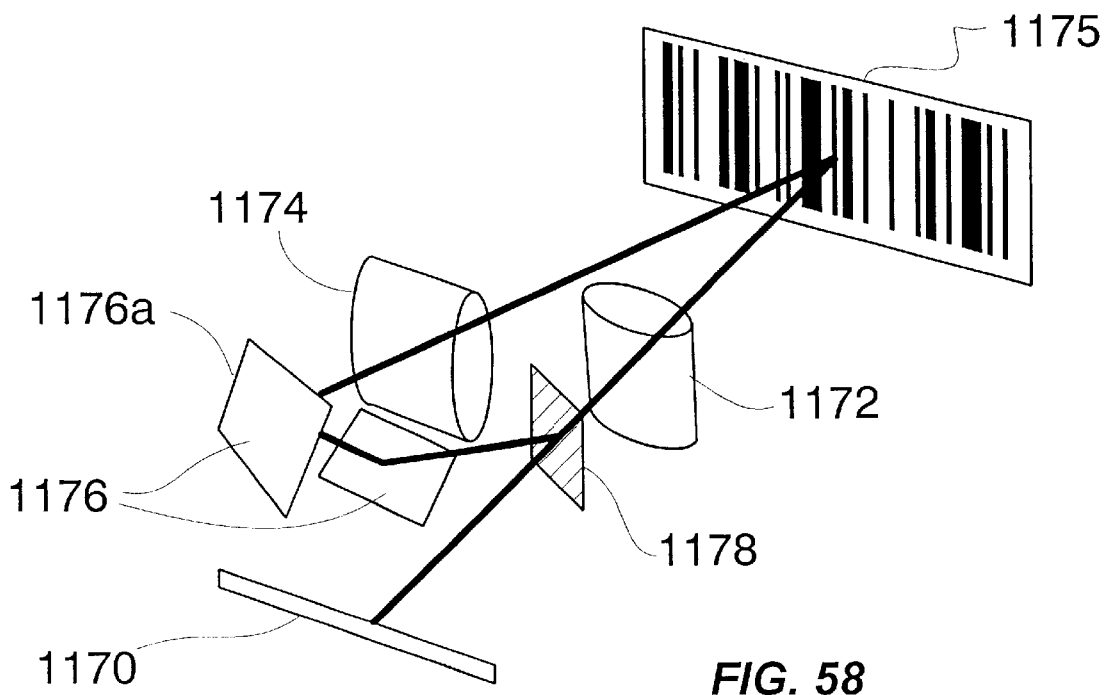
FIG. 58 is a diagram of a multi-directional optical system using cylindrical optics to allow variously oriented images (e.g., bar codes) to be read.

Accordingly, in FIG. 58, the cylindrical lenses 1172, 1174 are preferably oriented so that their axes are substantially perpendicular to one another (i.e., orthogonal), so that one cylindrical lens 1174 produces an image well resolved in the horizontal direction while the other cylindrical lens 1172 produces an image well resolved in the vertical direction. The light collected by the horizontal axis cylindrical lens 1174 is rotated approximately 90° by a plurality of image-rotating mirrors 1176 and then combined with the light from the vertical axis cylindrical lens 1172 by a beamsplitter 1178.

The net result is two substantially orthogonal virtual imaging lines in front of the bar code reader, or equivalently, a superposition of two substantially orthogonal images of the bar code 1175 on the CCD detector 1170. One of these images will be a well resolved image of the bar code 1175, while the other will not be resolved and will result in substantially uniform illumination (i.e., an average light level) upon the CCD detector 1170, and will therefore not interfere with the detection of the well resolved image. In this manner bar codes 1175 (or other images) oriented either horizontally or vertically can be read.

Various modifications may be made to the FIG. 58 embodiment to alter its operation in various manners. For example, rather than a linear CCD detector 1170, a two-dimensional CCD array may be used instead. Also, the number of cylindrical optics is not limited to two, but may be any suitable number; likewise, their angle of orientation with respect to one another need not be 90° but may be any suitable angle. The cylindrical optics may be reflective rather than refractive elements, or combinations of cylindrical and non-cylindrical optical elements may be used to modify the acceptance angles of the rotational filters. Further, the focal distances of a multi-axis system may be offset such that different orientation bar codes may focus at different distances away from the reader for the purpose of enhancing depth of field.

Figure 59:
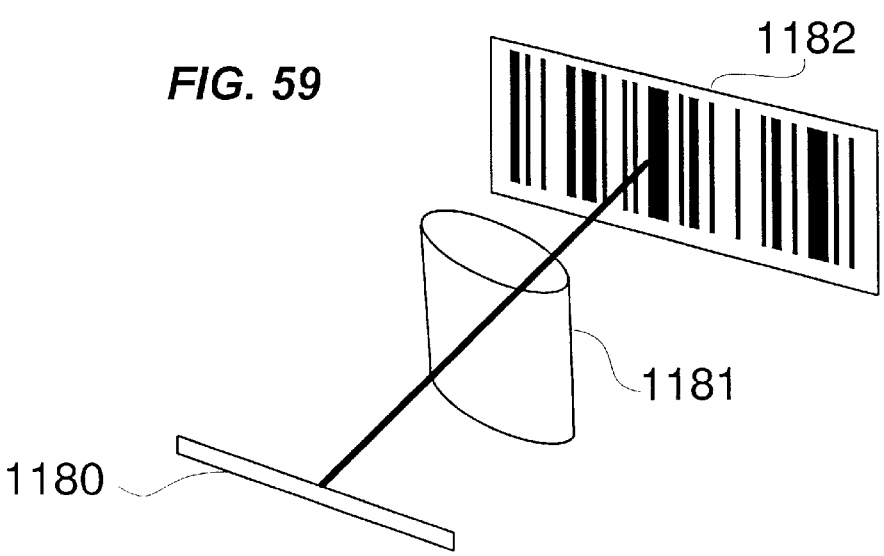
FIG. 59 is a diagram of a one-axis filter for determining the orientation of a bar code.

A simple one-axis filter is shown in FIG. 59 which may be used singly or multiply to detect when a bar code is aligned in a particular orientation for the purpose of, e.g., controlling other bar code reading equipment which utilizes such information. The one-axis filter of FIG. 59 comprises a vertical axis cylindrical lens 1181 positioned in front of a linear CCD detector 1180. When a bar code 1182 is oriented along the cylindrical axis of the cylindrical lens 1181, the bar code image is at its best resolution. The signal output from the CCD detector 1180 can be compared against a threshold value to determine when a bar code 1182 is properly oriented in front of the CCD detector 1180 so that it may be read.

Figure 60D:
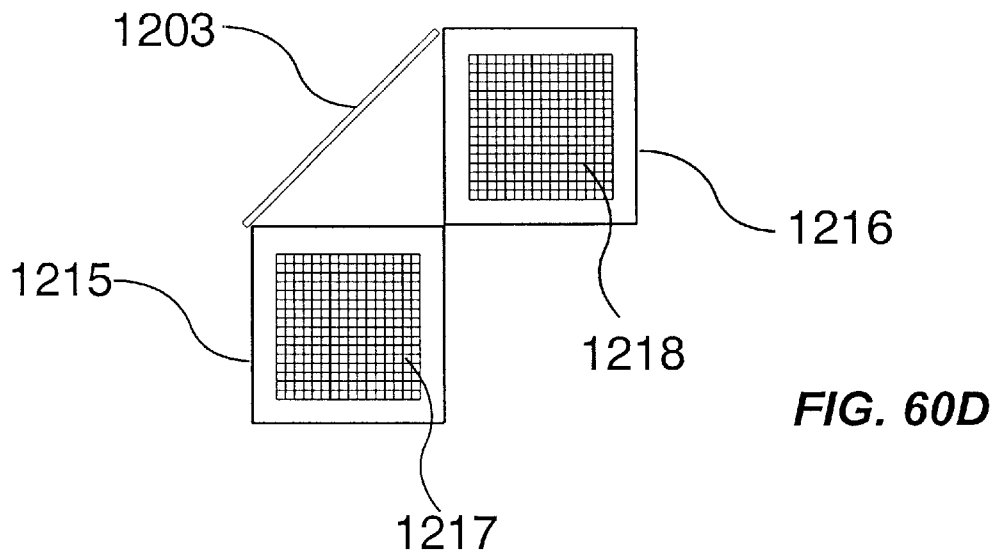
FIGS. 60A–60C are diagram of a multi-directional optical system using a beam splitter and mirrors, with various alternative area and linear sensor configurations depicted in FIGS. 60D–60F.
Figure 60E:
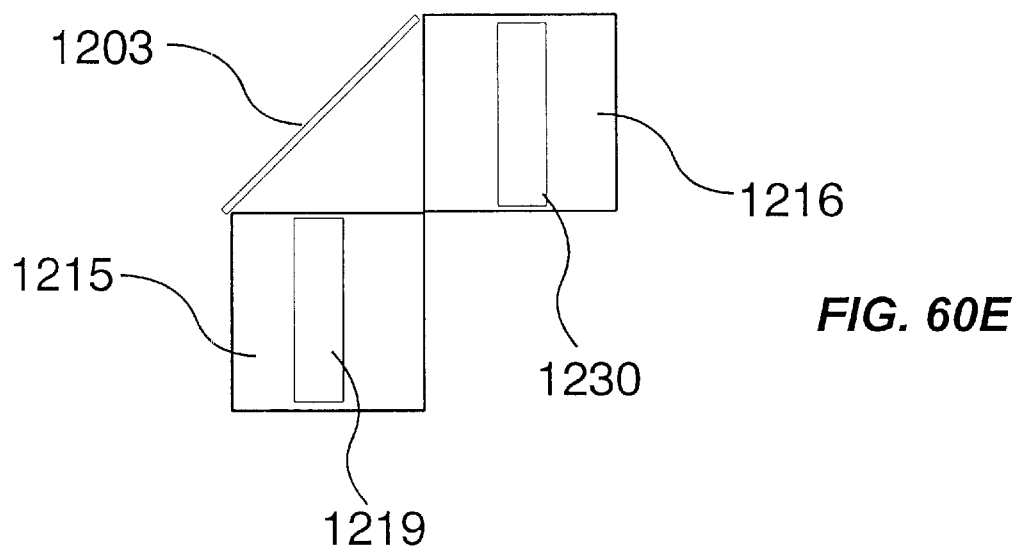
Figure 60F:
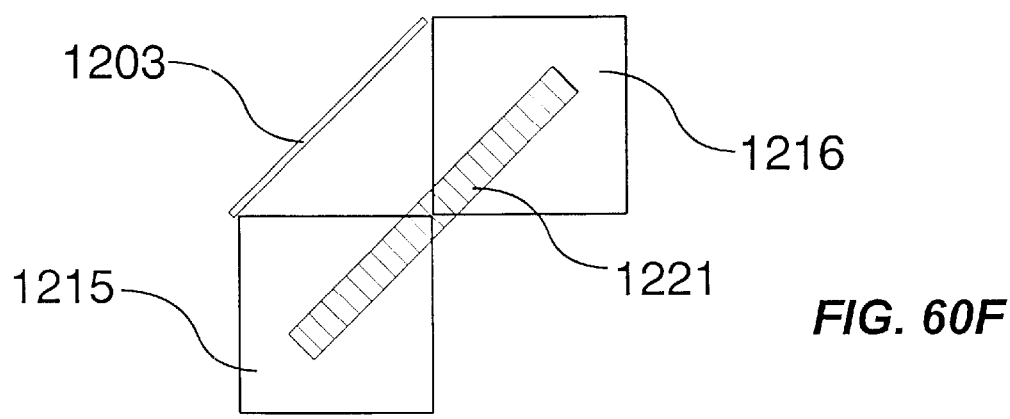

Another embodiment of an optical system allowing variously oriented barcodes to be read is shown in FIGS. 60A–60C, with various alternative area and linear sensor configurations shown in FIGS. 60D–60F. FIG. 60A depicts an oblique view of the optical system, while FIG. 60B depicts a top view, and FIG. 60C depicts a side view. The embodiment of FIGS. 60A–60C comprises a beamsplitter cube 1202 (or alternatively a pellicle beamsplitter or other similar device), a pair of mirrors 1203 and 1204, and imaging regions 1215, 1216 on which are mounted one or more imaging elements (such as shown in any of FIGS. 60D–60F). The beamsplitter cube 1202 comprises a pair of triangular prism-shaped beamsplitters joined along their diagonal sides, so as to form a cube shape as shown in FIG. 60A. The beamsplitter cube 1202 splits the incoming bar code image into two paths 1207 and 1208. The first path 1208 continues in a vertical line and reaches imaging region 1216. The second path 1207 reaches mirror 1203 which causes a 90° rotation of the image, and then reaches mirror 1204 which causes another 90° rotation of the image so that it also is directed in a vertical line 1209, parallel to the first path 1208. The second vertical path 1209 reaches imaging region 1215. The net effect of the optical structure is shown in FIG. 60B, which shows two versions of the image rotated at 90° with respect to one another, and each respectively being directed down one of the vertical paths 1208 and 1209.

Several different imaging configurations as shown in FIGS. 60D–60F may be used in conjunction with the FIG. 60A–60C optical system. FIG. 60D depicts two CCD area sensors (i.e., two-dimensional CCD arrays) 1217, 1218 located on imaging regions 1215 and 1216, respectively. The CCD area sensors 1217, 1218 allow detection of a bar code or other image by any of a number of manners well known in the art.

FIG. 60E depicts an alternative arrangement wherein two CCD linear arrays 1219, 1220 are disposed on imaging regions 1215 and 1216, respectively. The two CCD linear arrays 1219, 1220 are likewise used to detect the received image. The CCD linear arrays 1219, 1220 are lined up in parallel because the image projected on the first CCD linear array 1219 will be oriented at 90° with respect to the image projected on the second CCD linear array 1220; placing them in parallel therefore increases the chance that the image will be properly oriented on at least one of the CCD linear arrays 1219, 1220.

FIG. 60F depicts another alternative arrangement wherein a single CCD linear array 1221 straddles both imaging regions 1215, 1216 along their common diagonal. The FIG.

60F embodiment generally requires a larger CCD linear array 1221 than the CCD linear arrays 1219, 1220 of the FIG. 60E embodiment, but may require less processing or fewer components because only one CCD linear array needs to be read out and processed.

Figure 61A:
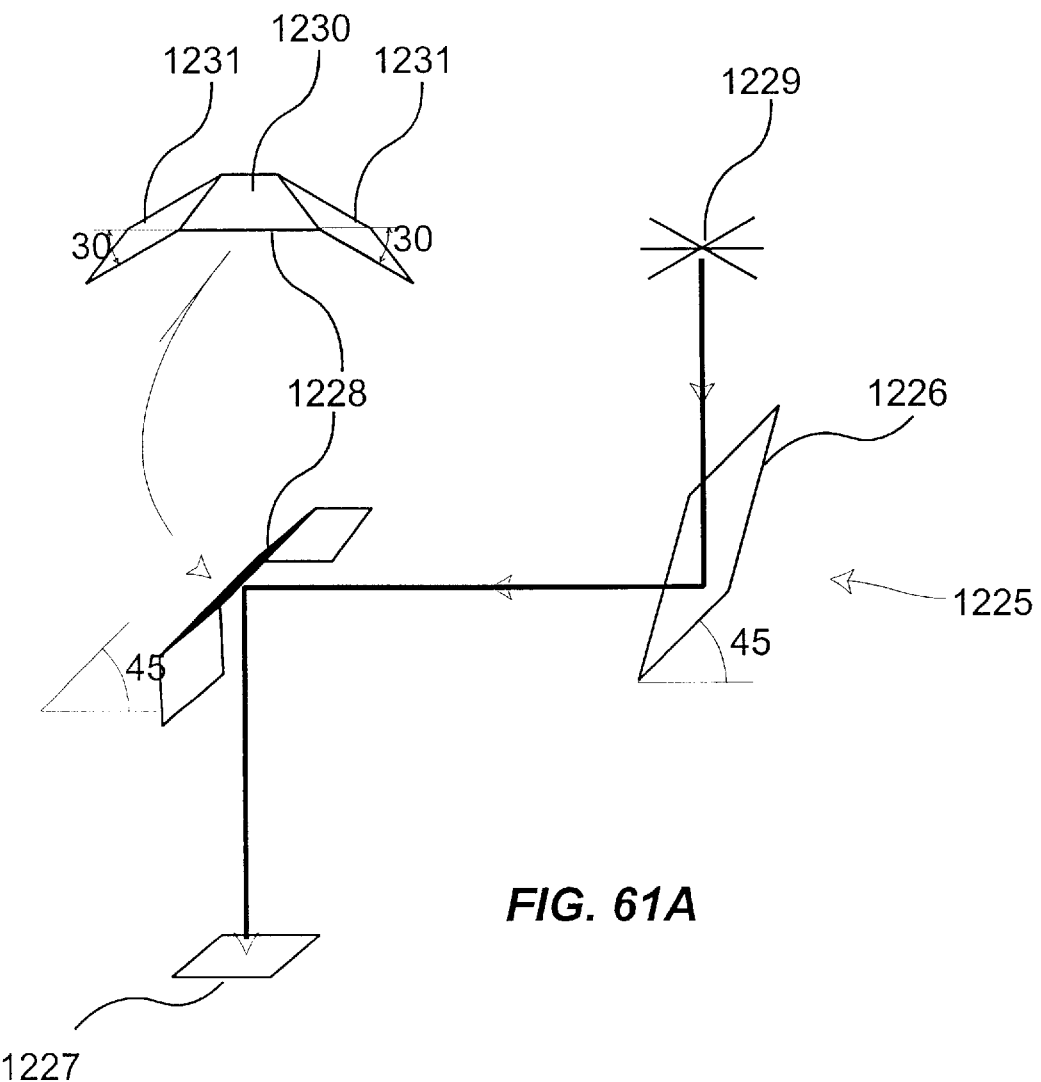
FIG. 61A is a diagram of another embodiment of a multi-directional optical system employing a mirror basket to divide a single projected image and independently rotate the different segmented images.

Another multi-directional optical system is shown in FIG. 61A. The optical system 1225 receives light reflected from an image (e.g., a bar code) and rotates the image 90° by using an angle adjustment mirror 1226. The rotated image is then reflected off a mirror basket 1228 which divides the single projected image into several segments, resulting in a multi-segment pattern projected onto a photodetector 1227 (such as one or more linear CCD array(s) or CCD area sensor). Viewed from another perspective, an imaging line from the photodetector 1227 is reflected off the mirror basket 1228 and divided into several segments, resulting in a star shaped pattern. The star shaped pattern 1229 is rotated 90° by the angle adjustment mirror 1226 and projected into the imaging volume in front of the bar code reader to create multi-directional virtual imaging lines across an image to be read.

To obtain the desired pattern, the mirror basket 1228 preferably has a first mirrored region 1230 and a pair of second mirrored regions 1231 attached to either side of the first mirrored region 1230 and bent therefrom by an angle of 30°. The mirror basket 1228 is positioned at a 45° angle with respect to the horizontal in order to rotate the image 90° while at the same time generating the star shaped pattern 1229.

While the FIG. 61A embodiment involves several components in the collection optics, it offers the advantage that the images associated with the variously oriented virtual imaging lines are projected onto different segments of the photodetector 1227, reducing or eliminating the possibility of interference between different imaging lines.

Figure 61B:
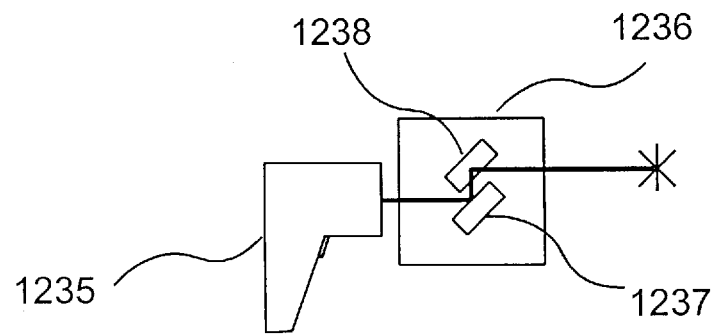
FIG. 61B is a particular application of a mirror basket with a handheld bar code reader.

The use of a mirror basket can be particularly useful in the embodiment of FIG. 61B, whereby a handheld bar code reader 1235 which has a single virtual imaging line in normal handheld operation can be made to have multiple virtual imaging lines in a fixed configuration. The handheld bar code reader 1235 is placed in a cradle (not shown) adjacent to a fixed optical projection unit 1236. The optical projection unit 1236 comprises an angle adjustment mirror 1238 and a mirror basket 1237 (e.g., such as mirror basket 1228) positioned at a 45° angle for rotating an image (such as from an object held above the fixed optical projection unit 1236) and projecting it (in a star-shaped pattern) onto the imaging sensor within the handheld bar code reader 1235. The optical projection unit 1236 thereby gives the handheld bar code reader 1235 effective multi-directional imaging capability, even if the handheld bar code reader 1235 is only a single-line imaging device.

Another embodiment of a multi-direction reader which allows multi-directional reading employs a kaleidoscope mirror for projecting multiple rotated images of a bar code onto a detector array, such as shown in FIGS. 62A–62F. As shown in FIGS. 62A and 62B, a kaleidoscope mirror 1250 comprises two mirror elements 1253, 1254 connected along one edge and oriented at a 45° angle with respect to one another, with the reflective portions of the mirror elements 1253 and 1254 facing one another. An image 1251 projected into the "tunnel" formed by the kaleidoscope mirror 1250 causes a plurality of images to be generated at a detector 1252 at the opposite end of the kaleidoscope mirror, as shown in FIGS. 62B and 62C. A plurality of imaging "zones" 1259 are defined over the region of the detector 1252, each having a version of the original image 1256 oriented at a different direction. The total number ($N_I$) of duplicate projected images 1257 is generally given by the equation $N_I = 360°/A_K$, where $A_K$ is the angle of the kaleidoscope mirrors 1253, 1254 with respect to one another. In the present example, the angle $A_K$ is 45°, so the number of projected images is eight.

Where the detector 1252 is embodied as a CCD area sensor, the kaleidoscope mirror embodiment of FIG. 62A–62B has the advantage of allowing relatively simple signal processing of the CCD area sensor output without requiring complex algorithms for determining the image orientation. The data from the CCD area sensor may be read out linearly in a fixed direction (i.e., line-by-line), and there is a high probability that one of the duplicate projected images 1257 will be at a sufficiently horizontal angle with respect to the CCD area array-as to allow recognition of the image (such as, e.g., a bar code).

FIGS. 62D–62F are examples showing some of the various relative orientations that the duplicate projected images 1257 may take. The straight arrow symbol "→" in FIGS. 62D–62F represents the angle of orientation of each duplicate projected image. In FIG. 62D the original image 1263 is oriented in a vertical direction with respect to the CCD area sensor, but a duplicate image 1261 is projected at a horizontal orientation by the kaleidoscope mirror 1250. In FIG. 62E the original image 1264 is oriented at a lesser vertical direction (e.g., about 67°), and another duplicate image 1262 from a different image zone 1259 is directed in a close to horizontal direction so as to allow recognition using the CCD sensor array. FIG. 62F shows the "worst case" scenario in which the original image is oriented at 45° with respect to the horizontal direction. In this case, all of the duplicate projected images 1257 are about equally difficult to recognize using the CCD sensor array, and the ability to recognize any of the projected images 1257 will depend in part on the tolerances of the signal processing and recognition electronics and intelligence.

Figure 63:
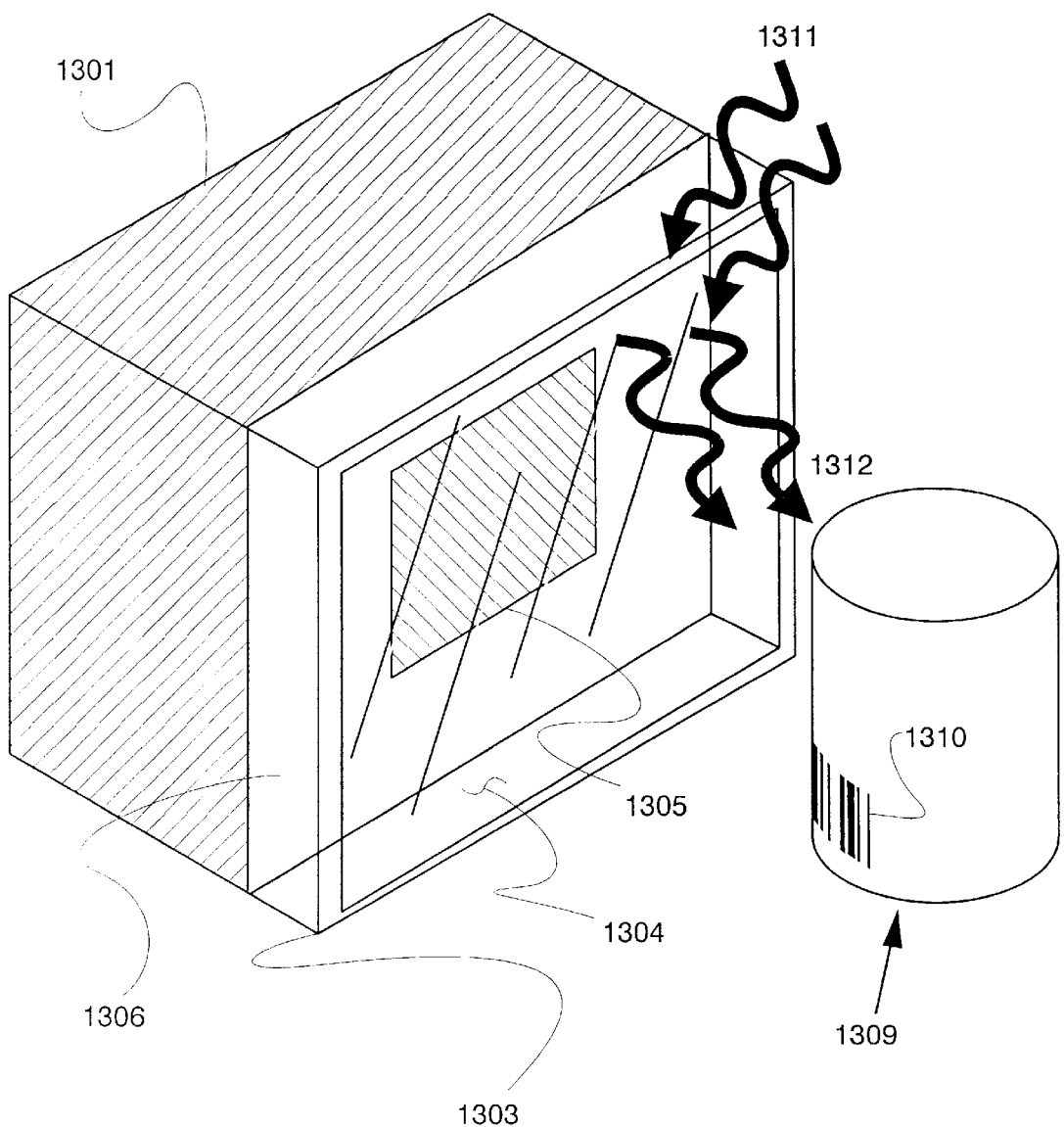
FIG. 63 is a diagram of an optically transmissive spacer extending forward from a bar code reader housing to allow ambient light to reach a bar code or other image to be read.

For a bar-code reader to function properly with ambient illumination, sufficient distance should preferably be maintained between the bar code and the optical system to allow ambient light to reach the bar code. If the reader and bar code are brought too close together, the bar code may be shadowed to such an extent by either the reader or the object bearing the bar code that it becomes unreadable in ambient light. Several modifications may be made to the bar code reader to increase the amount of ambient light reaching the bar code label. One possible modification as illustrated in FIG. 63 comprises an optically transmissive spacer 1303 extending forward from the housing 1301 which encases the optical system. The optically transmissive spacer 1303 ensures that a minimum adequate distance is maintained between the reader and the bar code, while at the same time allowing ambient light to reach the bar code. The optically transmissive spacer 1303 may be transparent, or may comprise opaque or solid portions with missing gaps (e.g., two opaque or solid walls and two missing walls). Ambient light 1311 entering through the transparent or opaque material, or the gaps, of the optically transmissive spacer 1303 reflects off an optically scattering surface 1306 (which is a more reflective surface) in front of the housing 1301 and thereby results in ambient light 1312 being reflected away from the housing 1301 and onto the bar code 1310. The ambient light reflected from the bar code 1310 is received into the receiver aperture 1305 and collected by the optical system.

The optically transmissive spacer 1303 may optionally be configured with a transparent window 1304 across its front end (i.e., the end opposite the housing 1301). In hand-held readers, the optically transmissive spacer 1303 may take the form of a transparent "nose" on the front end of the reader. Alternatively, an opaque "nose" may be employed in which sections of the nose are missing to allow entrance of ambient light into the volume between the reader and the bar coded object 1309. In either of these cases the window 1304 is not required, but nevertheless is optional to provide protection. In fixed bar code reader applications, particularly where the bar code reader has horizontally positioned optical front-end and objects to be read are held above it, a transparent window 1304 is preferred so as to keep objects off of the optical front-end. In either case, the optically transmissive spacer 1303 mechanically prevents the bar coded object 1309 from being brought too close to the reader to cut off all ambient light, and the transparent, translucent, or missing portions of the optically transmissive spacer 1303 allow ambient light 1311 to enter the space between the bar coded object 1309 and the optical collection system and illuminate the affixed bar code 1310. The spacer 1303 also limits the required range for depth of focus.

A second structure for increasing ambient light at close range or for shaded bar codes, and which may be used alone or in combination with the optically transmissive spacer 1303, is an optically diffusive front surface placed on the barcode reader (excluding the optical collection system), such as shown for example in FIG. 64A. The optically diffusive front surface 1320 shown in FIG. 64A may be fabricated from a variety of materials, including, but not limited to, roughened white plastic, roughened clear plastic, or brushed metal. As shown in FIG. 64B, the optically diffusive front surface 1320 scatters a portion of the incident ambient light back in the direction of the bar code 1321, thereby increasing the level of illumination at the bar code 1321. An opening 1325 in the diffuser 1320 allows the reflected ambient light to be collected by a lens 1326 (such as any of the multi-focal or poly-optic lenses herein described) and be focused onto a CCD detector 1327. FIG. 64C compares a situation wherein an ambient light source 1330 hits the back of a bar coded object 1331, thereby causing the bar code 1332 to be shaded with respect to the bar code reader 1335 and preventing sufficient ambient light to allow the reader to properly operate.

The optical collection and imaging system can in one aspect be regarded as projecting one or more images of the detector array(s) into the imaged volume of space in front of the barcode reader, creating one or more virtual imaging lines. In order to read a bar code one of these imaging lines is preferably projected across the bar code. This targeting can become increasingly difficult as the depth of field of the bar code reader is lengthened by, for example, use of the multi-focal imaging techniques described herein. To facilitate proper relative positioning of the bar code and the reader, one or more LEDs or similar devices may be used as pointers. A preferred LED pointer system is depicted in FIGS. 65A and 65B, which are side view and front view diagrams, respectively.

Figure 65A:
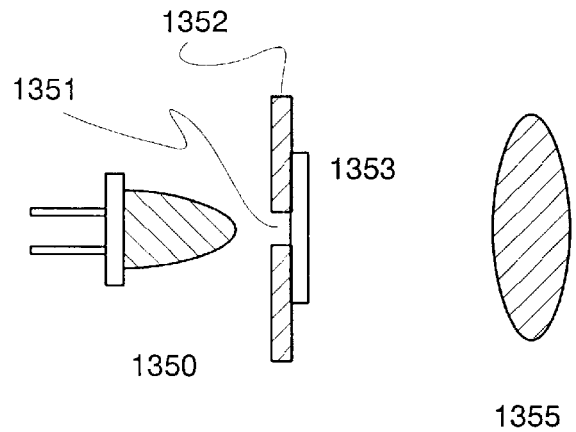
FIG. 65A and 65B are side view and front view diagrams, respectively, of an LED pointer system.
Figure 65B:
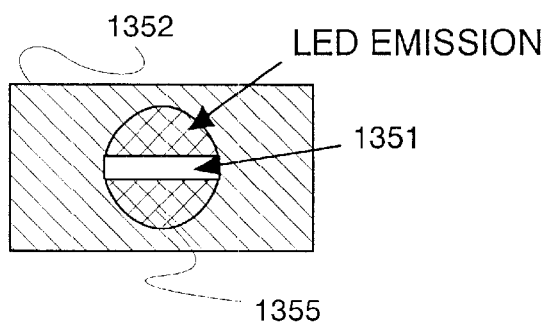

The FIG. 65A–65B embodiment comprises an LED 1350 (such as a "super bright" style LED), a housing wall 1352 with an aperture or slit 1351, a holographic (or other type of) diffuser 1353 positioned so as to cover the slit 1351, and a plastic lens 1355 positioned in front of the slit 1351 and in alignment with the LED 1350. In operation, light from the LED 1350 is diffused by the holographic diffuser 1353 and thereby uniformly illuminates the area of the slit 1351. Light passing through the slit 1351 and the holographic diffuser 1353 thereafter passes through the plastic lens 1355 which serves as a pointer optic or optical system to image the light from the illuminated slit 1351 at a point which coincides in space with the projected imaging line. Without the holographic diffuser 1353, which provides a diffused and relatively uniform outgoing illumination from the slit 1351, the LED output may otherwise appear nonuniform and may generate an image of the LED chip (including the bond wires) used to support the LED 1350.

Figure 65C:
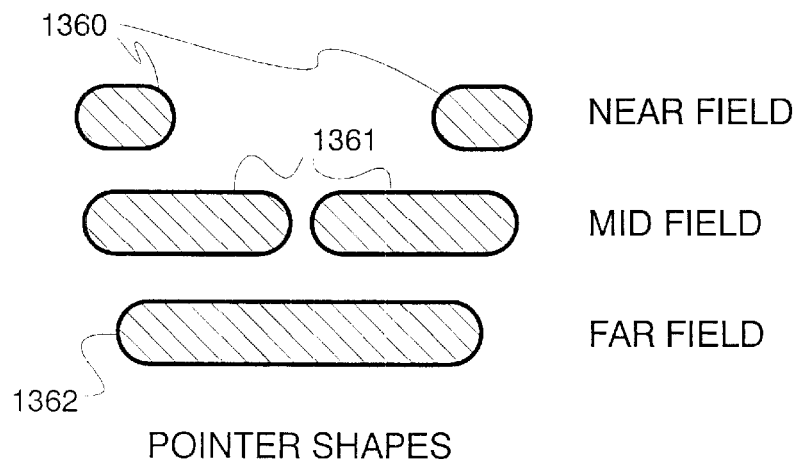
FIG. 65C is a diagram illustrating various pointer shapes at different distances.

Preferably, two pointer LEDs such as LED 1350 are employed, one on either side of the imager (as per FIG. 46A or 48), or alternatively positioned above or below the imager. The pointer LEDs are not used to illuminate the bar code for reading, but merely to assist the bar code reader operator in properly positioning the bar coded object with respect to the reader. The proper positioning can be recognized by the appearance of a more focused image of the pointer slit 1351 near the bar code. FIG. 65C is a diagram illustrating various pointer slit shapes at different distances. As shown in FIG. 65C, the illuminated pointer slits appear as relatively small, spaced apart dots 1360 at near field, as larger oblong more closely spaced-shapes 1361 at mid field, and as a single larger oblong shape 1362 at far field. The pointer LED(s) 1350 are preferably cycled on and off corresponding to the image capture cycle, being off while an image of the bar code is being captured by the imager so the pointer beams do not interfere with the image detection. Alternatively, an optical notch filter (not shown) may be used to prevent backscattered light from the LED pointer from reaching the CCD detector array.

Various modifications or alternative structures may be employed for the LED pointing system described above. For example, one alternative embodiment employs at least two pointers focused at different points in space. Another alternative embodiment employs a compound parabolic concentrator optical assembly (not shown) instead of a diffuser 1353. Several other alternative embodiments are particularly directed to increasing the efficiency of coupling of the LED light through the pointer optical system. One such embodiment comprises a cylindrical lens (not shown) positioned in front of the LED 1350 but behind the diffuser 1353 and a slit shaped pointer aperture 1351, the cylindrical lens serving to direct a larger fraction of the light emitted by the LED 1350 onto the pointer aperture 1351 (thereby reducing the LED power needed). Another embodiment wherein a similar objective is achieved comprises a light pipe (not shown) covering the LED 1350 and shaping the light to match the shape of the pointer aperture 1351. The light pipe may have a diffusing end so that it could also replace the diffuser 1353.

The techniques described herein may be used in conjunction with area imaging techniques such as those described, for example, in U.S. Pat. No. 5,446,271 entitled "Omni-directional Scanning Method and Apparatus," which is hereby incorporated by reference as if fully set forth herein. Thus, an area imager may be provided having increased speed in various lighting conditions, or being capable of operation in ambient light without a self-generated illumination source. Also, the multi-directional reading techniques using a multi-dimensional CCD area sensor and virtual imaging lines can be employed in the embodiments described herein using CCD area sensors.

After a target image is processed through the optical front-end and captured by the CCD detector such that a CCD video output signal is produced, the CCD signal is processed in a variety of manners. The CCD output signal itself may be used as part of an auto-exposure or adaptive exposure system for adjusting the exposure time of the CCD detector, as further described herein. The CCD output signal may also be processed to determine the locations of bars and spaces and recognize bar codes or other symbols, as also discussed further herein.

Figure 43A:
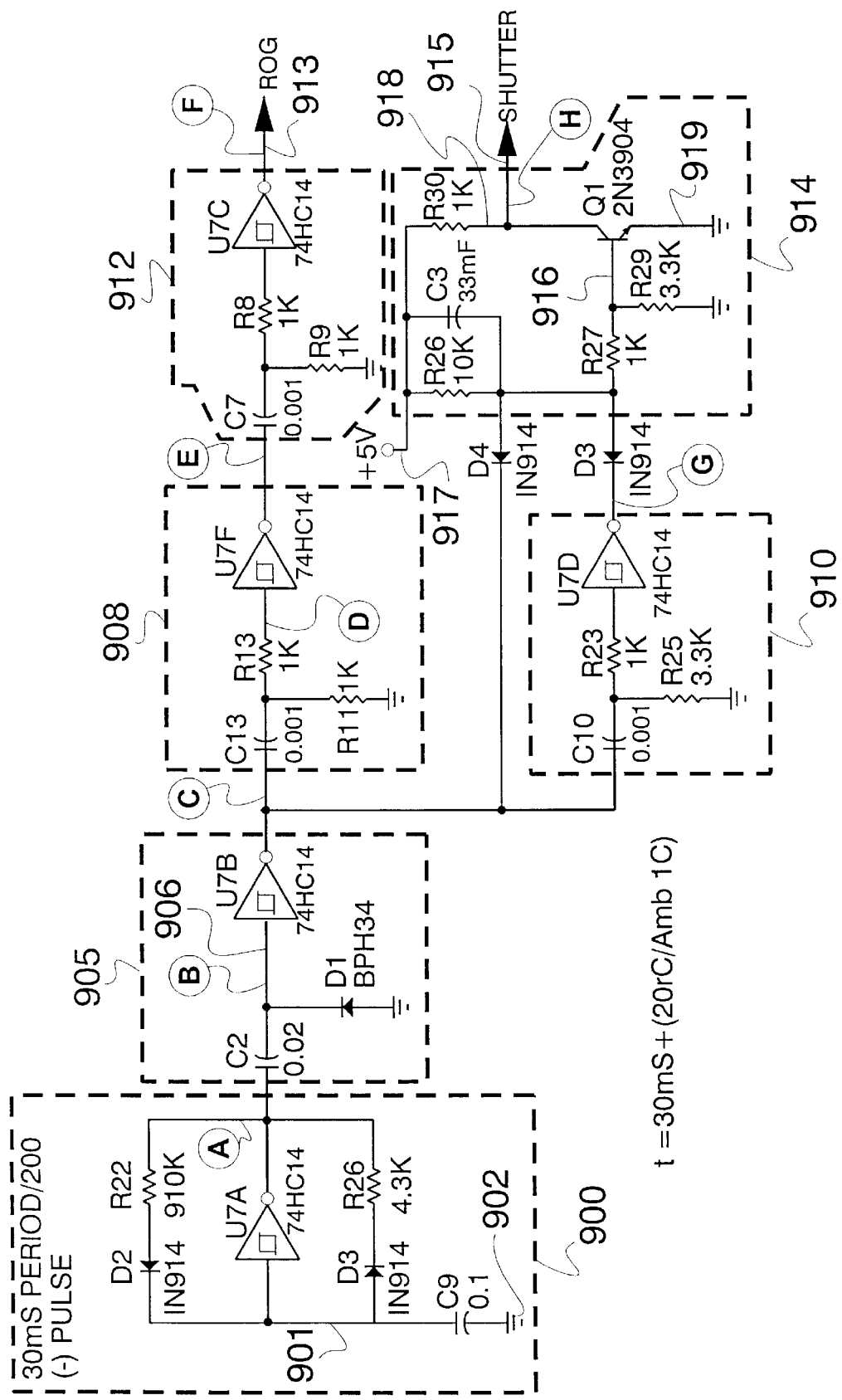
FIG. 43A is a circuit diagram of a preferred adaptive exposure circuit.
Figure 43B:
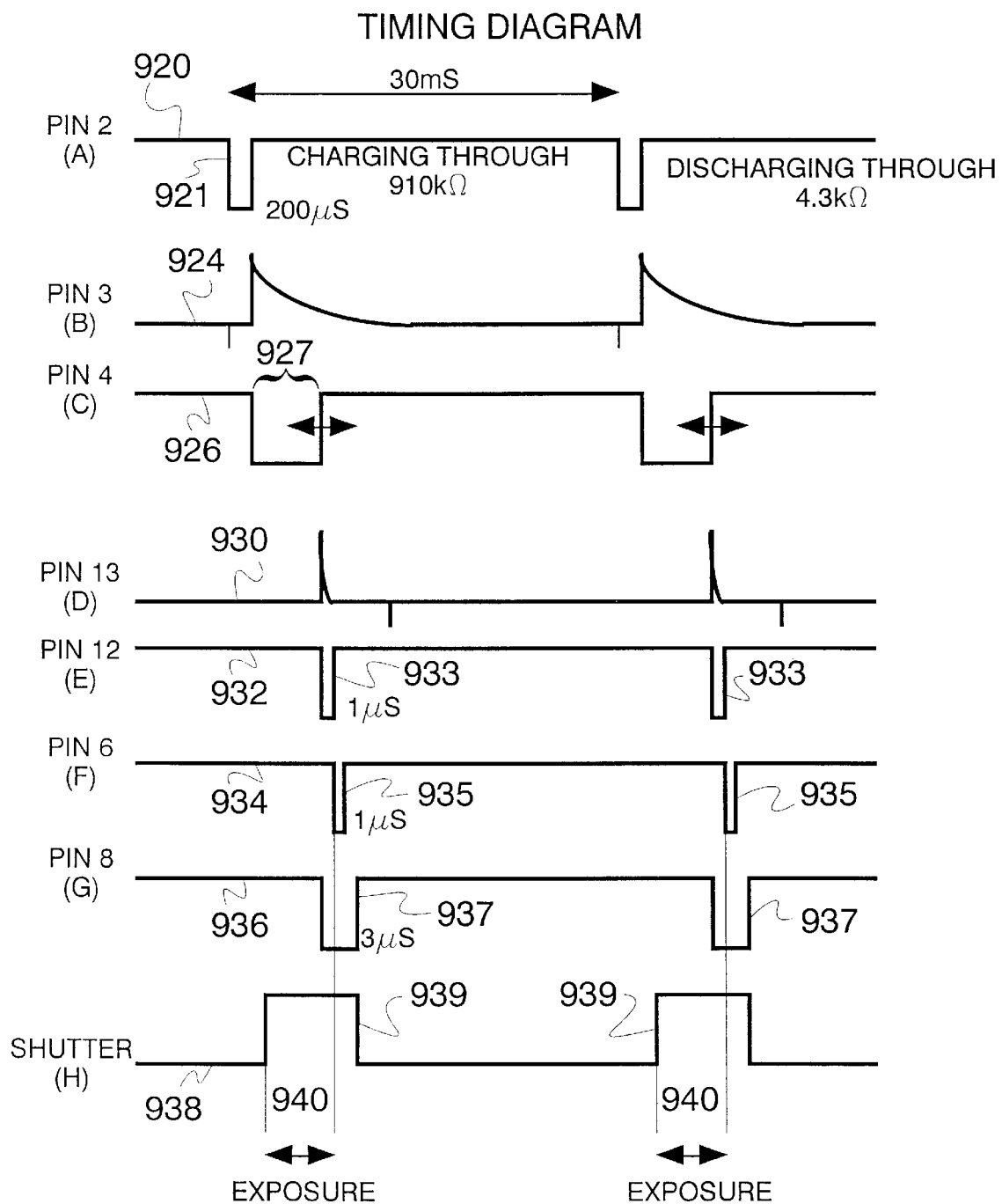
FIG. 43B is a graph of waveform patterns for the circuit of FIG. 43A.

FIG. 43A depicts one embodiment of an adaptive exposure system in accordance with one or more aspects of the present invention. FIG. 43B is a diagram of exemplary waveforms in accordance with the FIG. 43A embodiment.

In FIG. 43A, a pulse train oscillator 900 is shown comprising a Schmitt trigger U7A having an input node 901 connected through a capacitor C9 to ground 902. The input node 901 of the Schmitt trigger U7A is connected through a diode D3 and a resistor R26 positioned in series to the output node 903 of the Schmitt trigger U7A. The input node 901 is also connected to another diode D2 configured in the opposite direction of diode D3, and thereafter to a resistor R22 and then to the output node 903 of the Schmitt trigger U7A.

The output of the pulse train oscillator 900 at point A comprises a periodic waveform 920 such as shown in FIG. 43B. The periodic waveform 920 may have a period of, for example, 30 milliseconds and a 200 microsecond negative-going pulse 921. Capacitor C9 may have a capacitance of 0.1 µF, resistor R22 may have a resistance of 910 ohms, and resistor R26 may have a resistance of 4.3 kΩ. The output pulse of waveform 920 is generally positive when capacitor C9 is charging through resistor R22, and is negative when the capacitor C9 discharges through resistor R26.

The pulse train oscillator 900 is connected to a monostable multivibrator 905. The monostable multivibrator 905 comprises a capacitor C2 connected to one end of a photodiode D1 as shown. The other end of the photodiode D1 is connected to ground 902. The photodiode Di is preferably located adjacent to the CCD detector or otherwise nearby so as to be able to detect the amount of light being received from the optical system. The capacitor C2 is connected to the input node 906 of a Schmitt trigger U7B. Capacitor C2 may have a capacitance of 0.02 µF.

In operation, the pulse train oscillator 900 drives the capacitor C2 and the photodiode D1. The waveform 924 at point B and the resulting output waveform 926 from the monostable multivibrator 905 at point C are shown in FIG. 43B. The conductance of the photodiode Di controls the output pulse width 927 of the monostable multivibrator 905, and therefore controls the duty cycle of oscillation at point C. When the photodiode D1 receives a relatively large amount of light, the output waveform 926 at point C will have a relatively narrow negative pulse (e.g, almost 100% duty cycle). When the photodiode D1 receives a relatively small amount of light, the output waveform 926 will have a relatively wide negative pulse (e.g., near 0% duty cycle).

The output of the monostable multivibrator 905 is connected to two other monostable multivibrators 908 and 910. Both of monostable multivibrators 908, 910 have a similar configuration. Monostable multivibrator 908 comprises a capacitor C13 at its input. The capacitor C13 is shunted by a resistor R11 to ground, and is connected through another resistor R13 to a Schmitt trigger U7F. Capacitor C13 may have a capacitance of 0.001 µF, and each of resistors R11 and R13 may have a resistance of 1 kΩ. The other monostable multivibrator 910 is configured in a similar manner with capacitor C10, resistors R23 and R25, and Schmitt trigger U7D, except that resistor R25 has a larger resistance than resistor R11, such as 3.3 kΩ.

The output of monostable multivibrator 908 is connected to another monostable multivibrator 912, configured in a similar manner with capacitor C7, resistors R8 and R9, and Schmitt trigger U7C. The output of monostable multivibrator 912 at point F is read-out gate (ROG) signal 913, the function of which is explained below. Monostable multivibrators 908 and 912 preferably each produce a fixed pulse of about 1 microsecond in duration, while monostable multivibrator 910 preferably produces a fixed pulse of about 3 microseconds in duration.

The shutter signal 915 at point H is a function of the outputs of both monostable multivibrators 905 and 910. The output of multivibrator 905 at point C and the output of multivibrator 910 at point G are diode OR'ed together through diodes D4 and D5, respectively, to a shutter output pulse stage 914. The shutter output pulse stage 914 comprises a transistor network, including a transistor Q1 whose base 916 is coupled to each of diodes D4 and D5 through a resistor R27. Diodes D4 and D5 are connected to the reference voltage 917 (e.g., 5 volts) through a resistor R28 and a capacitor C3 connected in parallel. The collector 918 of transistor Q1, which produces the shutter signal 915 at point H, is connected through resistor R30 to the reference voltage 917. The base 916 of the transistor is connected to ground 902 through resistor R29, while the emitter 919 of the transistor Q1 is connected directly to ground 902.

Through the OR'ing operation of diodes D4 and D5, the shutter signal 915 (shown as waveform 938 in FIG. 43B) comprises a series of pulses 939 which transition from a low state to a high state when the negative pulse of monostable multivibrator 905 begins, and stay high until the negative pulse of monostable multivibrator 910 times out. The effect is that of a variable duty cycle oscillator, wherein the duty cycle varies according to the light received by the photodiode D1.

The actual exposure period 940 as shown in FIG. 43B is somewhat less than the duration of the pulses 939 in the shutter signal 938. The exposure period 940 is commenced at the start of each pulse 939 of the shutter signal 938, but is terminated by the ROG signal pulse 935 as shown in waveform 934 of FIG. 43B. The ROG pulse 935 terminates the exposure period 940 by causing a transfer of charge from the pixels in the CCD array into the CCD shift registers. When the shutter signal 938 is high, the pixels collect light. When the shutter signal 938 is low, the pixels are shorted; however, the ROG pulse 935 generally terminates the collection of light before the shutter signal 938 transitions from high to low.

Monostables 908, 910 and 912 ensure that the ROG pulse 935 terminating the exposure period 940 falls cleanly just before the end of the shutter pulse 939 and at a time when clocking to the CCD array is disabled. Monostable 910 establishes a 3 microsecond clock disable period 937, at the end of which the shutter pulse 939 generally terminates. At the same time as the 3 microsecond period 937 begins, monostable 908 establishes a 1 microsecond delay 933, after which the ROG pulse 935 is generated by monostable 912. Thus, the ROG pulse 935 falls at some point in the middle of the 3 microsecond period 937 established by monostable 910, and just prior to the end of the shutter pulse 939. The output of monostable 910 disables clocking to the CCD array at the time when the ROG pulse 934 occurs.

The adaptive exposure circuit of FIG. 43A thus provides an exposure period which varies based on the amount of light. When there is more light, the exposure period 940 is smaller, and when there is less light the exposure period 940 is larger (up to, e.g., 30 milliseconds).

FIGS. 44A and 44B show alternative configurations of an optical system employing an adaptive exposure circuit.

In FIG. 44A, a CCD chip 950 produces a video output signal 956 which is connected to a pre-amplifier 951. The pre-amplified signal 952 is connected to a peak detector 954, which measures the peak-to-peak value of the pre-amplified video signal 952. The peak-to-peak signal 957 is provided to an exposure control circuit 955 which adjusts the exposure period for the CCD chip 950. The exposure control circuit 955 is configured in a similar manner to the exposure control circuit of FIG. 43A, but uses the peak-to-peak signal 957 to control the exposure time rather than the collected light as measured by a photodiode D1.

FIG. 44B shows an alternative adaptive exposure technique that is similar to the technique of FIG. 44A, but the peak-to-peak signal level of the first derivative of the video signal is used to control the exposure time of the CCD chip instead. In FIG. 44B, a CCD chip 960 produces a video output signal 967 which is connected to a pre-amplifier 961. The pre-amplified signal 966 is connected to a signal processing block 962. The signal processing block 962 generates a first derivative of the pre-amplified signal 966. The first derivative signal 963 is connected to a peak detector 964, which measures the peak-to-peak value of the first derivative signal 963. The peak-to-peak signal 968 is provided to an exposure control circuit 965 which adjusts the exposure period for the CCD chip 960. The exposure control circuit 965 is configured in a similar manner to the exposure control circuit of FIG. 43A, but uses the peak-to-peak signal 968 generated from the first derivative of the video signal to control the exposure time rather than the collected light as measured by a photodiode D1.

Once the video signal is obtained, transitions in the video signal may be detected by any of a number of means as known in the art. For example, transitions in the video signal may be detected by taking a second derivative of the video signal, and finding zero crossings of the second derivative signal during selected timing intervals. One such technique is described, for example, in U.S. Pat. No. 4,000,397 entitled "Signal Processor Method and Apparatus" issued in the name of Hebert et al., which herein.

Figure 45A:
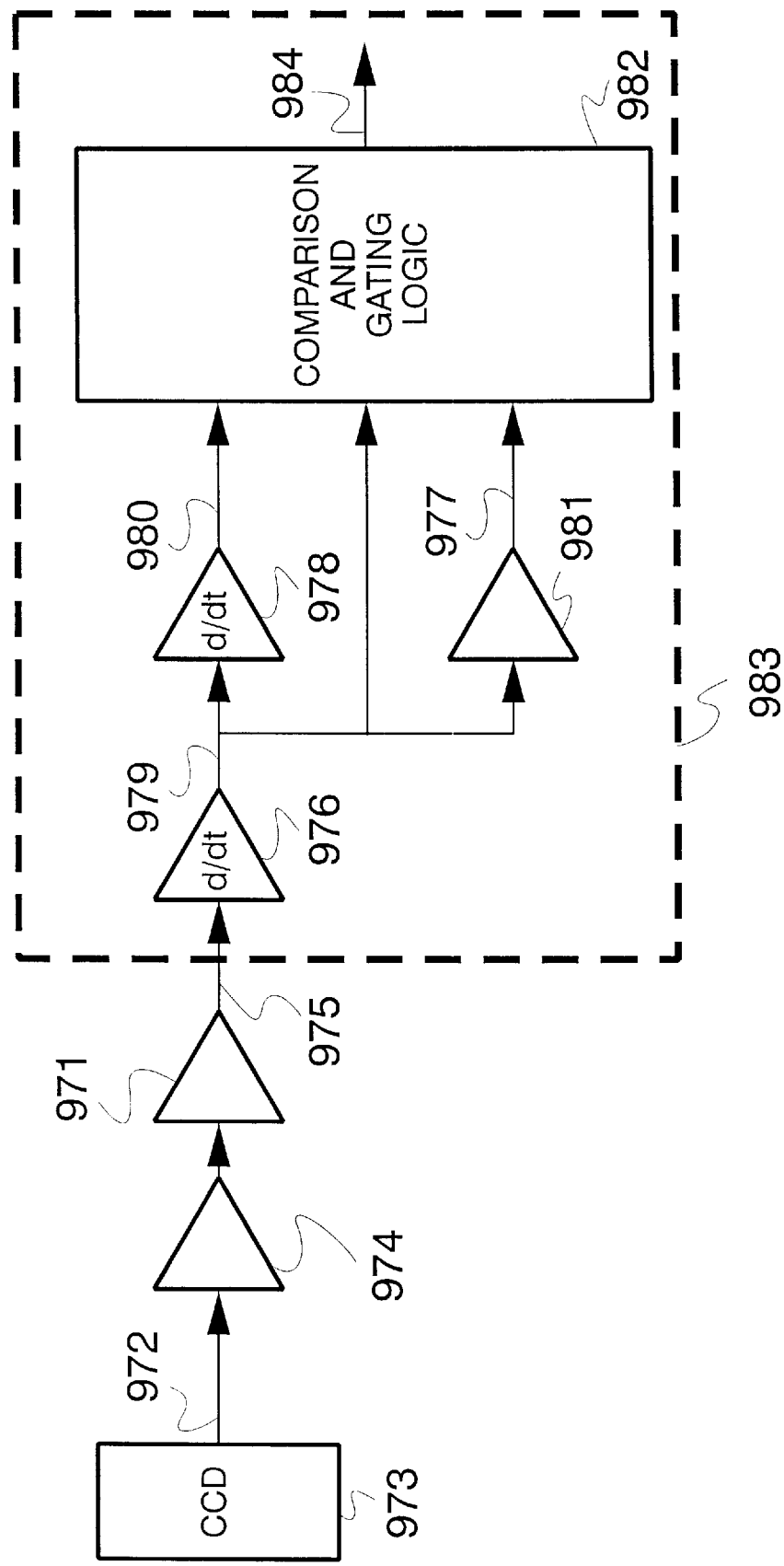
FIG. 45A is a block diagram of a signal processing circuit for determining transitions in a video signal.
Figure 45B:
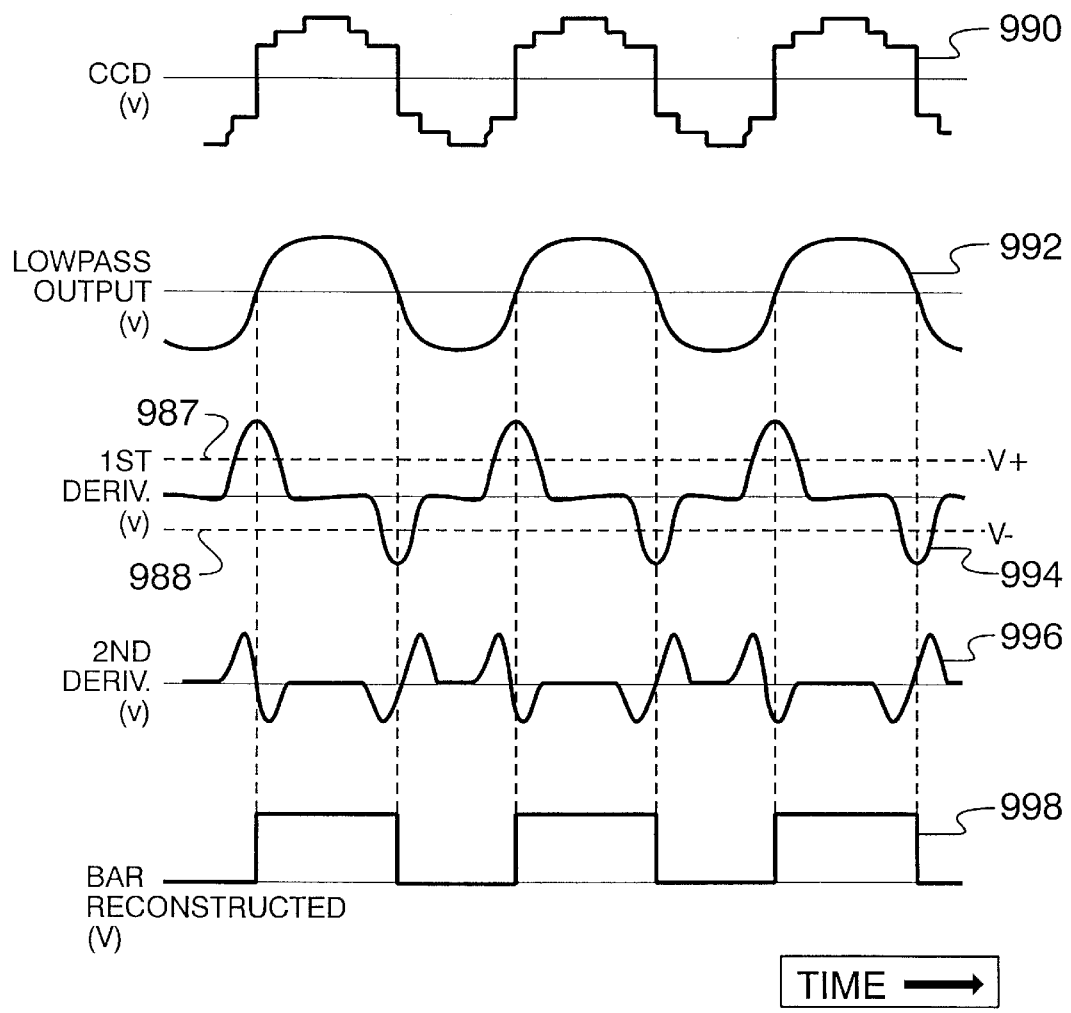
FIG. 45B is a graph of waveform patterns for the circuit of FIG. 45A.

A second-derivative detection circuit is shown in FIG. 45A. Corresponding waveforms for the FIG. 45A circuit are shown in FIG. 45B. In FIG. 45A, a low pass reconstruction filter 971 receives a video input signal 972 from a CCD chip 973. The video input signal 972 may comprise a plurality of stepped voltage levels, like stair steps, corresponding to the contents of the CCD array, such as shown in waveform 990 of FIG. 45B. The video input signal 972 may be passed through an optional gain stage 974, before being fed into the low pass filter 971. The low pass reconstruction filter 971 smooths the video input signal 972 into a smoother, more continuous waveform, such as waveform 992 of FIG. 45B.

The low-pass filtered signal 975 is coupled to a differentiator circuit 976, which generates a first derivative 979 1515. of the low-pass filtered signal 975. The first derivative 979 is coupled to another differentiator circuit 978, which takes another derivative, thereby generating a second derivative 980 of the low-pass filtered signal 975. The first derivative signal 979 corresponds to waveform 994 of FIG. 45B, while the second derivative signal 980 corresponds to waveform 996 of FIG. 45B.

The first derivative signal 979 is also coupled to a peak detector circuit 981, which detects the peak value of the first derivative signal 979 and generates a threshold signal 977 thereby. The threshold signal 977, the first derivative signal 979, and the second derivative signal 980 are provided to a comparator logic block 982. The comparator logic block 982 detects zero crossings of the second derivative signal 996 (as shown in FIG. 45B) by comparing the second derivative signal with a zero voltage level. The zero crossings are considered valid transitions if they occur when the first derivative signal 979 exceeds the level (positive or negative) of the threshold signal 977. Thus, the comparator logic block 982 compares the first derivative signal 979 with the threshold levels (positive and negative) 987, 988 defined by threshold signal 977 and determines a valid transition when the second derivative signal 996 crosses the zero level during a time when the first derivative signal exceeds the level of either threshold signal 987, 988. A reconstructed bar signal waveform 998 such as may be obtained by the method described above is shown in FIG. 45B. The polarity of the bar signal waveform 998 depends on the sign of the first derivative signal 994 at the time of the second derivative zero crossing.

Further details regarding second derivative detection techniques are described in U.S. Pat. No. 4,000,397, cited above. Transitions in the video signal may also be detected by use of techniques described in U.S. Pat. No. 5,463,211 entitled "Method and Apparatus for Detecting Transitions in a Time Sampled Input Signal," and/or in copending application Ser. No. 08/548,436 filed on Oct. 26, 1995 and bearing the same title, both of which are assigned to the assignee of the present invention and are incorporated by reference as if fully set forth herein. Further related techniques may be found in U.S Pat. No. 5,298,728 entitled "Signal Processing Method and Apparatus," which is also incorporated by reference as if fully set forth herein. The delay-line based signal processing technique described in the '211 patent referenced above may be workable, for example, without the need for an initial low pass reconstruction filter, and may in some circumstances be configured to operate directly on the CCD video output signal.

Derivative-based signal processing performance can be enhanced by employing AC coupled signal processing techniques as described further below. Because derivatives are noisier than the original signal, derivative-based signal processors sometimes may require a signal to noise ratio on the order of 10 to 1 for optimal operation. Moreover, if the bar code is blurred or is misaligned with respect to the reader, the transitions between low and high signal levels may be gradual ("soft edges") rather than abrupt ("hard edges"), resulting in low amplitude derivative signals despite adequate signal levels.

In order to provide reliable signal processing even when soft edges are present, a preferred embodiment of the signal processing electronics comprises an AC coupled signal processing unit based on (1) a high pass FIR (finite impulse response) filter with a relatively low cutoff frequency; and (2) a comparator with hysteresis. A block diagram of such a signal processor is shown in FIG. 67. The FIG. 67 embodiment comprises a high pass FIR filter 1401 and a hysteretic comparator 1402 which includes an operational amplifier 1405 with resistors 1406, 1407 and 1408 having values selected to provide a suitable amount of hysteresis. An input signal 1410 received from a detector array is connected to the FIR filter 1401 that removes the low frequency and DC bias (i.e., non-barcode signals). The comparator 1402 trips to the BAR (high) state if the output of the FIR filter 1401 is positive, and trips to the SPACE (low) state if the output of the FIR filter 1401 is negative. A hysteresis band is used to keep noise from triggering the comparator 1402.

An optimal FIR filter 1401 consists of a Gaussian impulse response high pass filter, whose coefficients for an 11th-order filter are tabulated and graphed in FIG. 68B. A simplified FIR filter may also be implemented in the form of a moving average filter. Coefficients for an exemplary 11th-order moving average high pass FIR filter are tabulated and graphed in FIG. 648. The FIG. 68A filter has the advantage of being easily implemented in software.

Figure 69A:
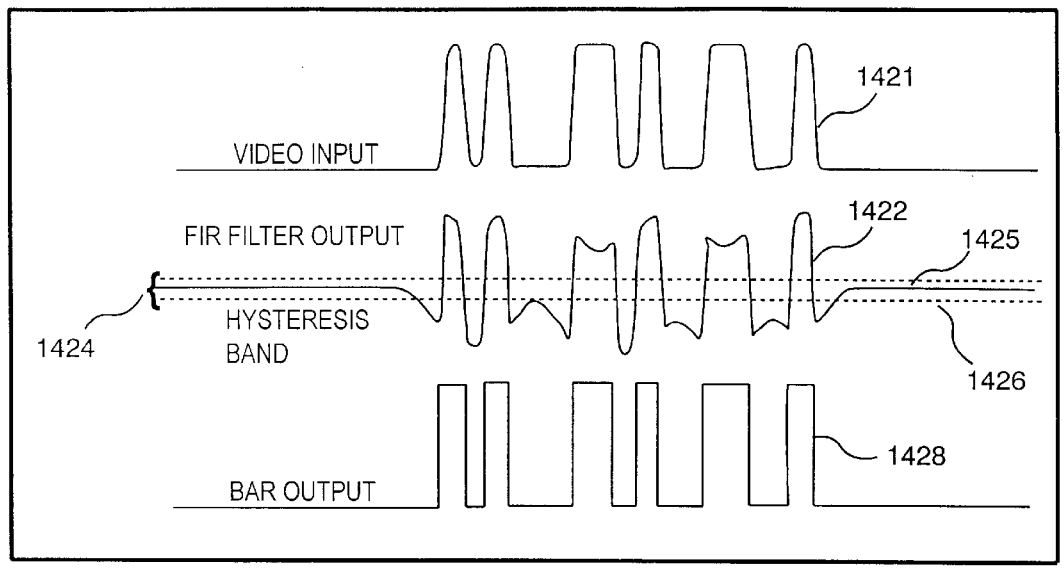

The operation of the FIG. 67 signal processor depends in part on the speed of the bar code signal (i.e., time between transitions), and is illustrated in FIG. 69A for bar widths approaching the time constant of the FIR filter 1401 (i.e., fast bar code signals). In this situation, the FIR filter 1401 acts as a DC restoration circuit so as to AC-couple the input signal 1410 (shown as waveform 1421 in FIG. 69A) around zero volts. The amplitude of the coupled signal 1422 (i.e., the output of the FIR filter 1401) is nearly as large as that of the input waveform 1421; therefore, there is no additional noise introduced by the action of the FIR filter 1401. The hysteresis band 1424 of the comparator 1402, comprising positive hysteresis threshold 1425 and negative hysteresis threshold 1426, is set to be just larger than the noise floor. In CCD devices, the noise floor is usually constant and predictable for a constant signal level and can therefore be set appropriately if the expected input signal level is known in advance, or otherwise may be set by experiment. The comparator 1402 trips when the FIR filter output signal 1422 low rises above the positive hysteresis threshold 1425. It resets when the FIR filter output signal 1422 drops below the negative hysteresis threshold 1426. The comparator 1402 will no longer switch states when the signal level remains within the hysteresis band 1424. The resulting output signal 1428 is shown in FIG. 69A.

Figure 69B:
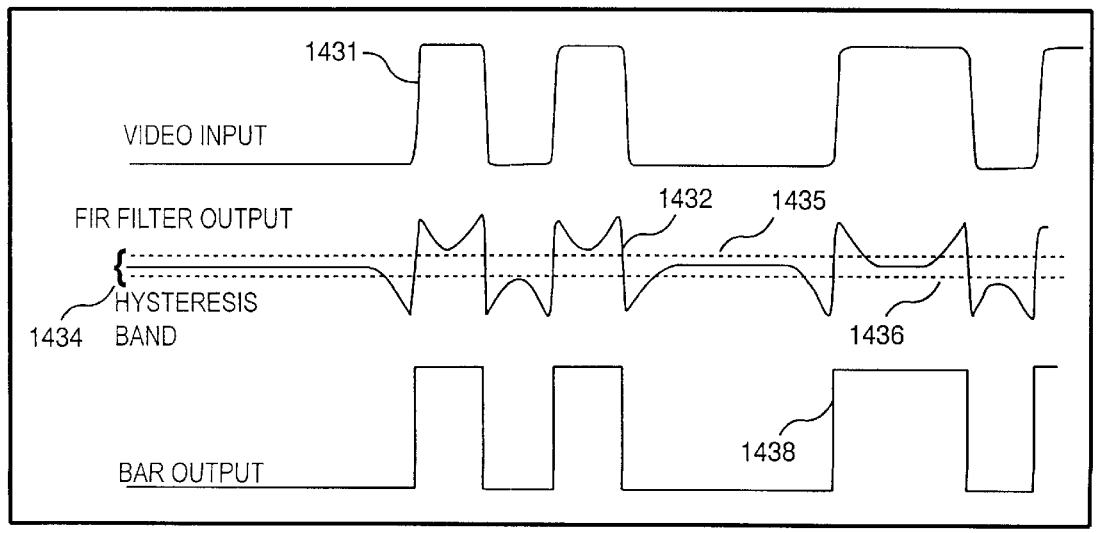

When the bars are much larger (i.e., the input signal is slower), the waveforms are substantially different, as shown in FIG. 69B. The input signal 1431 has wider spacing between transitions. The FIR filter output signal 1432 looks similar to a derivative. However, the amplitude of the FIR output signal 1432 is still almost the same as that of the input signal 1431. The comparator 1402 trips to a high state when the filter output signal 1432 is above one hysteresis threshold 1435. The derivative-like FIR filter output signal 1432 declines toward zero quite quickly, but the comparator 1402 does not trip to its other state until another edge appears due to the effect of the hysteresis band 1434. When another edge appears, the FIR filter output signal 1432 passes the negative hysteresis threshold 1436, and the comparator 1402 trips to its other state.

Accordingly, the FIG. 67 circuit is capable of effectively reshaping input signal bars from nearly infinite width to a width on the order of the time constant of the FIR filter 1401. When the optics of the optical system go out of focus or the reader becomes misaligned with respect to the bar code, the rise time of the analog input signal 1410 will generally increase. The FIG. 67 circuit, however, is still able to detect and respond to bar transitions.

Figure 66:
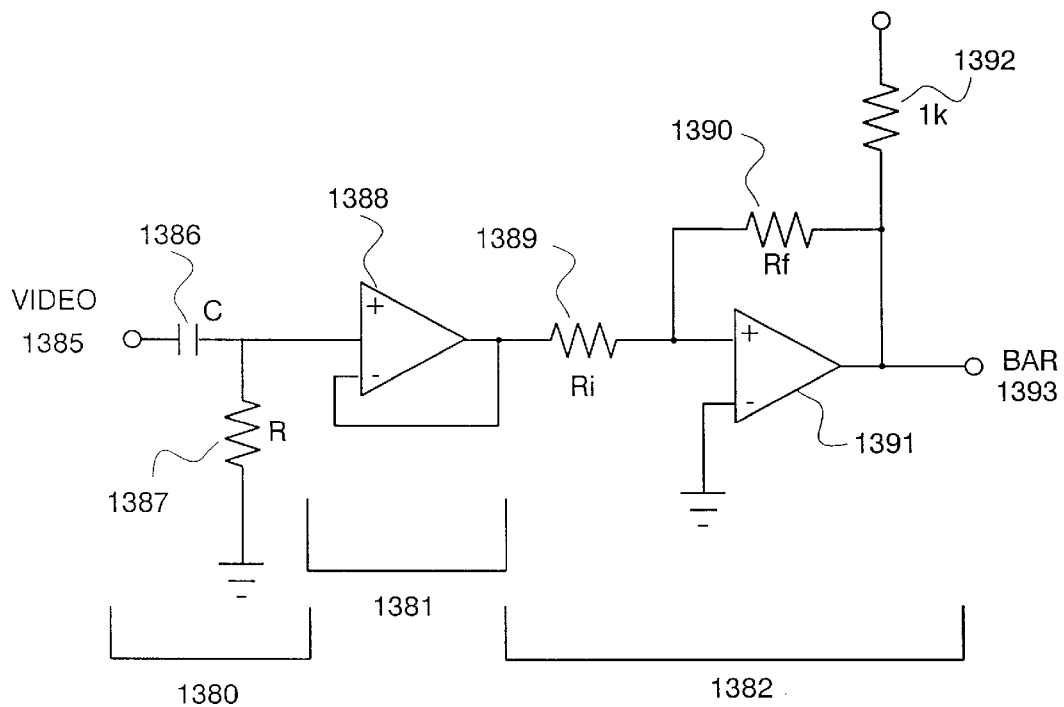
FIG. 66 is a diagram of a signal processor circuit including an infinite impulse response high pass filter.

The linear phase properties of FIR filters are desirable in the signal processing system. The implementation of FIR filters is relatively straightforward in software. Hardware implementations are more problematic, consisting of transversal filters, LC delay lines, or sample and hold delay lines, but lend themselves to integration onto the same integrated circuit as a APS detector array. As an alternative to an FIR filter, an IIR (infinite impulse response) filter may be used, which is much easier to implement in hardware (with simple RC circuits or active filters). FIG. 66 is a diagram of an exemplary signal processor using a single pole/zero high pass network. The FIG. 66 embodiment comprises a high pass filter 1380, a buffer 1381, and a hysteretic comparator 1382. The high pass filter comprises a capacitor 1386 and resistor 1387, the buffer 1381 comprises an operational amplifier 1388 in a voltage-follower configuration, and the comparator 1382 comprises an operational amplifier 1391 with resistors 1389, 1390 and 1392 having values selected to provide a suitable amount of hysteresis. A possible drawback of the FIG. 66 embodiment is that it may show increasing amounts of bar distortion as the bar widths approach the filter time constant.

Information regarding the location, or timing of the transitions in the video signal is provided to the decoder 107 (such as shown, e.g., in FIG. 1A), which interprets the transition data by any of a variety of means such as those well known in the art. Thus, the decoder 107 may determine the relative widths of bars and spaces by measuring the relative time between each transition. The decoder may use the bar and space measurement data to determine which of a variety of bar codes have been read, and/or the particular characters of the bar code. Further details regarding decoding may be found, for example, in U.S. patent application Ser. No. 07/995,270 entitled "Method and Apparatus for Recognizing and Assembling Optical Code Labels" filed on Dec. 22, 1992, in the name of inventors Craig D. Cherry and Donald D. Dieball, which application is incorporated by reference as if fully set forth herein.

In many barcode reading and decoding systems, the decoding step is the slow step in the procedure. It is therefore desirable to minimize the amount of time spent by the decoder 107 trying to decode invalid signals. This time minimization may be accomplished in a preferred embodiment by performing preprocessing of image data prior to presentation to the decoder 107. By so doing, voltage sequences which are unlikely to correspond to a valid bar code can be rejected without tying up the decoder 107.

Preprocessing may be performed very rapidly by a simple edge counter. A typical bar code will have on the order of 30 edges. A signal sequence may be classified by the edge counter as "interesting" if it exhibits more than a predetermined minimum number of edges, 20 or 25 for example. Those signal sequences deemed "interesting" are then read out more slowly to the decoder 107 for decoding. However, data readout from a CCD detector or other type of photosensitive array is typically destructive—i.e., the readout destroys the data. The preprocessing edge counter therefore is preferably used in conjunction with a memory storage element such as an analog shift register to enable "rescanning", that is, a second look at the same data, this time by the decoder 107.

Figure 72:
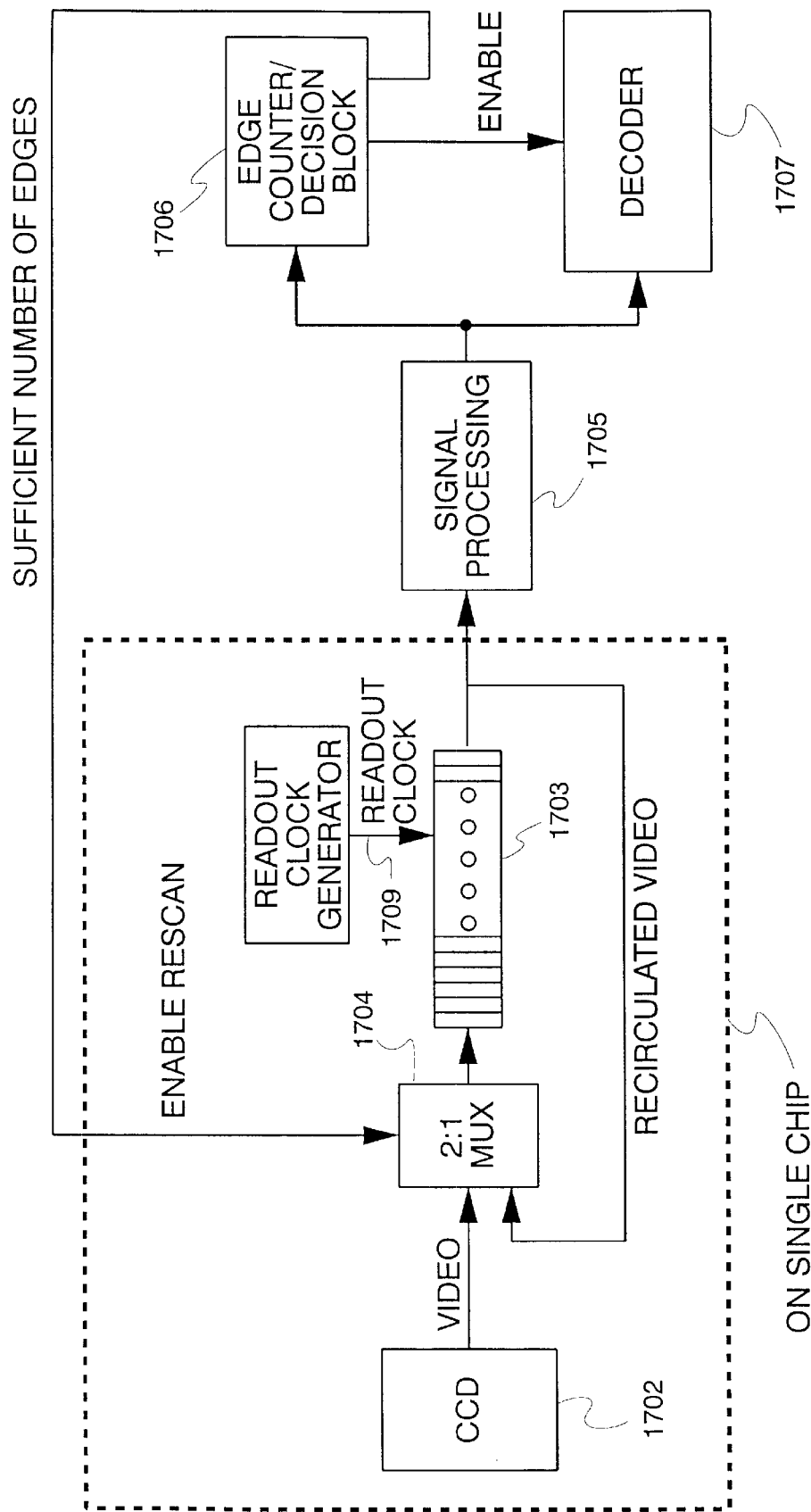
FIG. 72 is a block diagram of a bar code reader having rescan capabilities.

A system including rescanning capability is shown in FIG. 72. Rescanning is accomplished through the use of an analog shift register 1702 to store the image data from a CCD detector 1703. After exposure of the CCD detector 1703 to an image, the pixel charges are transferred to from the CCD detector 1703 the analog shift register 1702. A rescan multiplexer 1704 selects the input from the CCD detector 1703. After an image is transferred to the analog shift register 1702, the image data is rapidly read out of the analog shift register 1702 for preprocessing with the "rescan" function enabled. The "rescan" function causes the data from the analog shift register 1702 to be circularly queued, so that after each pixel charge is read at the output end of the analog shift register 1702, it is shuttled back to the other end of the analog shift register 1702 through rescan multiplexer 1704 as the remaining charges are shifted forward by one position.

The image data is provided to a signal processor (e.g., edge detector) 1705, which then provides its information to an edge counter 1706 to perform preprocessing. At this time the decoder 1707 has not yet received the image data, and could be working on decoding of a previous scan. If after preprocessing by the edge counter 1706 the signal qualifies as "interesting", then the image data is read out from the analog shift register 1703 a second time at a slower speed (by altering the speed of the readout clock 1709) commensurate with the data acceptance rate of the decoder 1707, this time with the rescan function disabled. Disabling the rescan function allows the analog shift register 1703 to empty in preparation for the next image, by preventing the image data from being queued in a circular fashion to the opposite end of the register 1703. Simultaneously, a new image may be read into the analog shift register 1703 as the old image is read out. If the original image data did not qualify as "interesting" in the first place, then the analog shift register 1703 is emptied in preparation for the next scan, either with a drain or by rapidly reading out with the rescan disabled.

A number of the various rescan components can be combined onto a single integrated chip, as indicated in FIG. 72. The analog shift register 1703 commonly exists in CCD chips in the form of an image transfer register.

The preprocessing and rescan capabilities described in the immediately preceding paragraphs are particularly useful in applications involving a plurality of detector arrays. Each of the arrays could have its own preprocessor to determine when an "interesting" signal is present, thereby allowing more efficient division of decoder time among only those detector arrays having signals likely to represent a bar code.

Figure 70A:
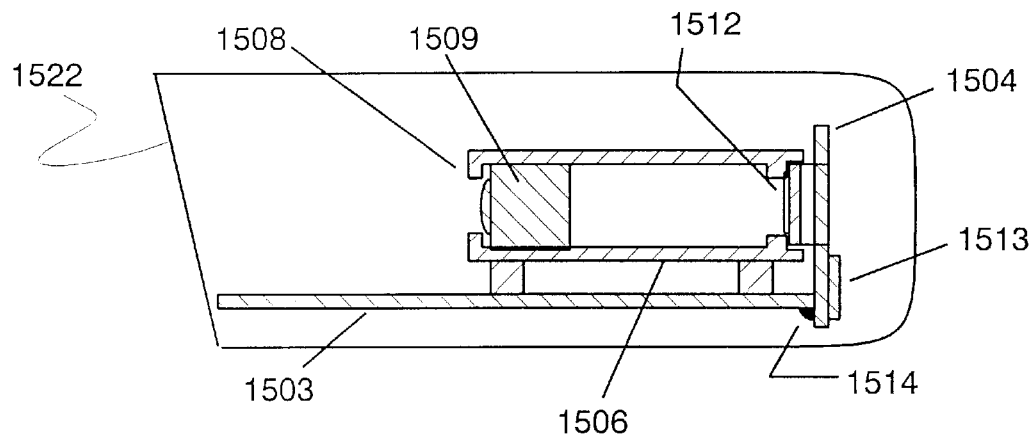
FIGS. 70A and 70B are different depth cross-sectional views of the scan head of the bar code reader of FIG. 1.
Figure 70B:
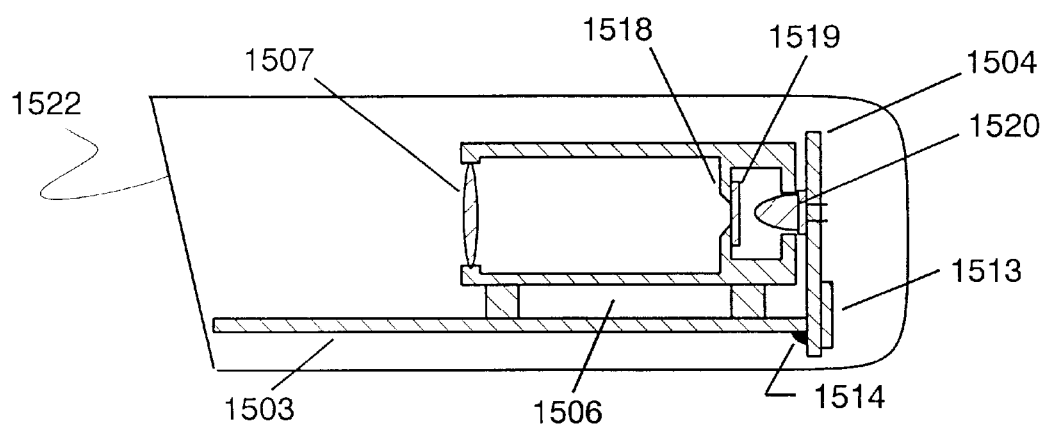
Figure 70C:
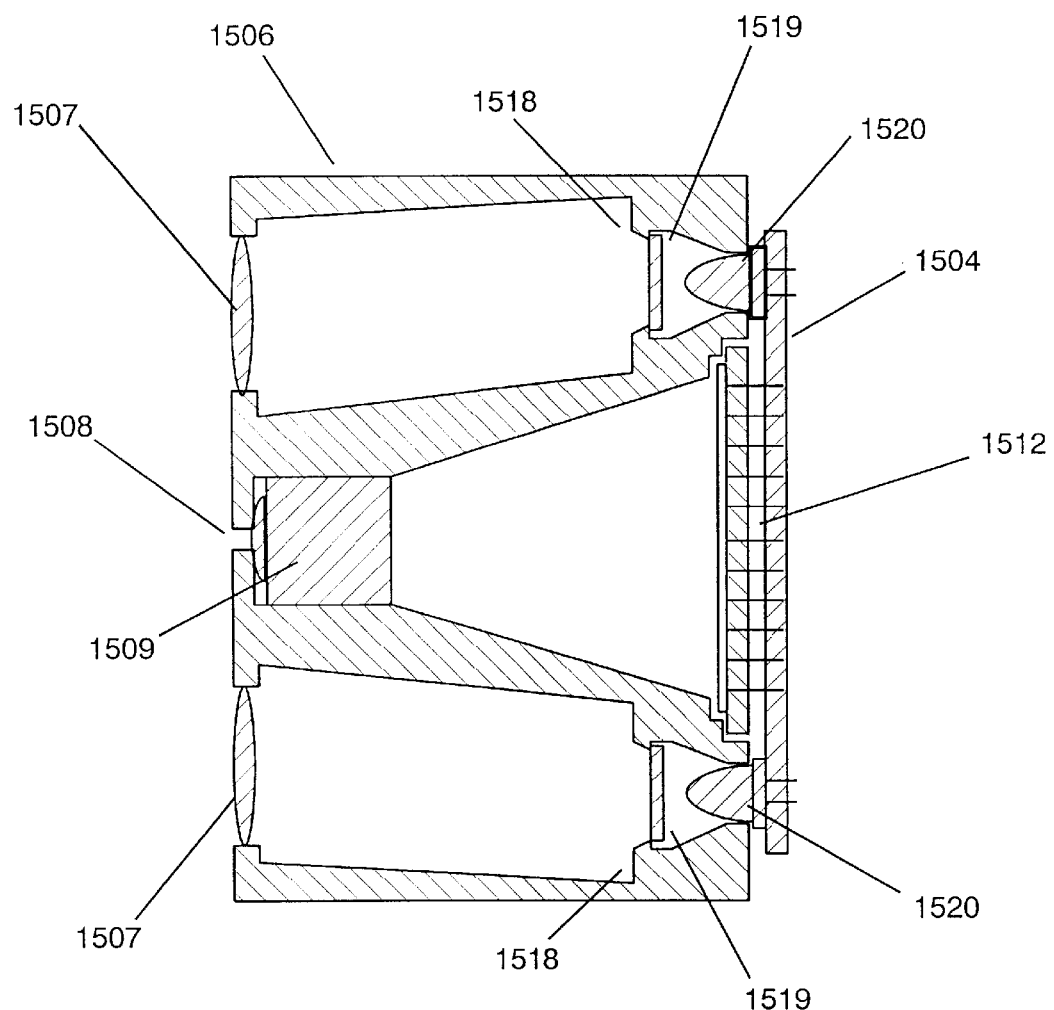
FIG. 70C is a top sectional view of the optical chassis mounted in the scan head shown in FIGS. 70A and 70B.

Further details of the preferred embodiment of a bar code reader of FIG. 1 are shown in FIGS. 70A–70C, with a preferred electronic block diagram and associated waveforms shown in FIGS. 71A–71D. The bar code reader 1501 depicted in FIG. 1 and FIGS. 70A–70D is a handheld unit with relatively large depth of field that can operate in ambient light by employing a preferred combination of the techniques and components described previously herein.

The scan head 1522 and optics chassis 1506 of the FIG. 1 bar code reader are shown in more detail in FIGS. 70A–70C, along with other optical system and related components. Attached to the analog board 1504 and within the optical chassis 1506 is a CCD detector array 1512 of the masked variety such as depicted in FIG. 52A. The CCD detector preferably has rectangular pixels having a 10:1 aspect ratio, such as shown in and described with respect to the example of FIG. 50A. The CCD detector 1512 is connected to an adaptive exposure system such as shown in FIG. 43A and resident on the analog circuit board 1504 along with a microcontroller that generates CCD timing signals, implements an adaptive exposure feedback system, and provides various signals to the decoder (such as described with respect to the electronics in FIG. 71A below). Towards the front of the optical chassis 1506 is located an imaging lens 1509, which is shown in more detail in FIGS. 73A (front view) and 73B (side view). In FIG. 73A is shown an imaging lens 1749 (corresponding to imaging lens 1509) that comprises a multi-focus lens portion 1753 such as the FIG. 41A multi-zone lens having four concentric annular zones 1750a–d of varying focal lengths, and which form images on the CCD detector 1512. The multi-focus lens portion 1753 is mounted on a cylinder lens 1755. The cylinder lens 1755 and multi-focus lens portion 1753 preferably comprise a single optical element and may be formed of solid glass or plastic. The cylinder lens 1755 has a concave back surface 1752 which allows correction for field of view aberrations as necessary.

Figure 73B:
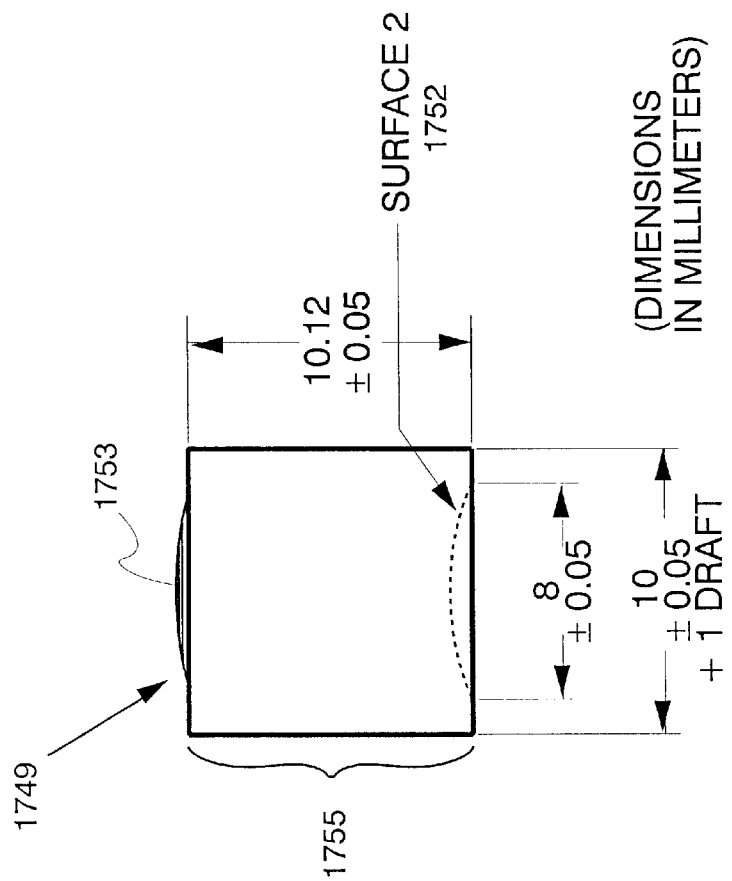
FIGS. 73A and 73B are diagrams of a mounted multi-focal lens showing preferred dimensions thereof.
Figure 73A:
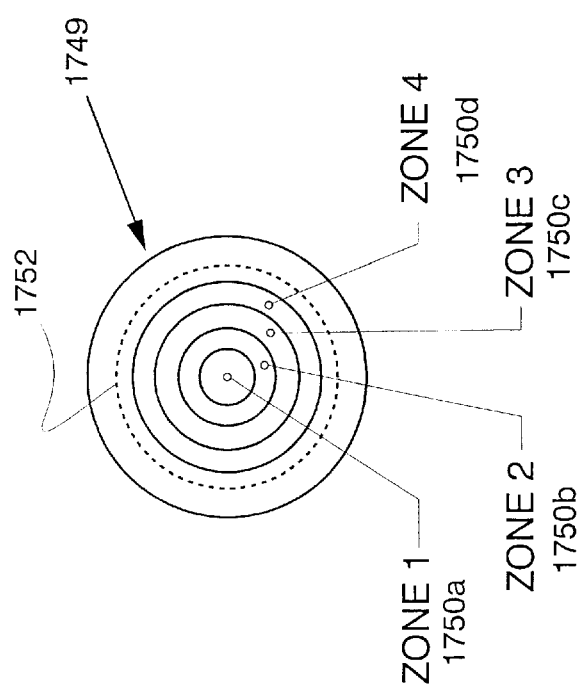

Preferred dimensions (in millimeters) are provided in FIGS. 73A and 73B, and are also provided in the table shown in FIG. 73C along with other preferred characteristics. Preferably, the tolerance of the center thickness is no more than ±0.05 millimeters, the tolerance of the surface irregularity is no more than 10 microns from a perfect figure, and the tolerance of the surface power is no more than 15 microns from a perfect figure. The back surface 1752 minimum clear aperture is 6 millimeters.

Returning to the description of FIGS. 70C—70C, a high aspect ratio slit aperture 1508 such as shown in FIGS. 22A–22C is located in front of the multi-zone lens 1509. Mounted on or in the optical chassis 1506 are two pointer LEDs 1520, each illuminating a holographic diffuser 1519 and sending LED pointing beams through a pointer slit 1518 and pointer lens 1507. The LED pointing system is similar to that described with respect to FIG. 65A. The optical chassis 1506 is rigidly connected to the analog circuit board 1504 in order to fix the relative positions of the slit aperture 1508, multi-zone lens 1509, CCD detector 1512, and pointer LEDs 1520.

The preferred bar code reader 1501 further comprises a derivative based signal processor for converting a video signal from the CCD detector 1512 to a bar/space signal for the decoder, with the signal processor being implemented on the analog circuit board 1504 while the decoder resides on the digital circuit board 1503. The bar code reader 1501 also has an optically transmissive spacer such as described with respect to FIG. 63 at the input end of the scan head 1522 with a missing top section for allowing sufficient ambient illumination to reach the bar code.

In operation, light from the pointer LEDs 1520 passes through holographic diffuser 1519 to uniformly illuminate pointer slits 1518 such as described with respect to FIG. 65A. Pointing beams from the pointer slits 1518 are imaged by the pointer lenses 1507 in order to allow an operator to aim the unit at the bar code and to position the bar code within the depth of field of the bar code reader 1501. The purpose of the LEDs, as previously mentioned, is not to illuminate the bar code, which is illuminated with ambient light, but simply to assist the user in properly positioning and aiming the bar code reader 1501. The LEDs 1520 are preferably turned off during the exposure interval to avoid nonuniform illumination of the bar code and to conserve power in the unit. Ambient light reflects off a target (e.g., an encoded symbol) located along a virtual imaging line. The spacer at the front of the bar code reader 1501 prevents the unit from being brought so close to the bar code that shadowing prevents adequate ambient illumination from reaching the bar code. The reflected ambient light is focused by the imaging lens 1509 onto the CCD chip 1512. The CCD chip 1512 translates light intensity information into an electrical signal by any of the techniques described previously herein. The electrical signal may be processed and decoded to provide recognition of the encoded symbol.

In hand held embodiments such as the preferred version of bar code reader 1501, it is often important to minimize power consumption while maintaining a high read rate. Power consumption may be reduced by keeping the analog circuit board powered down until needed to read a bar code. The difficulty that arises in doing so is that the CCD pixels and transfer registers located on the analog board 1504 are full of charge upon power up, and must be emptied before an image can be acquired. This emptying is preferably accomplished by pulsing a shutter pin to clear the pixels of the CCD chip 1512, and by clocking out the transfer register several times at a very high clock speed. Once the transfer register is empty, it may be read out at normal speed for image acquisition.

Also upon power up of the analog board 1504 it is desirable to stabilize the exposure feedback system rapidly to facilitate fast bar code reading, and an exponential control loop is implemented for this purpose. The pointer LEDs 1520 can consume considerable power, and preferably do not illuminate the bar code during image acquisition; therefore the LEDs 1520 are preferably turned off during image acquisition, during the powering of other high power components of the reader (beepers, indicator LEDs, etc.), and as rapidly as possible after a successful decode.

Figure 71A:
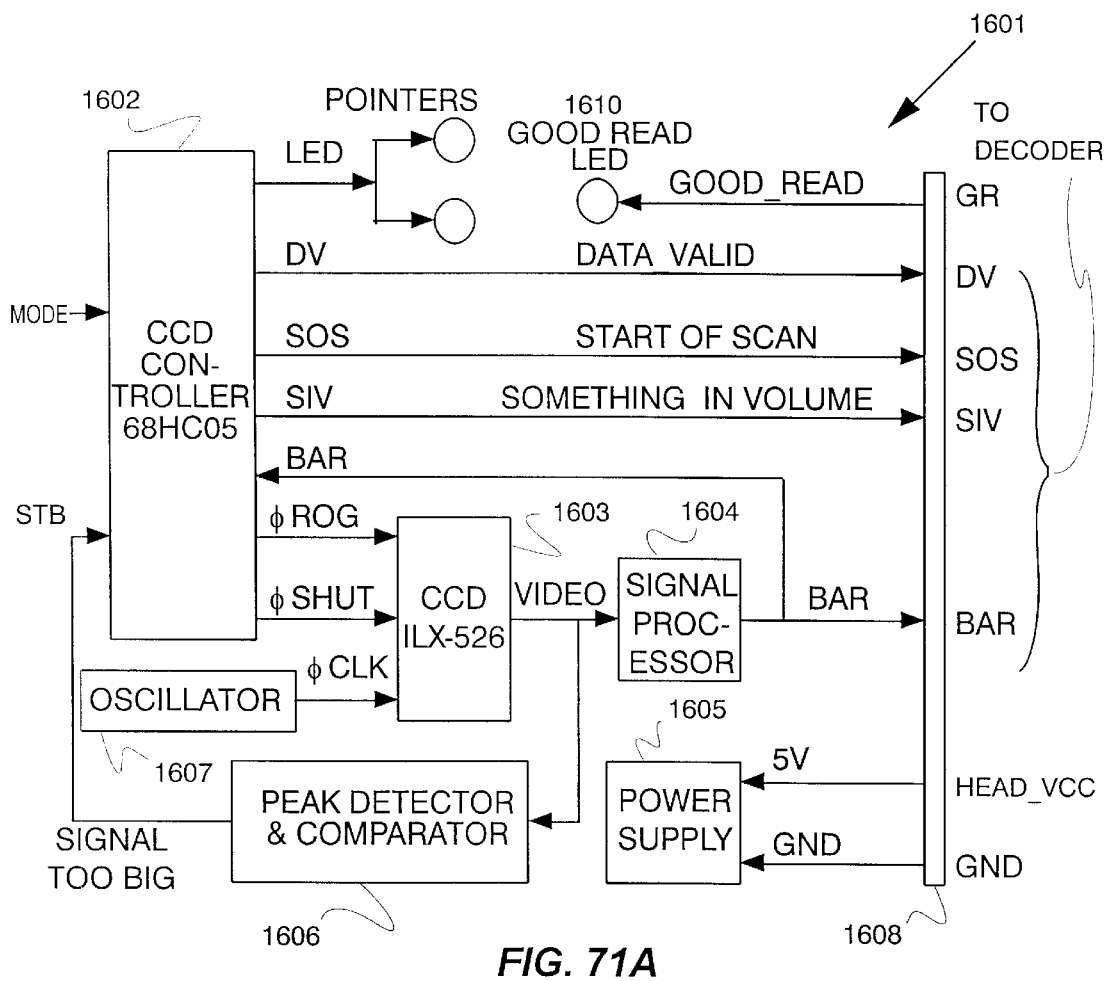
FIG. 71A is an electrical block diagram of a preferred electronics and control system for the FIG. 1 bar code reader.

A preferred electrical block diagram for the bar code reader 1501 of FIG. 1 and FIGS. 70A–70C is shown in FIG. 71A. The electronics system 1601 comprises a CCD controller 1602 which may be embodied as a MC68HC05 microchip as manufactured by Motorola, Inc. The CCD controller 1602 provides ROG and SHUT clock signals to a CCD chip 1603. An oscillator 1607 also provides a clock signal to the CCD chip 1603. The CCD chip outputs a video signal to a signal processor 1604. The video signal is also provided to a peak detector and compare circuit 1606, which sends an STB signal back to the CCD controller 1602 to indicate when the signal is too big such that clipping might occur. The signal processor 1604 and CCD controller 1602 are both connected to an interface 1608. The signal processor 1604 and CCD controller 1602 collectively output a data valid (DV) signal, start of scan (SOS) signal, something in volume (SIV) signal, and bar/space (BAR) signal to a decoder (not shown). The decoder returns with a good read (GR) signal when it has recognized a bar code, and illuminates a good read LED 1610 visible to the operator of the bar code reader 1501.

To facilitate the decoding process, the DV signal is generated by the CCD controller 1602 and, at the end of each exposure cycle signals the decoder to temporarily cease any decoding operations and await a new data stream from the signal processor 1604. Upon completion of the data transfer and bar width digitization to the decoder from the signal processor 1604, the DV signal is removed and decoding operations can resume. In this manner very high pixel readout rates are used to transfer the bar/space data to the decoder in a fraction of each exposure cycle, leaving more time available for typically slower symbology decoding operations.

Another control signal utilized is referred to as "something in volume" or SIV signal. The SIV signal is used to prevent multiple reads of the same bar code, and is particularly useful in fixed reader applications. The SIV signal is output from an edge counter (internal to the CCD controller 1602) and switches state whenever it detects a number of edges substantially different (larger or smaller) than the usual number present when no object is in front of the bar code reader 1501. Upon reception of the SIV signal, the decoder begins digitization and decoding operations until a successful decode occurs. After a successful decode the decoder is disabled until the SIV signal is removed and reasserted. The SIV signal is removed only when the edge count returns to its background level, and is only reasserted when a new bar code label is placed in front of the bar code reader 1501. In this way multiple reading of the same label is prevented.

A description of each of the signals associated with the FIG. 71A circuit embodiment as follows. The "mode select" (MODE) signal selects different modes of the device, each of which may, for example, be associated with a different speed requirement.

The "read out gate" (ROG) signal is an active high signal that drives the CCD chip's ROG input to transfer charge from the photodetectors to the transfer register.

The "shutter" (SHUT) signal is an active high signal that performs a shutter function by draining the charge from the photodetectors on the CCD chip 1603. The period of time from the release of this signal (i.e., going low) to the end of the ROG signal going high is the exposure time.

The "LED flash" (LED) signal is an active high signal that turns on the pointer LEDs 1520. The LED signal is preferably not active during the exposure time.

The "data valid" (DV) signal is, as explained previously, an active high signal that is on during the readout of pixel information from the CCD chip 1603. The DV signal being high represents the time when useful image data exists.

The "start of scan" (SOS) signal toggles after each read by the CCD chip 1603. The DV signal is approximately centered with the SOS toggling.

The "something in volume" (SIV) signal is, as explained previously, an active high signal that pulses briefly when there is a transition from the background BAR pattern to something different (such as when a label has just appeared).

The "bar input" (BAR) signal is an active high signal which has high signal levels corresponding to relatively darker portions of a read image and low signal levels corresponding to relatively lighter portions of a read image.

The "signal too big" (STB) signal is an active high signal that is on when the video output signal from the CCD chip 1602 is larger than the desired value, set by a $V_{ref}$ input on a comparator. The exposure time is preferably reduced whenever this signal is high and increased whenever this signal is low.

The "speed up" (SUP) signal, when made a high impedance input, will cause the pixel clock to increase to a much higher frequency. When pulled low as an output, the pixel clock will resume its normal frequency. The SUP signal is used on power up to drain the CCD chip 1603 of stored charge.

Figure 71B:
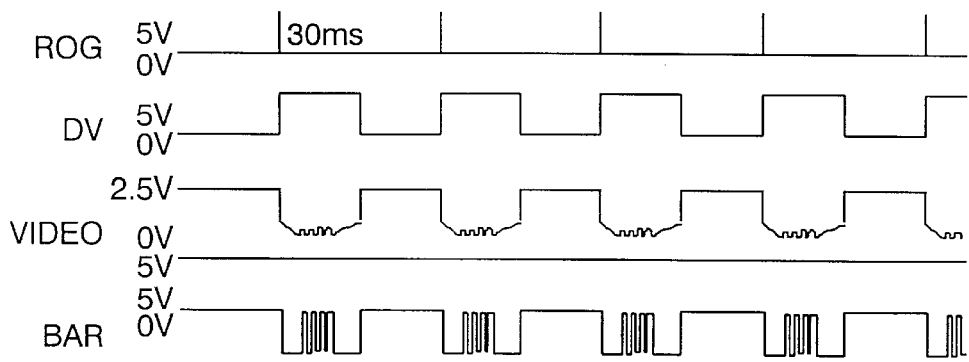
FIGS. 71B through 71D are exemplary waveform diagrams associated with the FIG. 71A electrical block diagram.
Figure 71C:
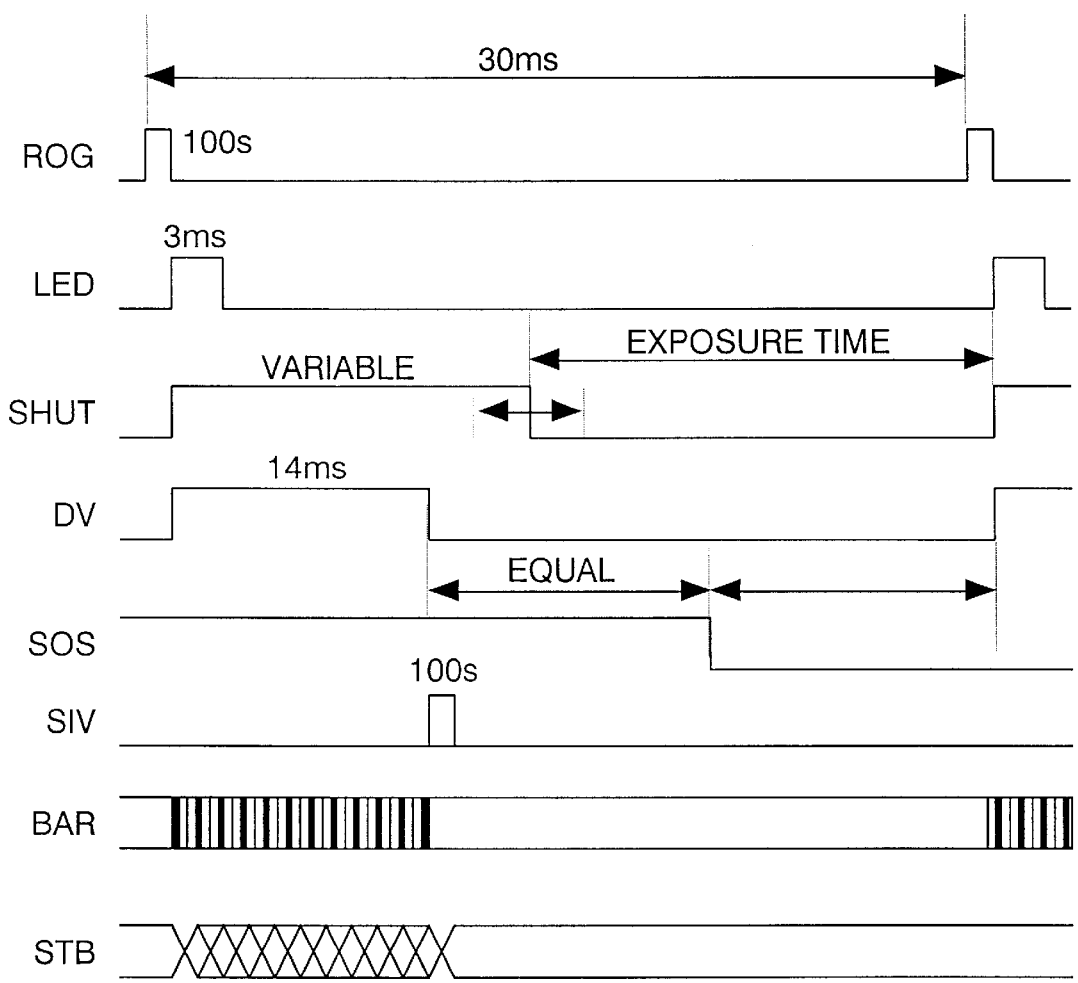
Figure 71D:
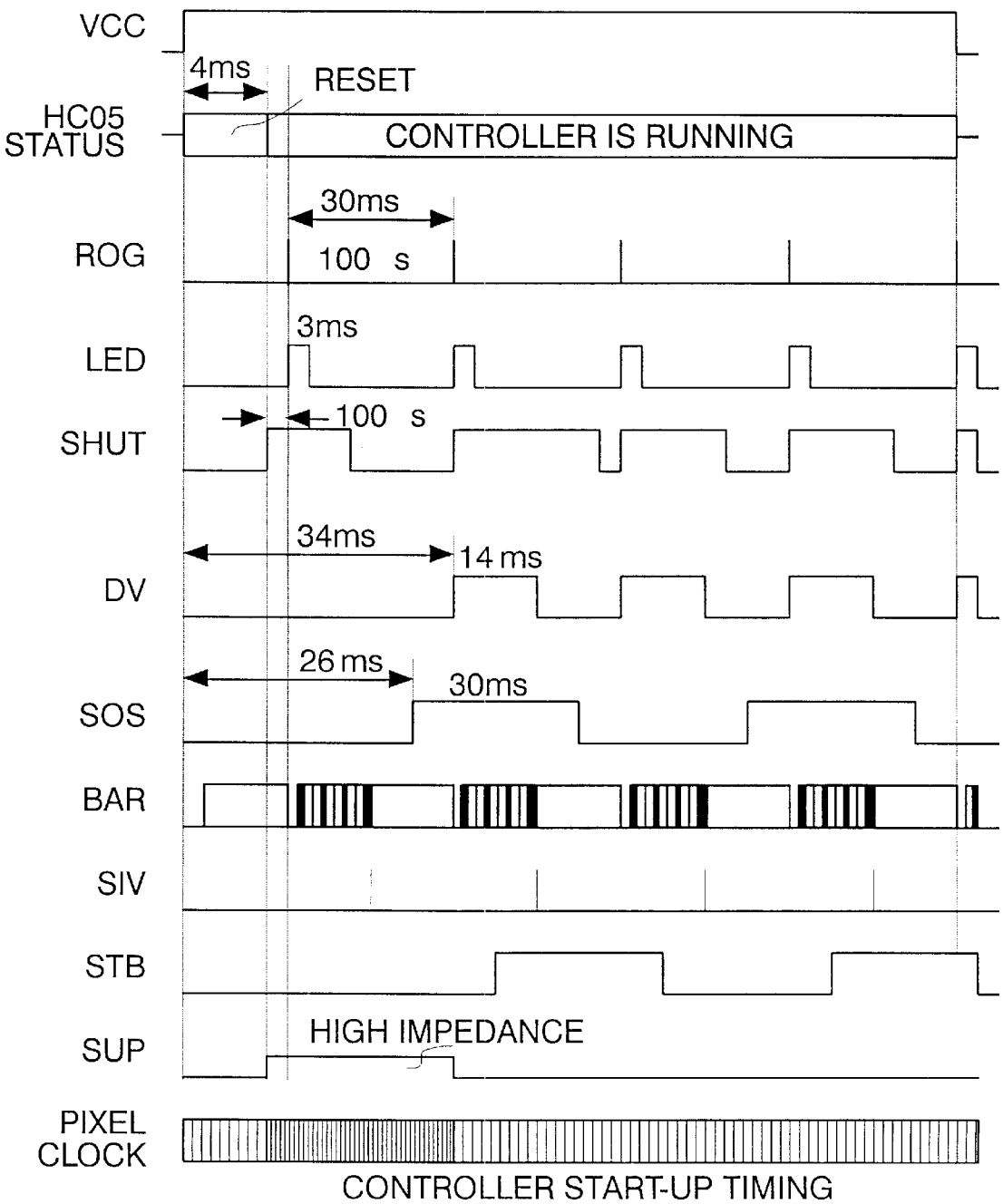

Exemplary signal waveform diagrams associated with the FIG. 71A embodiment are shown in FIGS. 71B–71D. FIG. 71B shows the relationship between the ROG signal, DV signal, video signal (i.e., CCD chip output signal), and BAR signal, and exemplary timing characteristics. FIG. 71C shows an enlarged timescale view of these same signals, along with the LED signal, SHUT signal, SOS signal, SIV signal, and STB signal. FIG. 71D shows these same signals at start up timing (such as when the analog board 1504 is energized).

Figure 46A:
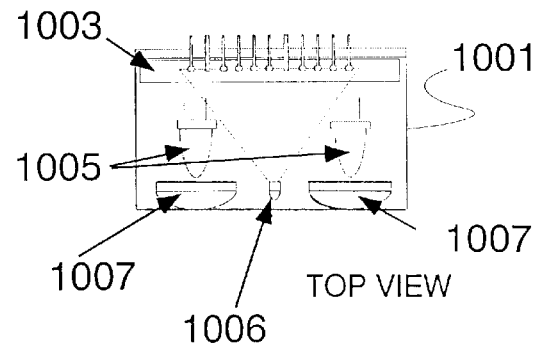
FIGS. 46A–46D are diagrams showing various views of a CCD detection module incorporating various aspects of the present invention.
Figure 46B:
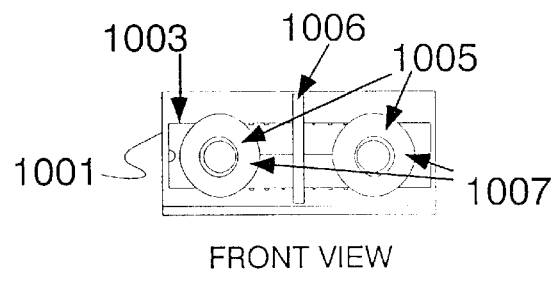
Figure 46C:
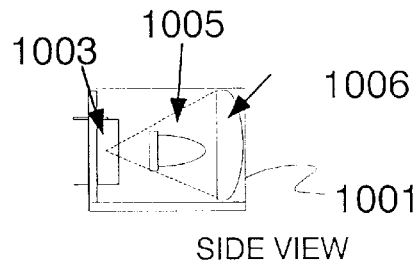
Figure 46D:
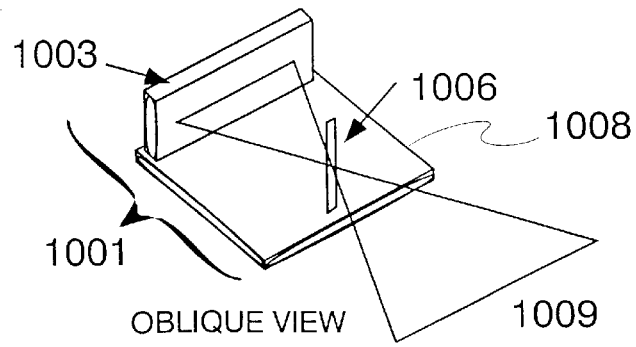

An embodiment of a particular CCD detection module 1001 is depicted from various angles of view in FIGS. 46A–46D. FIG. 46A shows a top view of the CCD detection module 1001, while FIG. 46B shows a front view, FIG. 46C shows a side view, and FIG. 46D shows an oblique view of the CCD detection module 1001. In FIGS. 46A–46D, the CCD detection module 1001 comprises a CCD chip 1003, one or more light emitting diodes (LEDs) 1005, an imaging lens 1006, and one or more focusing or pointer lenses 1007. The pointer lenses 1007 provide focusing for the LEDs 1005. The imaging lens 1006 may be a single zone lens, a high aspect ratio aperture lens, a multi-zone lens, or a combination thereof.

The system may comprise one or more circuit boards 1008 on which to mount the various components of the system, and may further comprise a power supply (not shown), a CCD driver (not shown), and signal processing electronics (not shown). The CCD driver and signal processing electronics may comprise embodiments previously described herein.

Alternatively, in other preferred embodiments, the CCD detection module 1001 may be configured to operate without the LEDs 1005 and pointer lenses 1007 for providing aiming beams.

Figure 47:
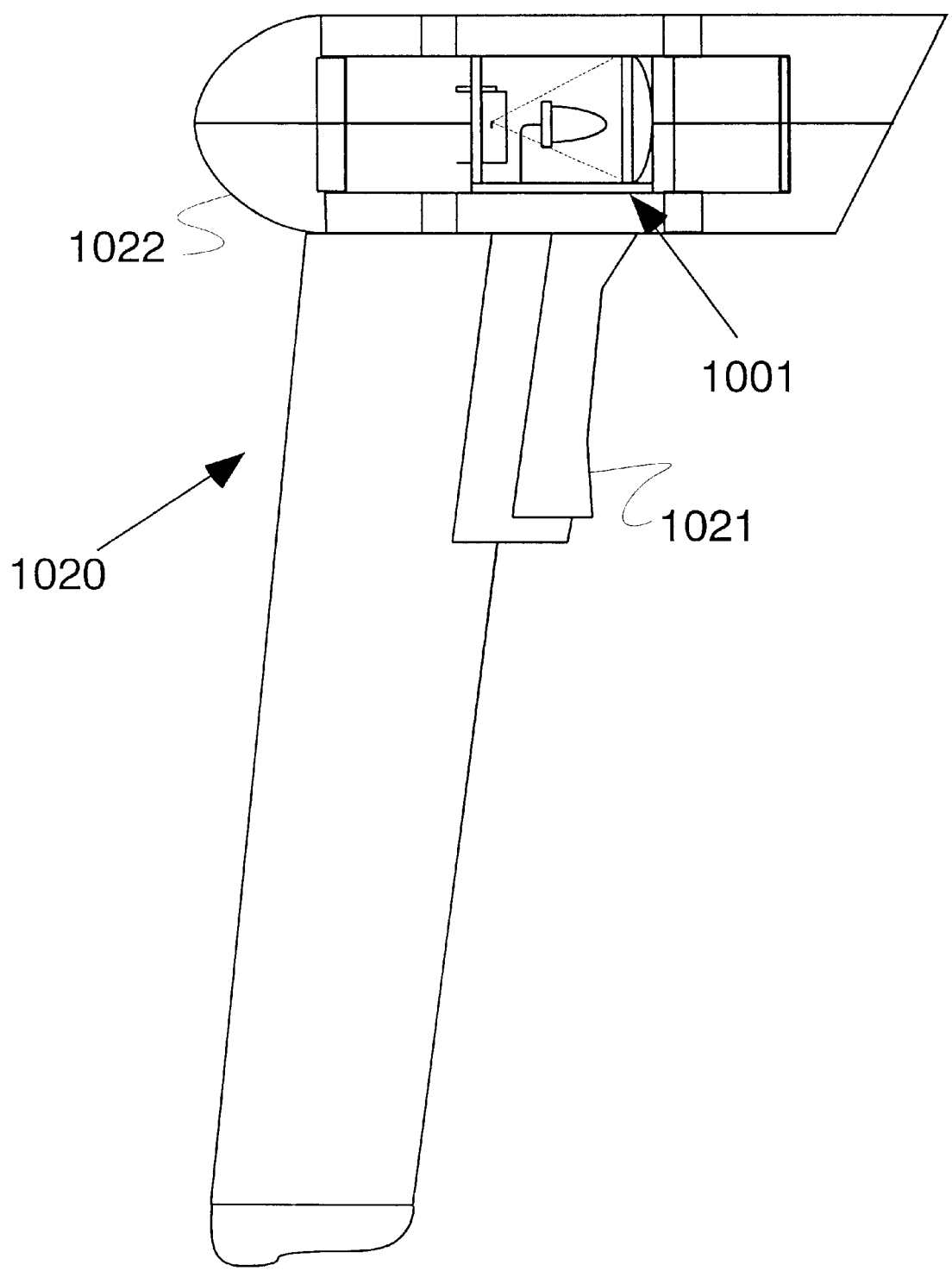
FIG. 47 is a diagram of an embodiment of a handheld imager incorporating the CCD detection module of FIGS. 46A–46D.
Figure 48:
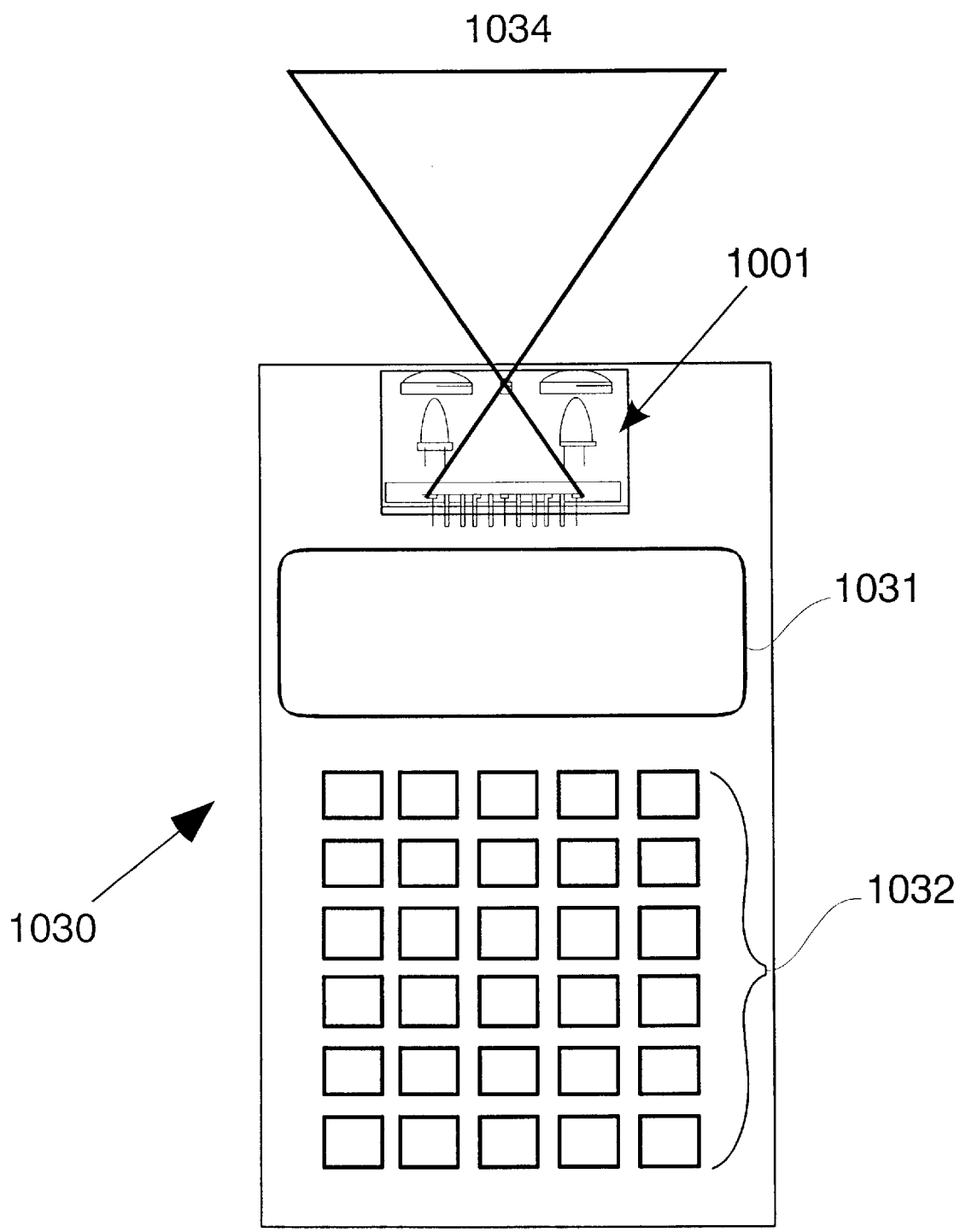
FIG. 48 is a diagram of an embodiment of a portable data terminal incorporating the CCD detection module of FIGS. 46A–46D.

FIGS. 47 and 48 show two different embodiments of systems incorporating the CCD detection module 1001 of FIGS. 46A–46D. FIG. 47 is a diagram of an embodiment of a handheld imaging device 1020 such as may be used in point of sale applications or for inventory control. In the handheld imaging device of FIG. 47, the CCD detection module 1001 is located in a head portion 1022 of the handheld imaging device 1020 and is connected to a handheld scanner controller (not shown). The CCD video output signal from the CCD detection module 1001 may be directly provided to the handheld scanner controller, or may be conditioned and/or processed first by any of the techniques described previously herein. If pointer LEDs are used, the pointer LEDs 1005 may be controlled by a signal from a trigger 1021 which is routed through the handheld scanner controller.

FIG. 48 is a diagram of an embodiment of a portable data terminal 1030 incorporating the CCD detection 1001 module of FIGS. 46A–46D. In FIG. 48, the portable data terminal 1030 comprises a keypad 1032 for entering data and a display screen 1031 for displaying-data in a manner known in the art. The CCD detection module 1001 is connected to a decoder (not shown) internal to the portable data terminal 1030. The CCD video output signal from the CCD detection module 1001 may be directly connected to signal conditioning and/or processing electronics in the portable data terminal 1030, or may be conditioned and/or processed within the CCD detection module 1001 by techniques described previously herein, and thereafter provided to the decoder of the portable data terminal 1030. The pointer LEDs 1005 also may be controlled by the portable data terminal 1030.

The CCD detection module 1001 may also be mounted in a fixed fashion (e.g., on a "slim-stand" or support stand) for retail or industrial applications. Alternatively, the CCD detection module 1001 may be placed on a hand or wrist mounted imaging device for applications such as point of sale operations or inventory control.

Figure 49:
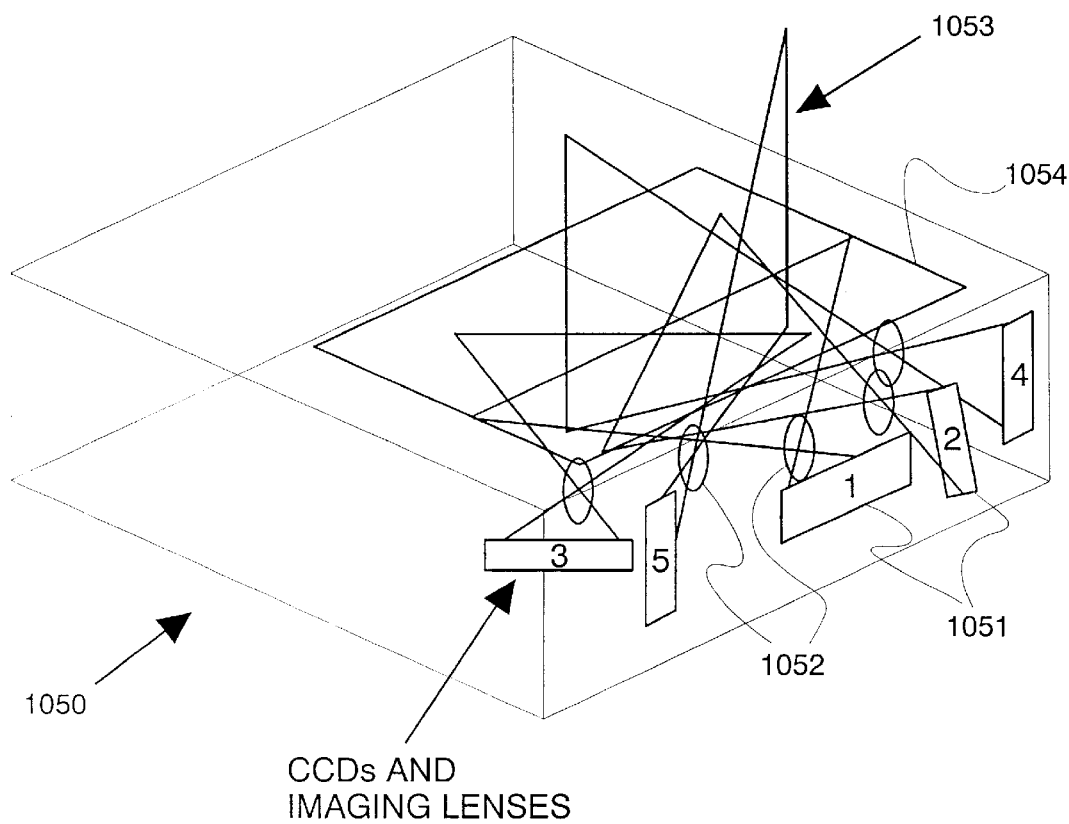
FIG. 49 is a diagram of a multiple-CCD omnidirectional imaging device for reading over a multi-dimensional area.

FIG. 49 is a diagram of an embodiment of a multiple-CCD imaging device which may be employed to read a multi-dimensional area. In FIG. 49, an imaging device 1050 comprises a plurality of CCD detectors 1051. Each CCD detector 1051 has a corresponding lens 1052 for collecting light. The lens 1052 may be a poly-optic lens such as described previously herein, and may be apertured or shaped in accordance with techniques also described previously herein. A transparent element 1054 is placed in the top of the imaging device 1050, such that items bearing encoded symbols may be passed over the imaging device 1050. Light is collected by each lens 1052 along one of a plurality of virtual imaging lines 1053 associated with the lens 1052. By placing the CCD detectors 1051 at different angles (such as shown in the example of FIG. 49), a multi-dimensional region may be covered by the imaging device 1050.

The multiple CCD detectors 1051 may be controlled by a single CCD driver configured in a manner as in FIG. 7, for example. Thus, the CCD detectors 1051 may be polled in series by a single signal processing unit. The imaging device 1050 may be incorporated into a fixed scanning system and may be used for point-of-sale applications, such as retail grocery checkout applications.

The techniques described herein may be used in combination or, in some instances, separately so as to provide an image reader having increased capacity to operate in various lighting conditions. The described techniques may allow the image reader either to run faster where a self-generated illumination source is used, or to operate in ambient light in the absence of a self-generated illumination source.

It is intended that various alternative embodiments of the present invention may be constructed and operated using various combinations of the devices and methods set forth herein. Additions, omissions, and/or modifications of one or more of these devices and methods may be made without departing from the scope of the invention. For example, the bar code reading methods and apparatus described herein may be constructed with CMOS active pixel sensor arrays in place of CCD arrays without fundamentally changing the inventive concept set forth herein, namely, methods and apparatus for reading a bar code under ambient illumination. CMOS active pixel sensor arrays are described in more detail in, e.g., copending provisional application Ser. No. 60/003,256 entitled "Single Chip Bar Code Scanner Using CMOS Active Pixel Sensor Technology," filed on Aug. 25, 1995, and hereby incorporated by reference as if fully set forth herein.

The present invention has been set forth in the form of its preferred embodiments. It is nevertheless intended that modifications to the disclosed optical reading techniques and devices may be made by those skilled in the art without departing from the scope and spirit of the present invention. Moreover, such modifications are considered to be within the purview of the appended claims.

What is claimed is:

1. An apparatus for reading encoded images comprising:

focusing optics for collecting light;

a photosensor positioned so as to receive light collected by said focusing optics, and generating a photosensor output signal thereby;

a correlated double sampling circuit connected to said photosensor output signal, said correlated double sampling circuit comprising circuitry selected from the group consisting of: a dual slope processor and a dual sampler processor; and a decoder connected to said correlated double sampling circuit.

2. The apparatus of claim 1, wherein said photosensor comprises a charge-coupled device, and wherein said photosensor output signal comprises a CCD output signal.

3. The apparatus of claim 2, wherein said charge-coupled device comprises a linear array of CCD pixels.

4. The apparatus of claim 2, wherein said focusing optics comprises a multi-focus imaging system.

5. The apparatus of claim 4, wherein said multi-focus imaging system comprises a poly-optic lens.

6. The apparatus of claim 4, wherein said multi-focus imaging system comprises an array of lenses, at least two of said lenses differing in focal length.

7. The apparatus of claim 1, further comprising means for varying an exposure time of said photosensor as a function of an amount of light received by said photosensor.

8. The apparatus of claim 7, wherein said photosensor comprises a charge-coupled device;

said photosensor output signal comprises a CCD output signal; and said means for varying an exposure time of said photosensor comprises a peak detector coupled to said CCD output signal, said exposure time being varied in response to a measured peak value in said CCD output signal.

9. The apparatus of claim 7, wherein said photosensor comprises a charge-coupled device;

said photosensor output signal comprises a CCD output signal; and said means for varying an exposure time of said photosensor comprises a differentiator coupled to said CCD output signal and a peak detector coupled to said differentiator, said differentiator generating a first derivative of said CCD output signal, whereby said exposure time is varied in response to a peak value in said first derivative.

10. A method for reading images, comprising the steps of:

collecting light and focusing said light onto a photosensor;

generating a photosensor output signal in response to light focused onto said photosensor;

removing common mode noise from said photosensor output signal, and generating a noise-reduced photosensor output signal thereby; and detecting edge transitions in said noise-reduced photosensor output signal, said edge transitions corresponding to transitions between lighter and darker portions of a read image;

wherein said step of removing common mode noise from said photosensor output signal comprises the steps of
charging a capacitor to a reset voltage for a predetermined period,
after said predetermined period, applying said photosensor output signal to said capacitor, and
sampling an output voltage of said capacitor.

11. The method of claim 10, wherein said step of collecting and focusing light onto a photosensor comprises the step of collecting light over a plurality of collimated scan lines.

12. The method of claim 11, wherein each of said collimated scan lines is associated with a lens element, at least two of said lens elements differing in focal lengths.

13. The method of claim 10 further comprising the step of adjusting an exposure time of said photosensor in response to said photosensor output signal.

14. The method of claim 10 further comprising the step of decoding.

15. The method of claim 10, wherein said step of collecting and focusing light onto a photosensor comprises the step of focusing light onto a charge-coupled device, and wherein said step of generating a photosensor output signal in response to light focused onto said photosensor comprises the step of generating a CCD output signal.

16. An apparatus for reading encoded images comprising:

a multi-focus imaging system;

a charge-coupled device positioned so as to receive light collected by said multi-focus imaging system, and generating a CCD output signal thereby;

means connected to said charge-coupled device for reducing common mode noise in said CCD output signal, and generating a noise-reduced CCD output signal thereby; and a decoder connected to said noise-reduced CCD output signal;

wherein said means for reducing common mode noise in said CCD output signal comprises a correlated double sampling circuit, said correlated double-sampling circuit comprising circuitry selected from the group consisting of: a dual slope processor and a dual sampler processor.

17. The apparatus of claim 16, further comprising means for varying an exposure time of said charge-coupled device in response to an amount of received light.

18. The apparatus of claim 16, wherein said multi-focus imaging system comprises a poly-optic lens.

19. The apparatus of claim 16, wherein said multi-focus imaging system comprises an array of lenses, at least two of said lenses differing in focal length.

20. A method for optical reading, comprising the steps of:

collecting light using a multi-focus imaging system;

focusing the collected light onto a charge coupled device, and generating a CCD output signal thereby;

removing common mode noise from said CCD output signal, and generating a noise-reduced CCD output signal thereby; and adjusting an exposure time of said charge-coupled device in response to said CCD output signal;

wherein said step of removing common mode noise from said CCD output signal comprises the steps of
charging a capacitor to a reset voltage for a predetermined period,
after said predetermined period, applying said CCD output signal to said capacitor, and
sampling an output voltage of said capacitor.

21. The method of claim 20, further comprising the step of detecting edge transitions in said noise-reduced CCD output signal, said edge transitions corresponding to transitions between lighter and darker portions of a read image.

\* \* \* \* \*